Sept. 28, 1943.  W. G. HOELSCHER  2,330,426
RADIAL DRILL
Filed Oct. 5, 1938  26 Sheets-Sheet 3
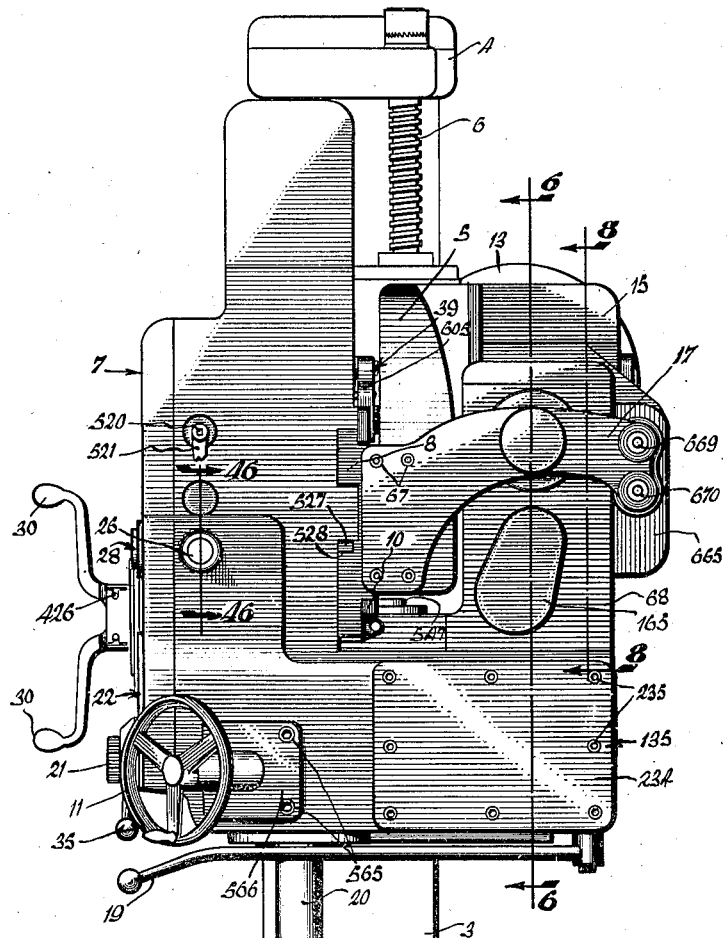
Fig. 3
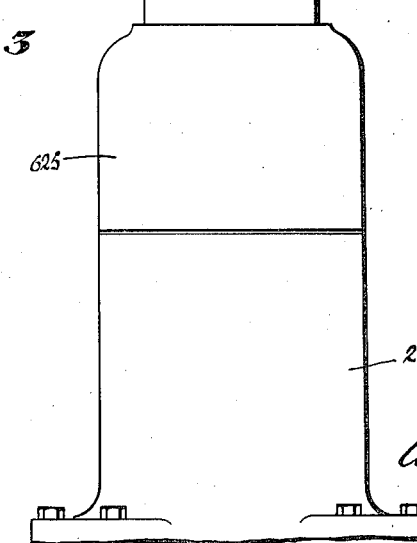
INVENTOR.
William G. Hoelscher
BY Wood & Wood
ATTORNEYS Sept. 28, 1943.  W. G. HOELSCHER  2,330,426
RADIAL DRILL
Filed Oct. 5, 1938  26 Sheets-Sheet 4

INVENTOR
William G. Hoelscher
BY Wood & Wood ATTORNEYS

Sept. 28, 1943.　　　W. G. HOELSCHER　　　2,330,426
RADIAL DRILL
Filed Oct. 5, 1938　　　26 Sheets-Sheet 5

INVENTOR.
BY William G. Hoelscher
Wood & Wood ATTORNEYS

Sept. 28, 1943.  W. G. HOELSCHER  2,330,426
RADIAL DRILL
Filed Oct. 5, 1938   26 Sheets-Sheet 6

INVENTOR.
BY William G. Hoelscher
Wood & Work ATTORNEYS

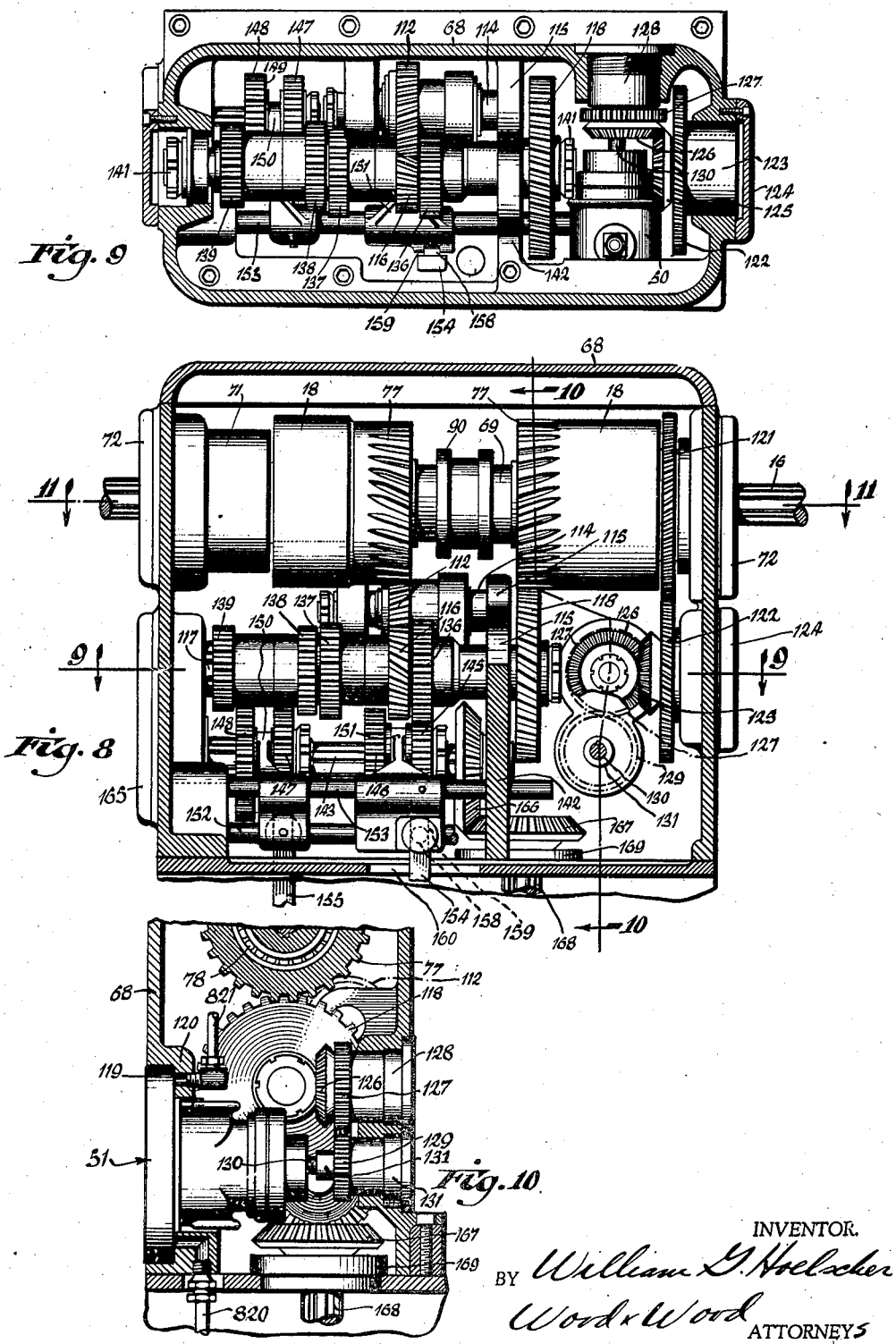

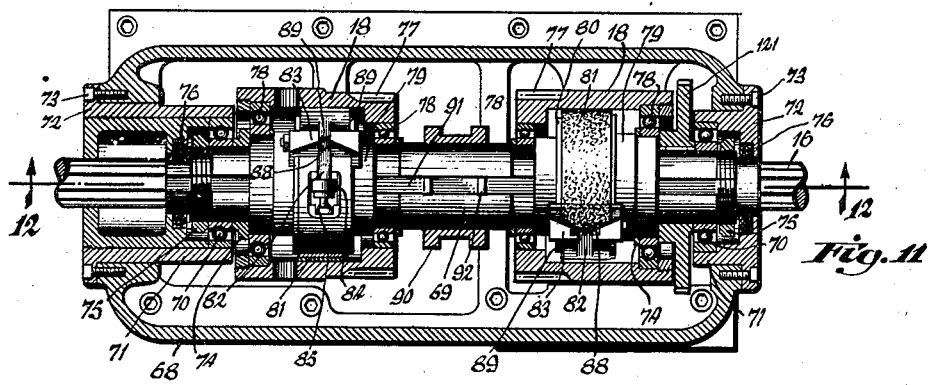

Sept. 28, 1943.    W. G. HOELSCHER    2,330,426
RADIAL DRILL
Filed Oct. 5, 1938    26 Sheets-Sheet 9
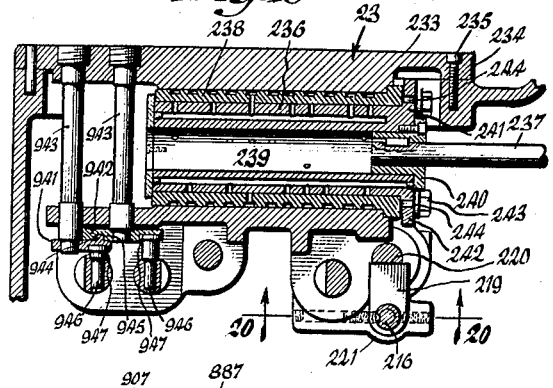
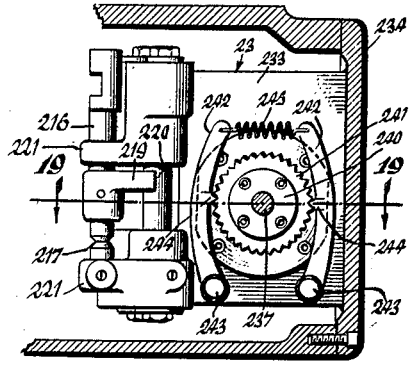
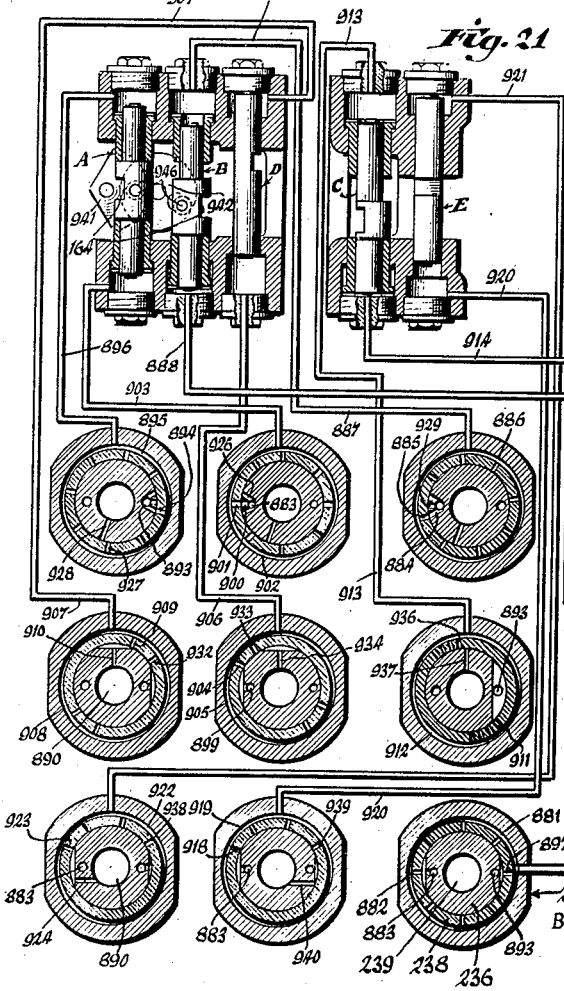
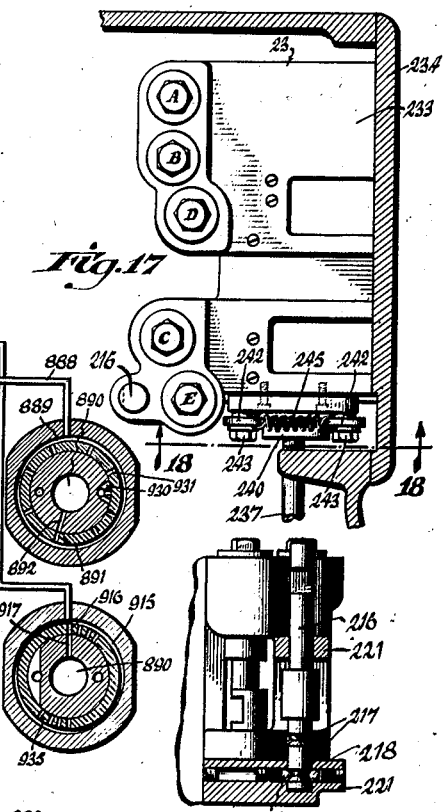
INVENTOR.
William G. Hoelscher
BY Wood & Wood
ATTORNEYS

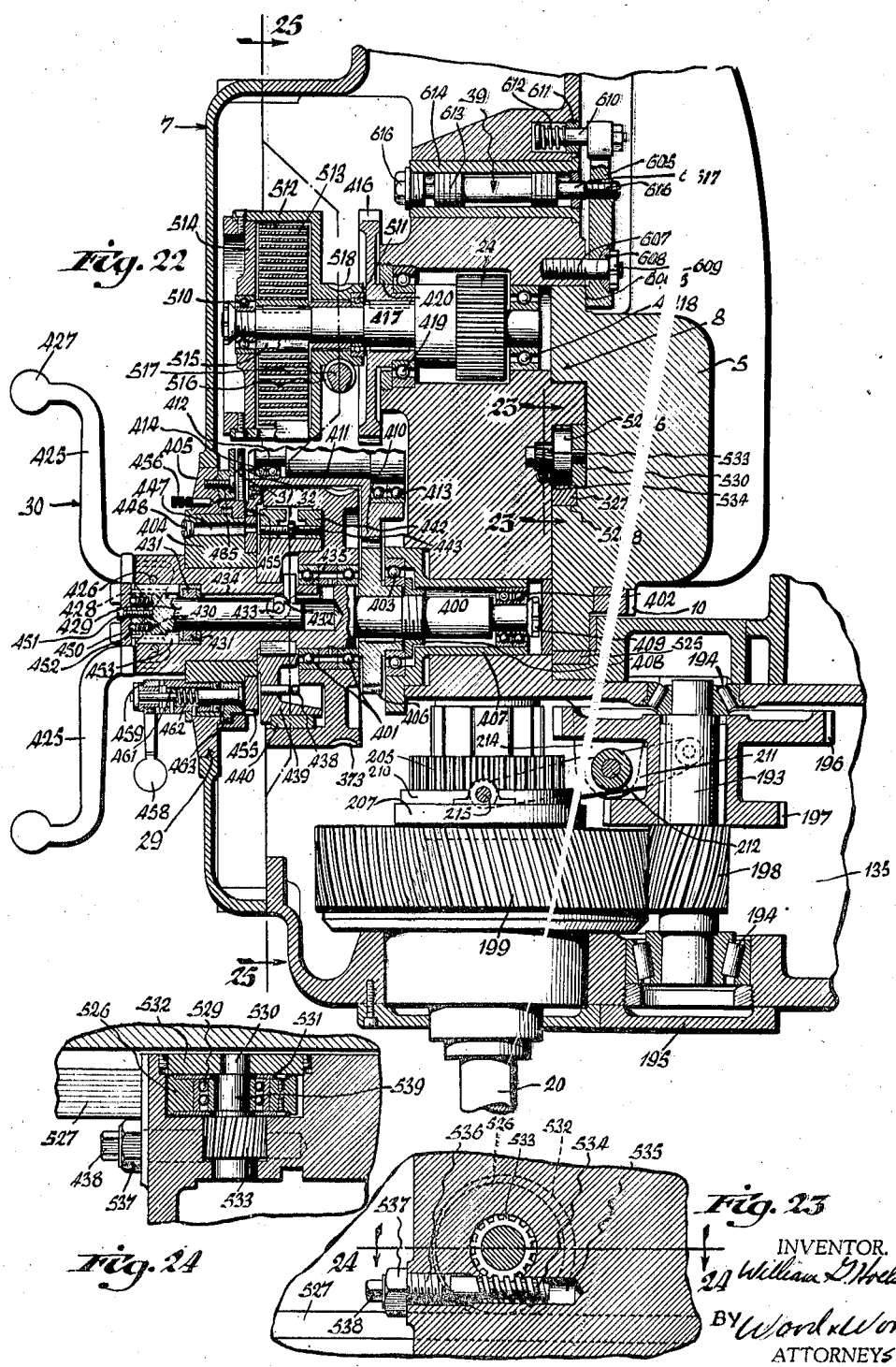

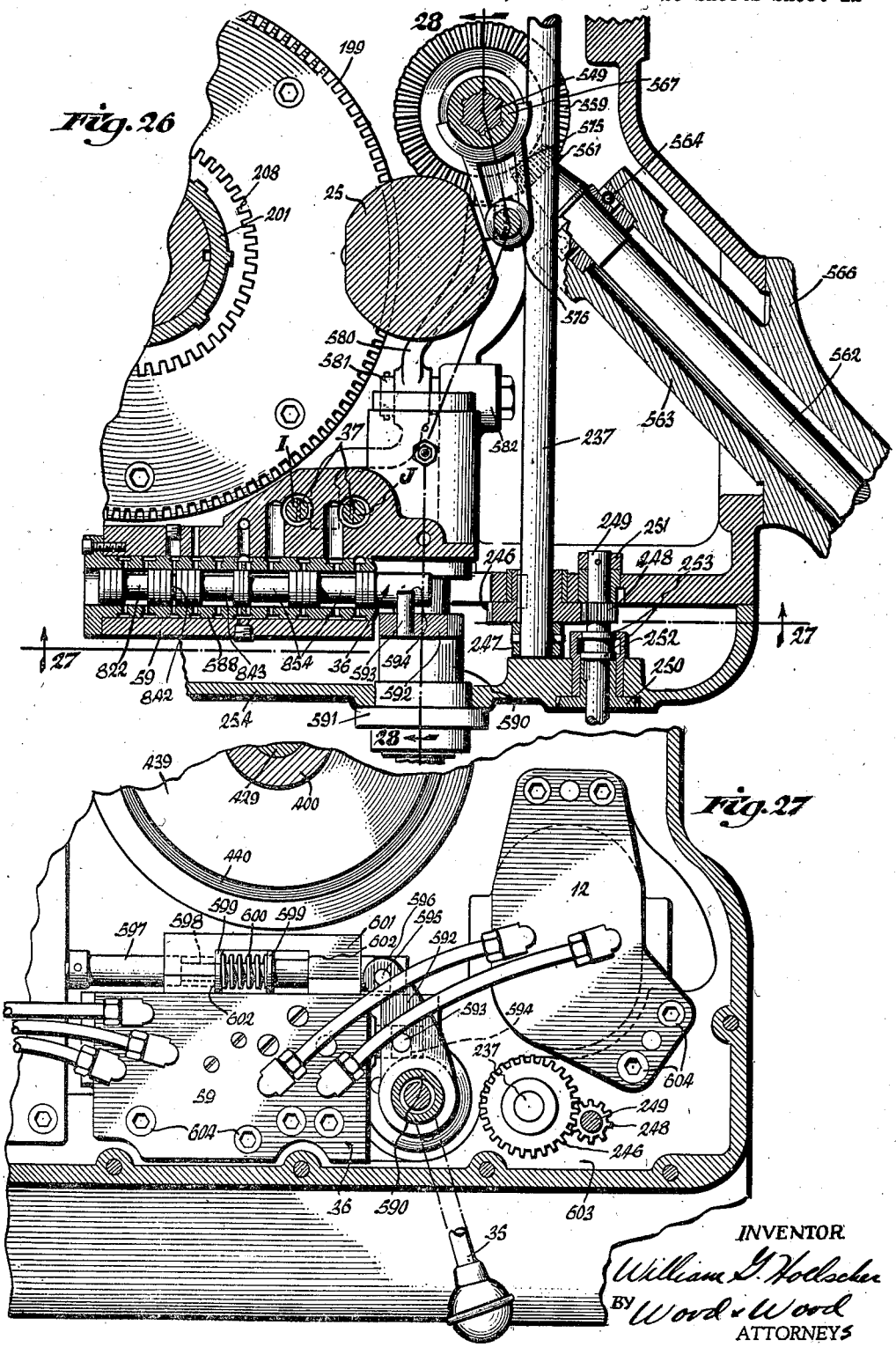

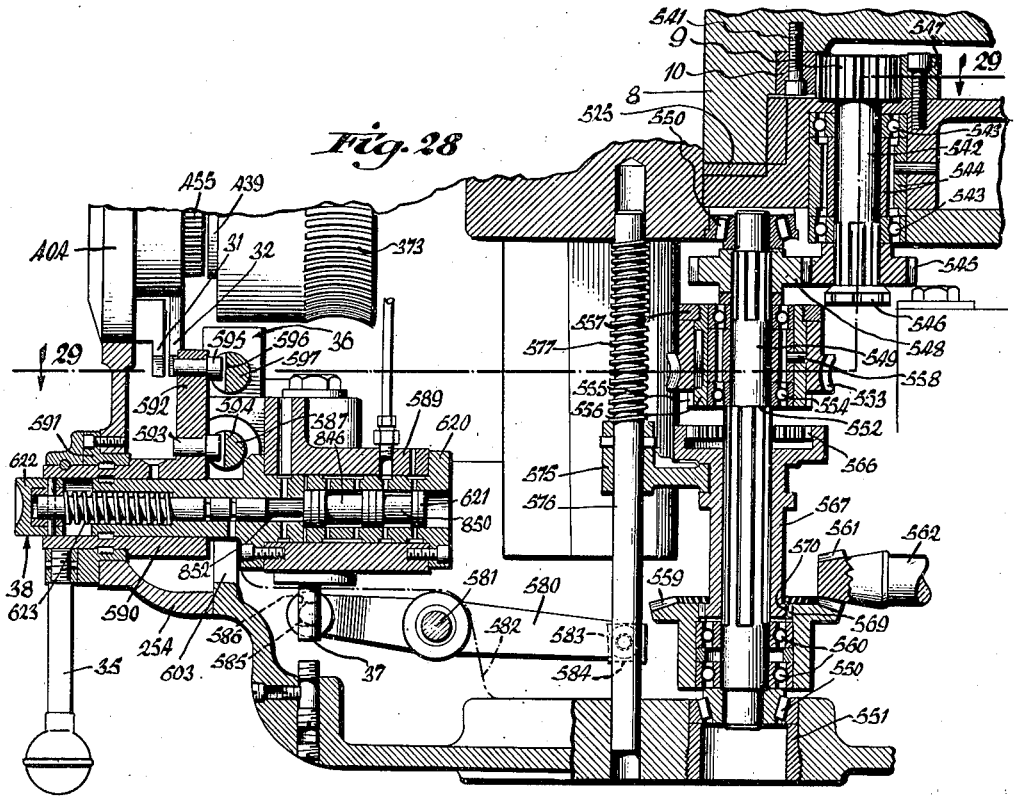

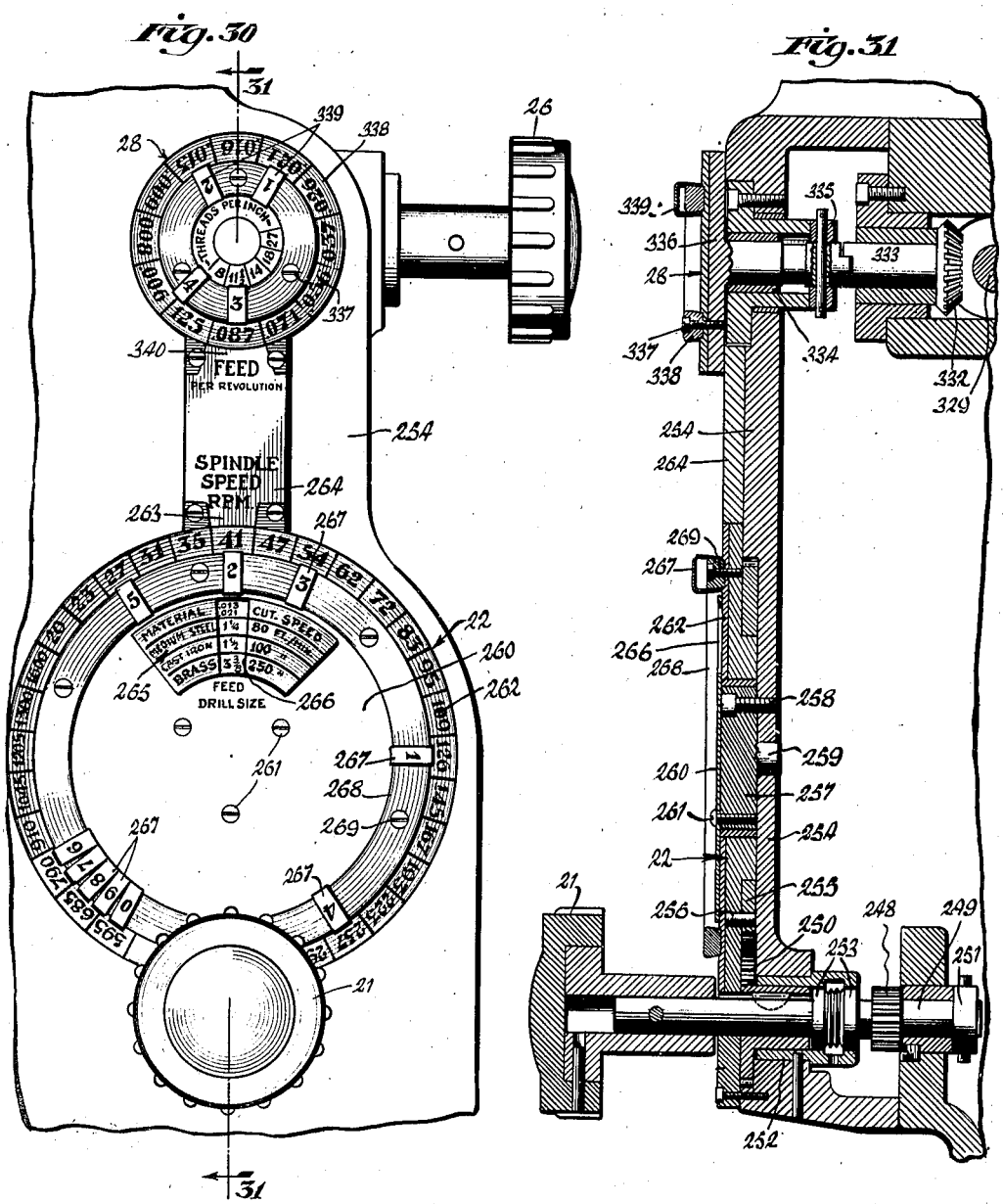

Sept. 28, 1943.  W. G. HOELSCHER  2,330,426
RADIAL DRILL
Filed Oct. 5, 1938  26 Sheets-Sheet 15
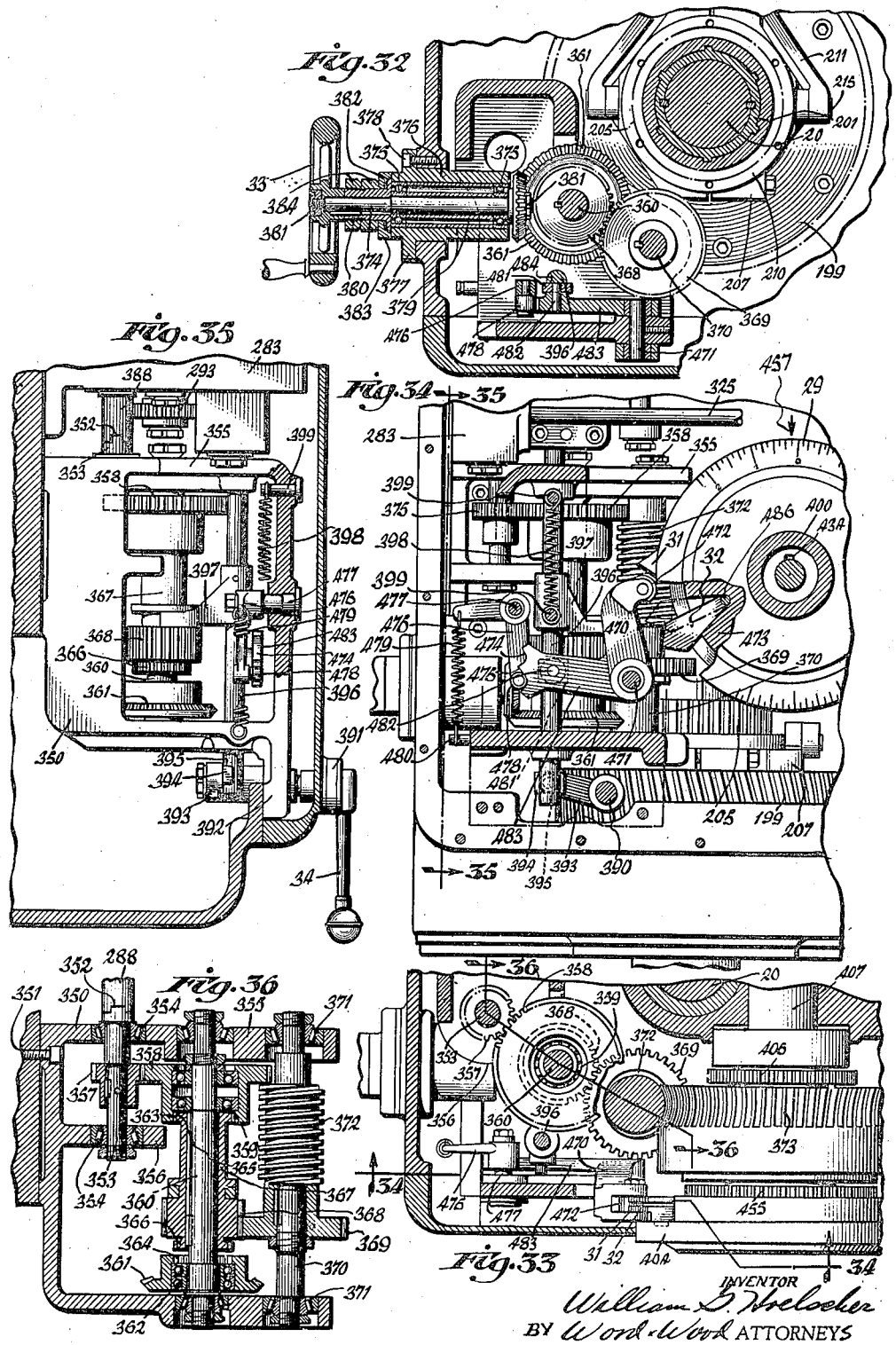
INVENTOR
William G. Hoelscher
BY Wood & Wood ATTORNEYS Sept. 28, 1943.     W. G. HOELSCHER     2,330,426
RADIAL DRILL
Filed Oct. 5, 1938     26 Sheets-Sheet 16

INVENTOR.
BY William G. Hoelscher
Word & Word ATTORNEYS

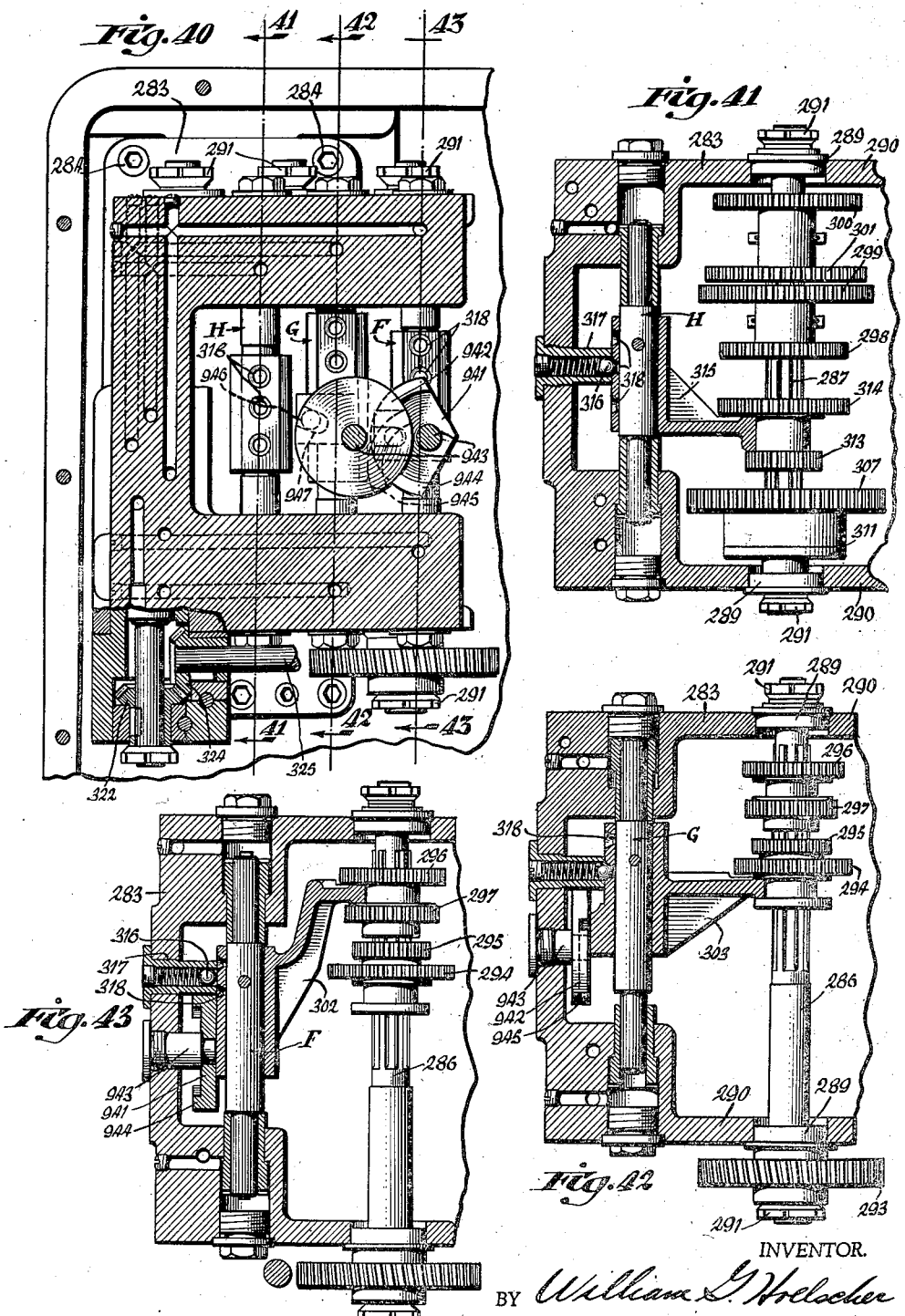

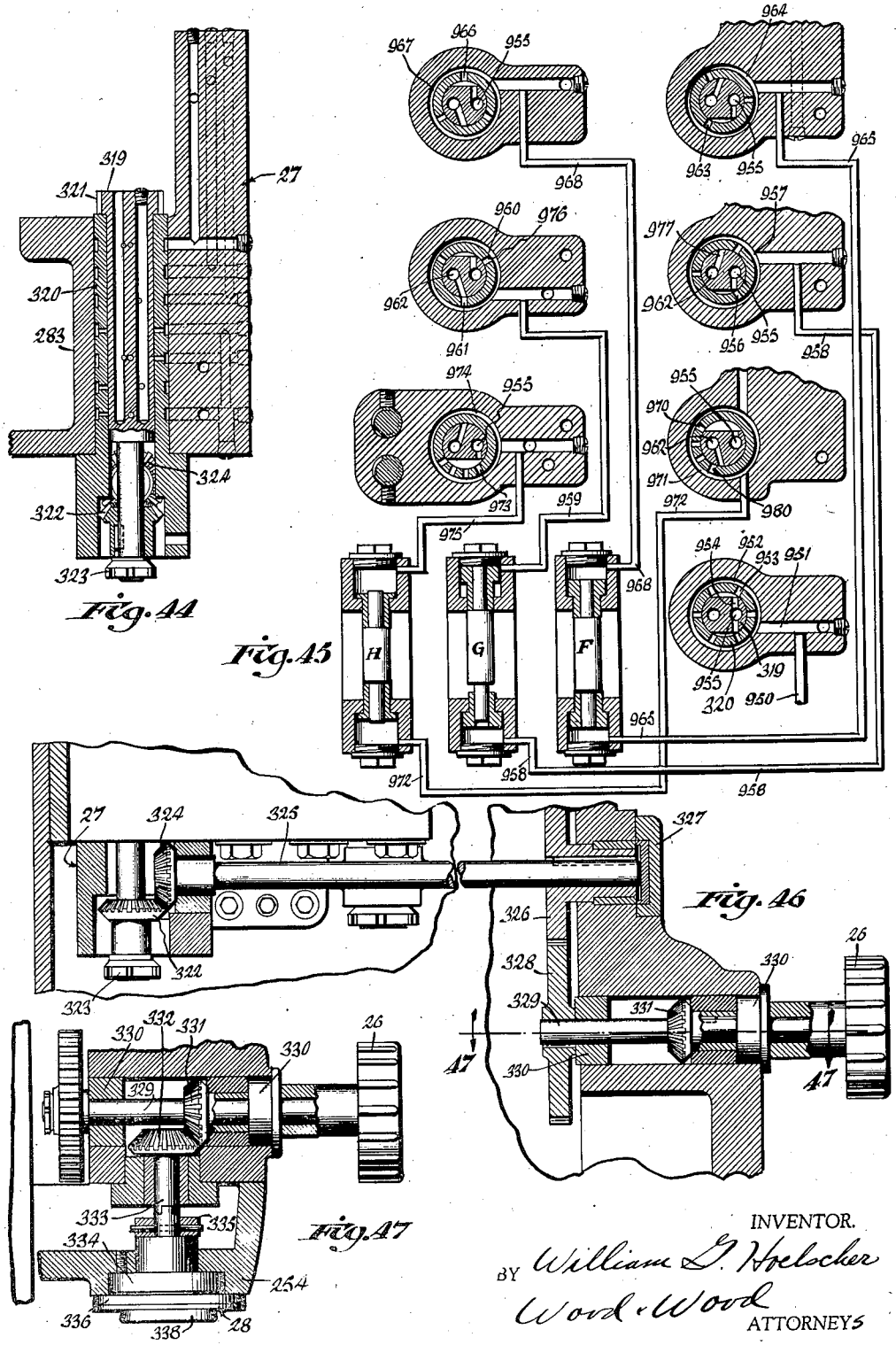

Sept. 28, 1943.  W. G. HOELSCHER  2,330,426
RADIAL DRILL
Filed Oct. 5, 1938  26 Sheets-Sheet 19

INVENTOR.
BY William G. Hoelscher
Wood & Wood
ATTORNEYS

Sept. 28, 1943. W. G. HOELSCHER 2,330,426
RADIAL DRILL
Filed Oct. 5, 1938 26 Sheets-Sheet 20
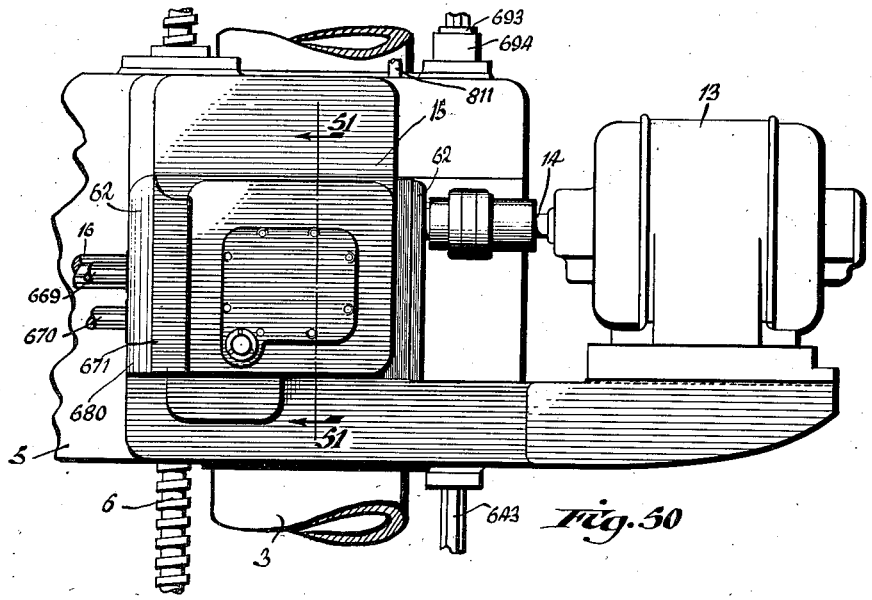
Fig. 50
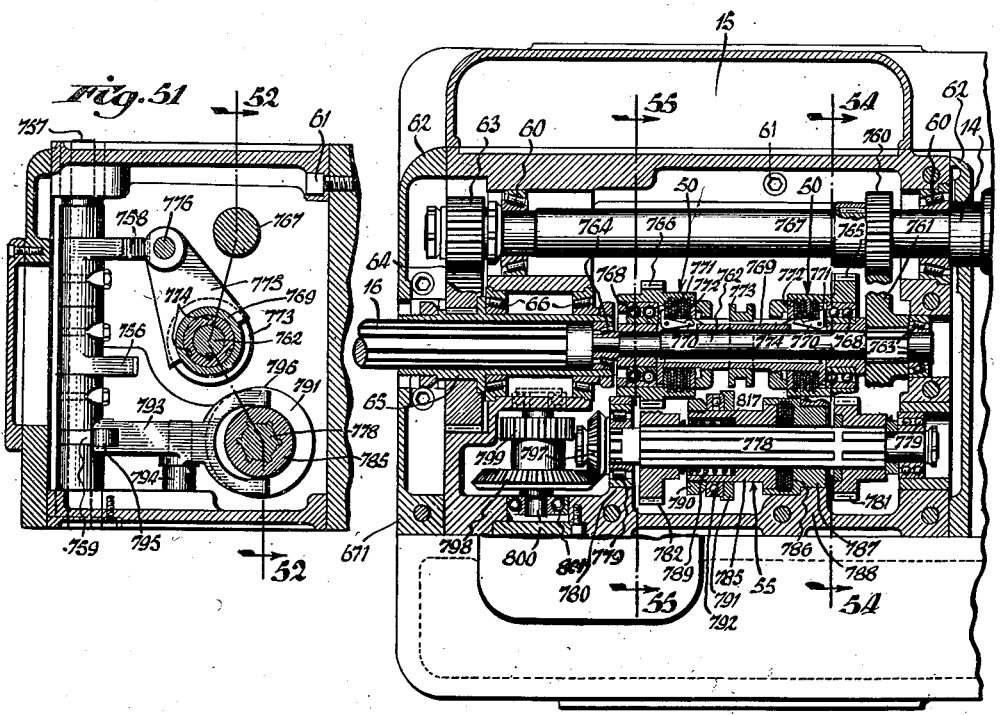
Fig. 51
Fig. 52
INVENTOR.
BY William G. Hoelscher
Wood & Wood
ATTORNEYS Sept. 28, 1943.  W. G. HOELSCHER  2,330,426
RADIAL DRILL
Filed Oct. 5, 1938     26 Sheets-Sheet 21

INVENTOR.
BY William G. Hoelscher
Wood & Wood ATTORNEYS

Sept. 28, 1943. W. G. HOELSCHER 2,330,426
RADIAL DRILL
Filed Oct. 5, 1938 26 Sheets-Sheet 22
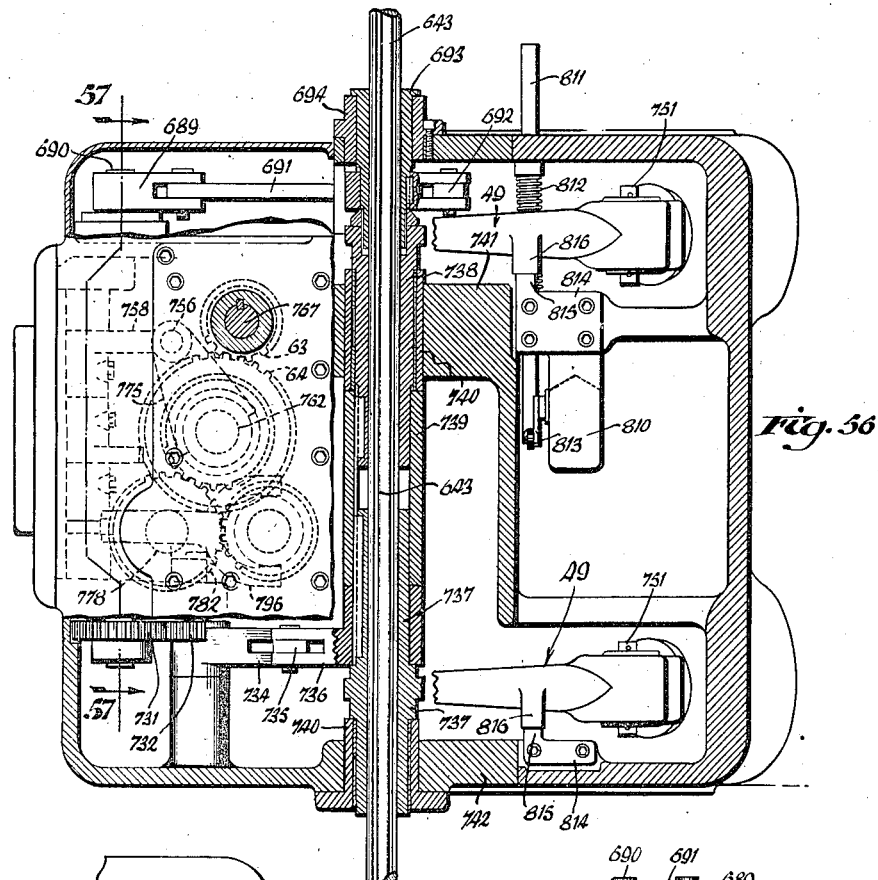
Fig. 56
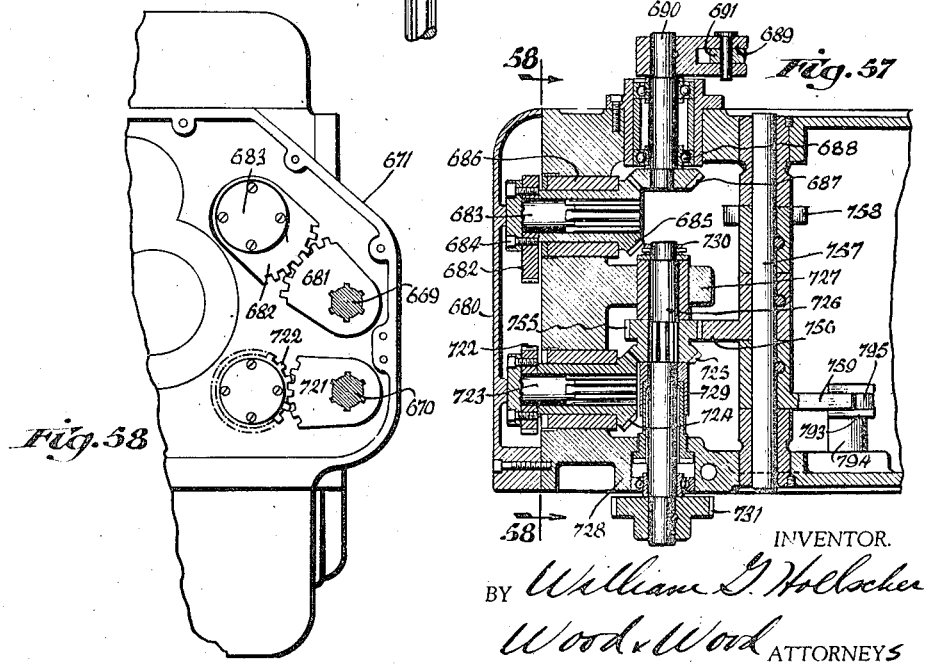
Fig. 58
Fig. 57
INVENTOR.
BY William G. Hoelscher
Wood & Wood ATTORNEYS Sept. 28, 1943. W. G. HOELSCHER 2,330,426
RADIAL DRILL
Filed Oct. 5, 1938 26 Sheets-Sheet 23

INVENTOR.
BY William G. Hoelscher
Wood & Wood
ATTORNEYS

Sept. 28, 1943.                W. G. HOELSCHER                2,330,426
                                  RADIAL DRILL
                    Filed Oct. 5, 1938          26 Sheets-Sheet 24

INVENTOR.
BY William G. Hoelscher
Wood & Wood ATTORNEYS

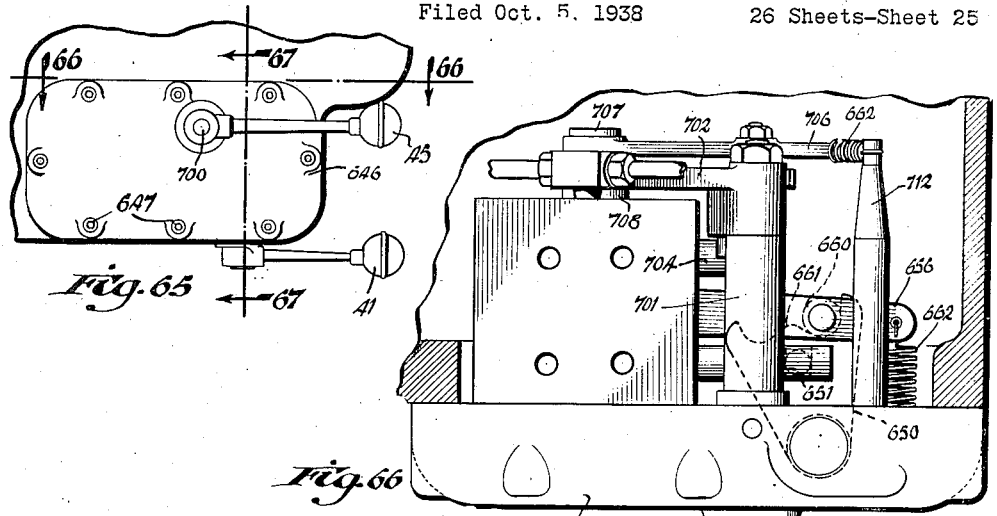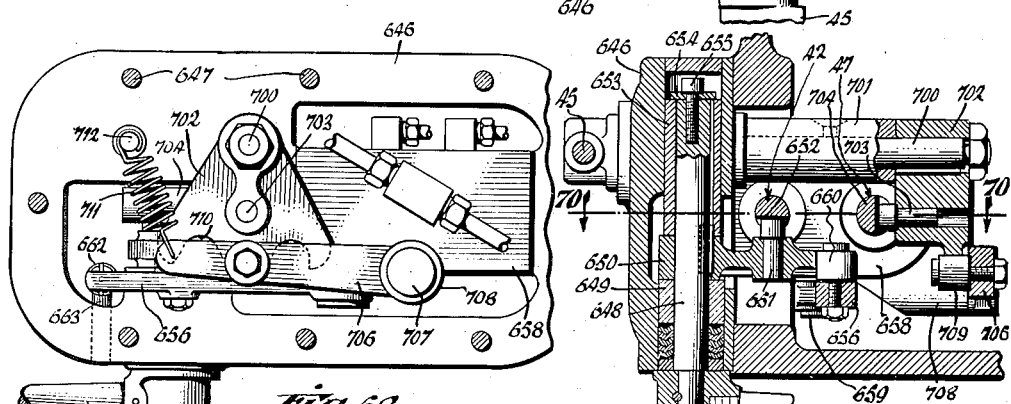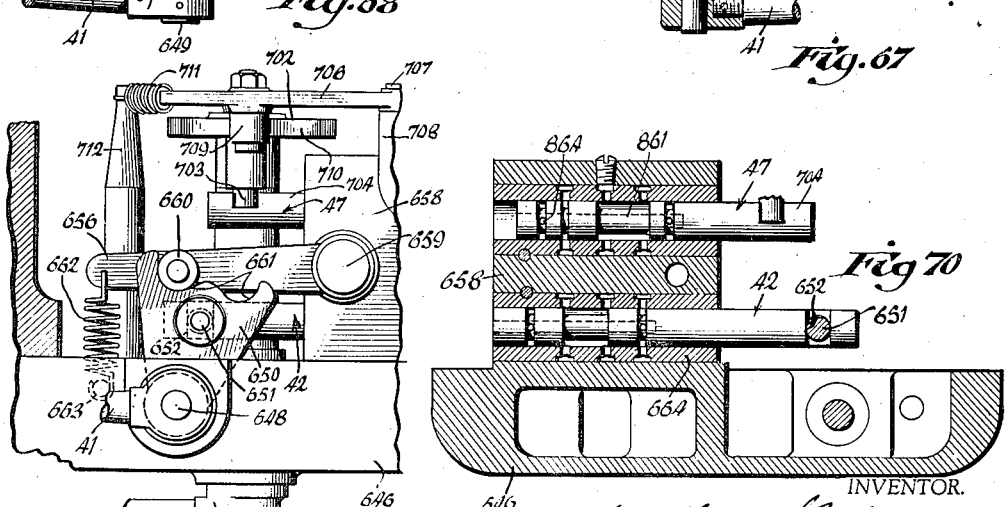

Patented Sept. 28, 1943

2,330,426

UNITED STATES PATENT OFFICE 2,330,426

RADIAL DRILL

William G. Hoelscher, Norwood, Ohio, assignor to The American Tool Works Company, Cincinnati, Ohio, a corporation of Ohio Application October 5, 1938, Serial No. 233,448

61 Claims. (Cl. 77—28)

This invention relates to machine tools and is particularly directed to the application of hydraulics to the control mechanisms of a radial drill, as well as to certain units of the operating or driving mechanism thereof. Additionally, the invention relates to features of the control and operation which, while herein performed hydraulically, are of general application.

It has been the object of the present inventor to simplify and render more efficient the operation of the drill generally and as controlled and operated hydraulically. As a result, the machine provides centralized control, that is to say, all levers are located on the head of the drill, conveniently accessible for the operator, and certain of the levers such as the head traverse control and arm elevating control, swing in the direction in which movement is to be instituted.

Further, it is arranged that the head is automatically unclamped from the arm when the head traverse lever is actuated for traversing the head. This is achieved by means of hydraulic interconnection between the respective controls. In this arrangement it is provided that the clamping means is controlled by a simple push button located in the same compact assembly with the head traverse control lever.

The arm clamping and arm elevating control mechanisms are interrelated for causing clamping action when the arm is stationary, or for causing release of the clamp when the arm is elevated. These results are accomplished by hydraulic and mechanical intercontrol by means of a single lever.

The arrangement provides for selective shifting of spindle feed and speed change gears and permits the selection of gears at random. A connection between the main clutch control lever on the head and the hydraulic control system, effective for disconnecting the fluid pressure, makes it possible to manipulate the dials without shifting those gears which would be affected by the movement of the dial through a series of positions. The selection is accomplished with the clutch lever at neutral and the hydraulic control system for shifting the gears cut off due to the function of the control valve. It is provided, however, that the pump is running at all times and the remainder of the circuit is under pressure so that the head may be traversed, the arm raised or lowered, or the column clamped or unclamped.

Thus, the machine is arranged to permit the logical procedure in setting it up for a particular job. The operator decides on the proper spindle feed and speed and sets the dials accordingly, sets the depth indicator dial to the depth of hole desired, and positions the drill at the point on the work to be drilled, by manipulating the head and arm. He then clamps the head and arm in position and operates the main control lever. This opens the hydraulic circuit to the hydraulic shifter plungers and they are effective for causing the selected gears to mesh and the spindle to be driven and fed into the work to the depth setting of the dial, at which point the feed is automatically stopped. The spindle feed gears are driven directly from the spindle, and the rate of feed is therefore always directly proportionate to the spindle speed.

It has been a further object to provide that the pump is constantly driven, but is normally bypassed for lubrication except when the accumulator is being charged or the head traverse is active. These results are effected by the use of an accumulator and an automatic accumulator valve, whereby a sufficient volume of oil under pressure is stored up for performing several operations. When the volume of oil under pressure is nearly exhausted the valve works to permit recharging of the accumulator. The advantages of this arrangement are manifold. The pump idles most of the time and heating of the oil is avoided and also waste of power and wear of parts are minimized. Nevertheless, pressure is available at all times and the system is instantly active when one of the control levers is actuated. Furthermore, the oil in the accumulator is conserved by running the head traverse motor directly from the pump rather than from the accumulator, since the pump requires a large volume of oil and would quickly exhaust the accumulator.

It has been a further object of the inventor to provide that the hand wheel for traversing the head manually is automatically hydraulically disengaged to protect the operator from the rotating wheel when the head is translated under power.

The hydraulic system is centralized within the head of the drill, including therein, the pump control cylinders, valves, head traverse motor, and the hydraulic fluid. In this respect it has been a further object to provide that the hydraulic plungers for operating the column and arm clamps are located in the head, and the operating connection is carried from the head to the clamps mechanically in order to eliminate flexible hydraulic connections between the head and column, which connections might cause leakage and might become fouled as the head is translated.

It has been a further object of the present inventor to provide an improved arrangement of gears, whereby less gears are required for a given speed, the structure is more compact, and less mechanism is required. A structure accomplishing this result may consist of a single intermediate shaft effective for increasing speeds from one to four, by the use of a cluster of three gears on the intermediate shaft and clusters of two gears each on the adjacent shafts. One of the adjacent clusters of two gears is shiftable relative to the cluster of three gears to accomplish two speeds, or may be shifted again relative to the cluster of three gears, after the cluster of three gears has been moved to a second gear coupling position, thereby accomplishing two more speeds.

It has been a still further object of the inventor to provide an improved feed controlling and regulating mechanism for the spindle, in which the feed is efficiently and accurately disconnected at any desired depth and is automatically disconnected at a fixed point relative to the range of spindle travel, whereby the spindle will be disconnected from the drive if the depth setting should be such as to carry the spindle out of its normal range. The arrangement used for feed disconnection is such that it will constantly maintain the coupling mechanism in position whereby the clutch is immediately automatically engaged after the stop dogs are reset out of feed disconnect position. Also the feed setting means is improved whereby the feed is more easily and accurately reset and controlled.

A further object has been to provide an improved drill spindle assembly sustained in an improved bearing arrangement which maintains the correct axial alignment of the spindle and insures true running of the drill. For this purpose, the transmission connection for transmitting the drive to the spindle is, approximately, in the plane of the lower bearing. In this improved construction the main driving gear, particularly for low speeds, is journalled independently of the spindle assembly so that driving stresses on the teeth of this gear normally tending to disalign the spindle are not conveyed to the spindle. Specifically the drive gear is journalled concentrically with the spindle upon a heavy bearing sustained by the head. Therefore the head receives the heavy driving stresses and any movement tendency toward disalignment of the spindle is taken care of between the teeth of the large gear and the teeth of the driven gear on the spindle.

Another object has been to provide a radial drill head in which the various parts of the assembly are readily accessible for replacement or repairs. In order to facilitate the assembly of the gear transmission within the head, certain groups of gears of the train are assembled in brackets which are removable bodily from the head. The hydraulic units such as the pump and filter, which may require occasional servicing, are removable from the outside of the head without disturbing the pipe connections.

Another object has been to provide a direct reading feed indicating dial for the drill spindle. This is accomplished by providing a dial of a circumference corresponding to the actual drill feed travel. The dial is in driving connection with the drill spindle by appropriate gearing and is graduated in inches and fractions thereof so that the dial reads directly in inches and therefore may be set more accurately.

Another object has been to provide a completely automatic control arrangement which protects the machine against damage which might otherwise occur due to carelessness or error on the part of the operator. For example, the arm automatically unclamps when the elevating mechanism is operated, also the head automatically unclamps when power head traverse occurs. In order to protect the operator against injury, the handwheel is automatically uncoupled when the head is traversed by power. Also, as stated, the spindle feed is equipped with an automatic power throw-out which disconnects the power to the feed mechanism in the event that the dial is set to feed beyond the limit of spindle feed travel, thus protecting the feed mechanism against abuse.

It has been another object of the inventor to provide a radial drill which is quickly responsive to the controls, thus effecting a saving in time and effort and speeding up production. The hydraulic control system is instantaneous in action so that there is little or no time delay after the control levers have been actuated. An improvement is incorporated in the design of the driving mechanism to permit the interchangement of the gears, when higher or lower speed ranges are desired.

The several control levers for operating the radial drill are appropriately grouped according to the function they perform. For example, the arm elevating and clamping lever and the column clamp control lever are placed closely together. The head traverse lever and the head clamp control likewise are grouped together. Therefore, the operator is enabled to position the arm and head over the work and clamp it in place very quickly with a minimum of lost motion.

Other objects and certain advantages will be more fully apparent in the description of the accompanying drawings, in which:

Figure 3 is a general view looking toward the outer end of the arm of the radial drill.

Figure 8 is a sectional view taken on line 8—8, Figure 3, illustrating, in further detail, the reversing and speed change gearing for the spindle.

Figure 9 is a sectional view taken on line 9—9, Figure 8, further illustrating the subject matter of Figure 8.

Figure 10 is a sectional view taken on line 10—10, Figure 8, showing the pump for the system.

Figure 11 is a sectional view taken on line

11—11, Figure 8, detailing the power reversing clutches.

Figure 12 is a fragmentary sectional view taken on line 12—12, Figure 11, further illustrating the clutches.

Figure 13 is a sectional view taken on line 13—13, Figure 12, detailing the clutch operating parts.

Figure 2:
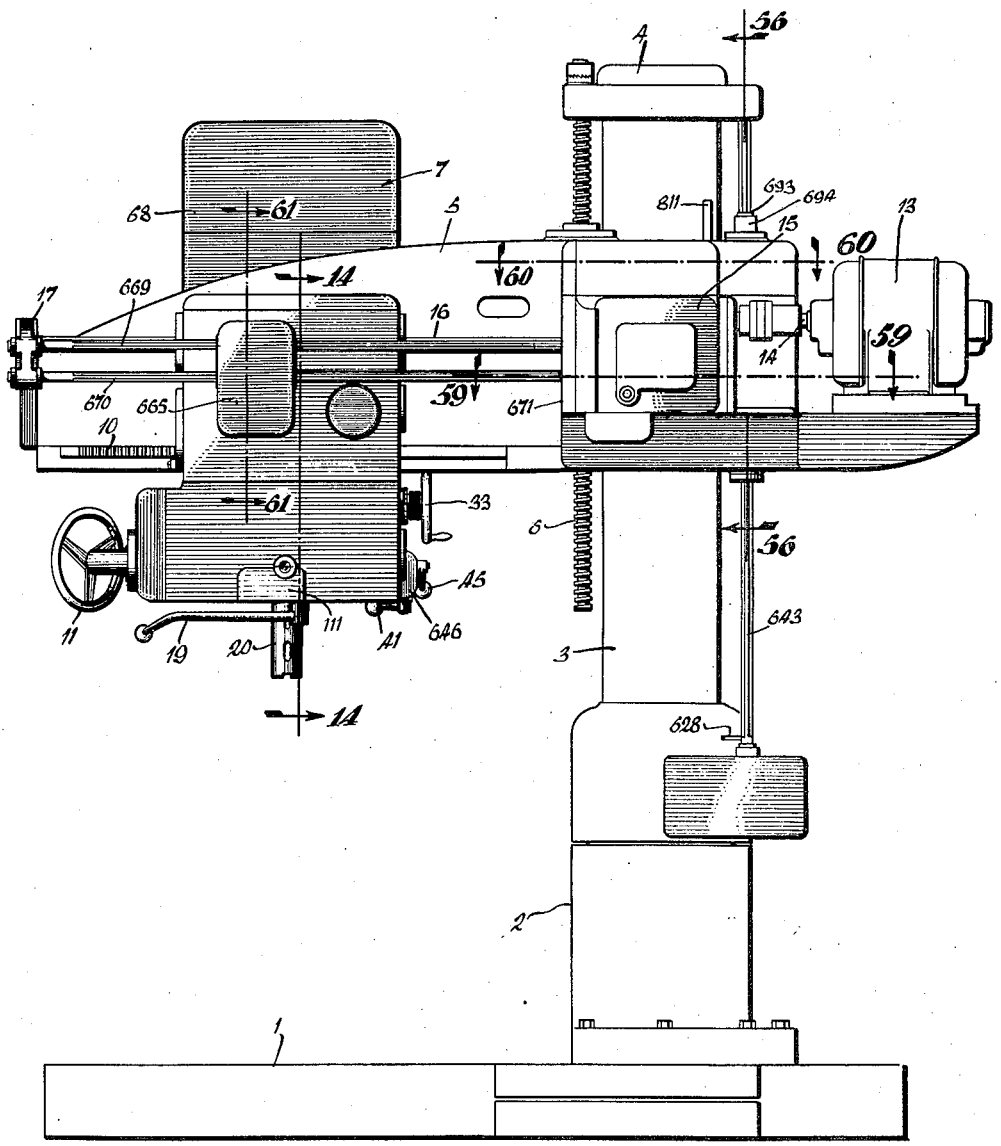
Figure 2 is a general rear view of the radial drill illustrated in Figure 1.

Figure 14 is a sectional view taken on line 14—14, Figure 2, illustrating the main control or power coupling lever for the drill spindle.

Figure 15 is a sectional view taken on line 15—15, Figure 14, further illustrating the main control lever and the main hydraulic shift control valve operated by the main control lever for controlling flow of fluid to the speed and feed control valves.

Figure 16 is a sectional view taken on line 16—16, Figure 15, further illustrating the operative relationship of the main control lever and the main hydraulic shift control valve (shown in position permitting feed and speed gear changes).

Figure 5:
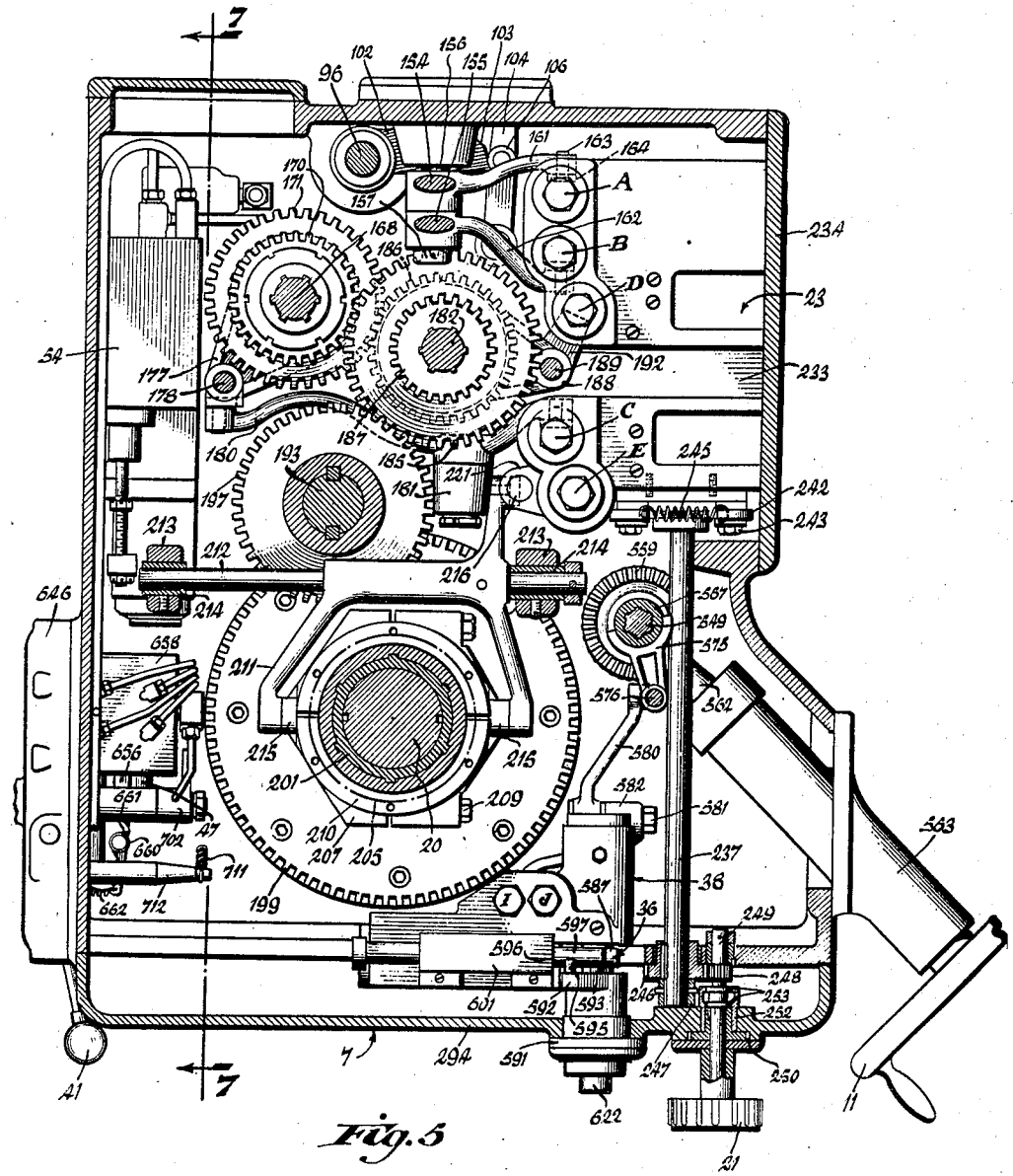
Figure 5 is a sectional view taken on line 5—5, Figure 1, illustrating, primarily, the spindle speed selector and the shifting means for the speed change gears.

Figure 17 is a fragmentary sectional view taken from Figure 5 and showing the spindle speed control valve substantially separately.

Figure 18 is a sectional view taken on line 18—18, Figure 17, illustrating the detent device for accurately setting and holding the control valve in the selected position.

Figure 19 is a sectional view taken on line 19—19, Figure 18, illustrating the details of the valve.

Figure 20 is a sectional view taken on line 20—20, Figure 19, illustrating a detent arrangement for one of the plungers.

Figure 21 is a diagrammatic view illustrating the arrangement of the passageways between the speed control valve and the plungers.

Figure 1:
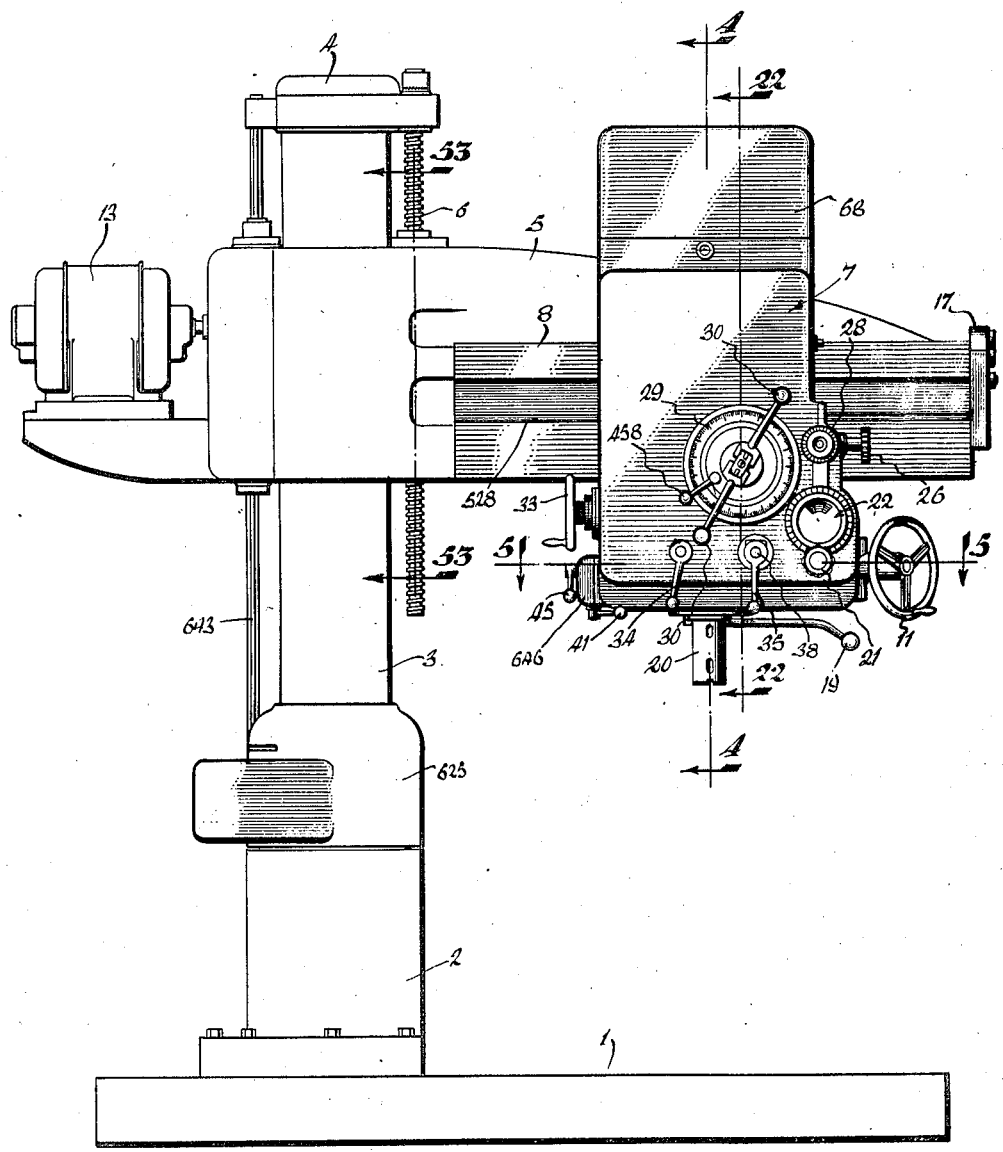
Figure 1 is a general front view of a radial drill embodying the various features of the present invention.

Figure 22 is a sectional view taken through the head on line 22—22, Figure 1, illustrating, primarily, the feeding mechanism for the drill spindle.

Figure 23 is a sectional view taken on line 23—23, Figure 22, detailing one of the roller bearings supporting the head on the rail and its adjustment means.

Figure 24 is a sectional view taken on line 24—24, Figure 23, further illustrating the roller bearing adjustment means.

Figure 25:
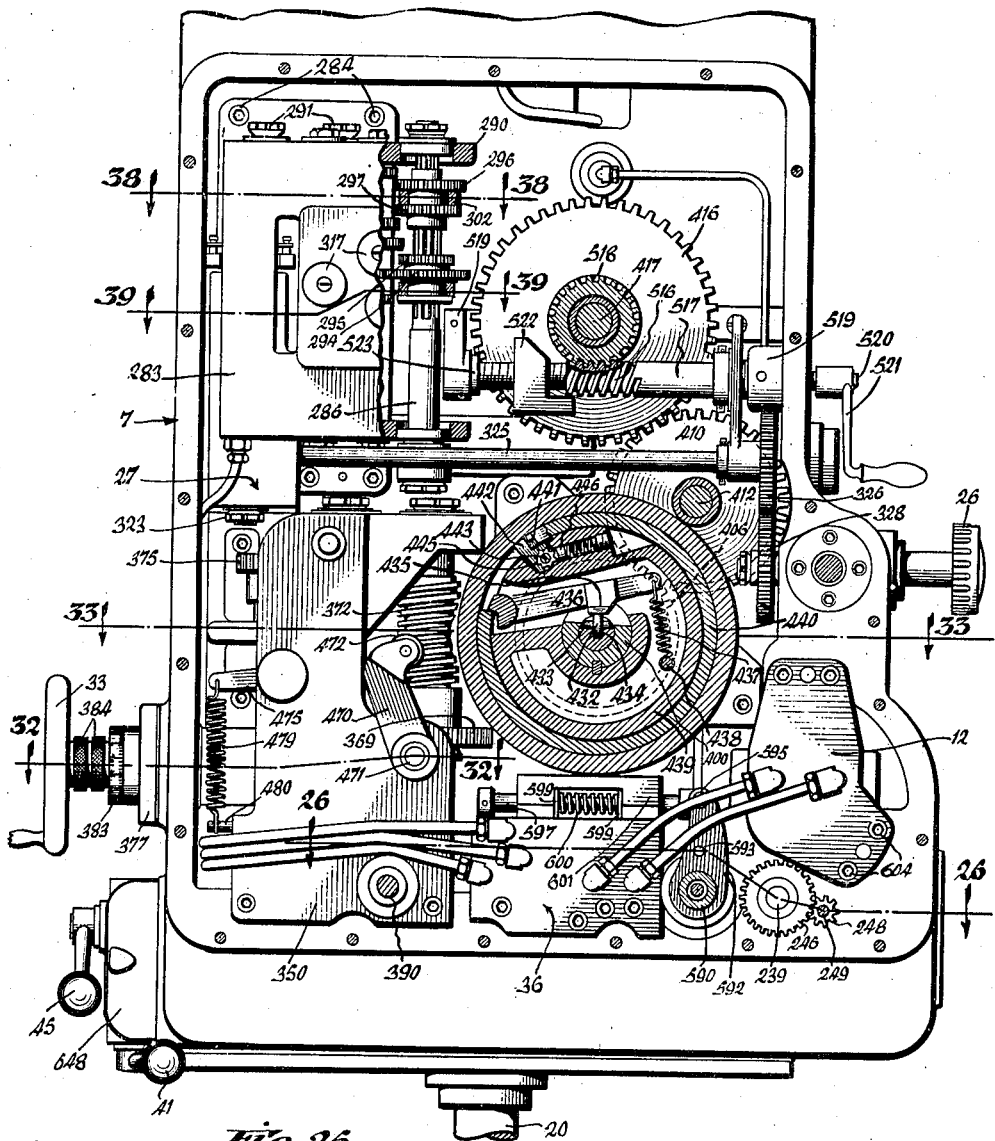

Figure 25 is a sectional view taken on line 25—25, Figure 22, illustrating the arrangement of parts at the front of the head particularly showing the feed shift control means and the various valves.

Figure 26 is a sectional view taken on line 26—26, Figure 25, illustrating primarily, the head traverse general control valve.

Figure 27 is a sectional view taken on line 27—27, Figure 26, illustrating the head traverse control valve, the head traverse motor, and the connections between those units.

Figure 28 is a sectional view taken on line 28—28, Figure 26, illustrating the head traverse and clamp control valve, and the head traverse transmission for power and hand operation.

Figure 29 is a sectional view taken on line 29—29, Figure 28, showing the head traverse motor and transmission diagrammatically.

Figure 30 is a fragmentary front view of the head showing in enlarged detail, the speed and feed control dials and knobs.

Figure 31 is a sectional view taken on line 31—31, Figure 30, further detailing the subject matter of Figure 30.

Figure 32 is a sectional view taken on line 32—32, Figure 25, illustrating the hand means for feeding the spindle.

Figure 33 is a sectional view taken on line 33—33, Figure 25, illustrating the transmission connections to the spindle for either hand or power feed.

Figure 34 is a sectional view taken on line 34—34, Figure 33, illustrating the automatic stop means for the drill feed.

Figure 35 is a sectional view taken on line 35—35, Figure 34, further illustrating the transmission shown in Figure 33.

Figure 36 is a sectional view taken on line 36—36, Figure 33, showing the transmission in detail.

Figure 37:
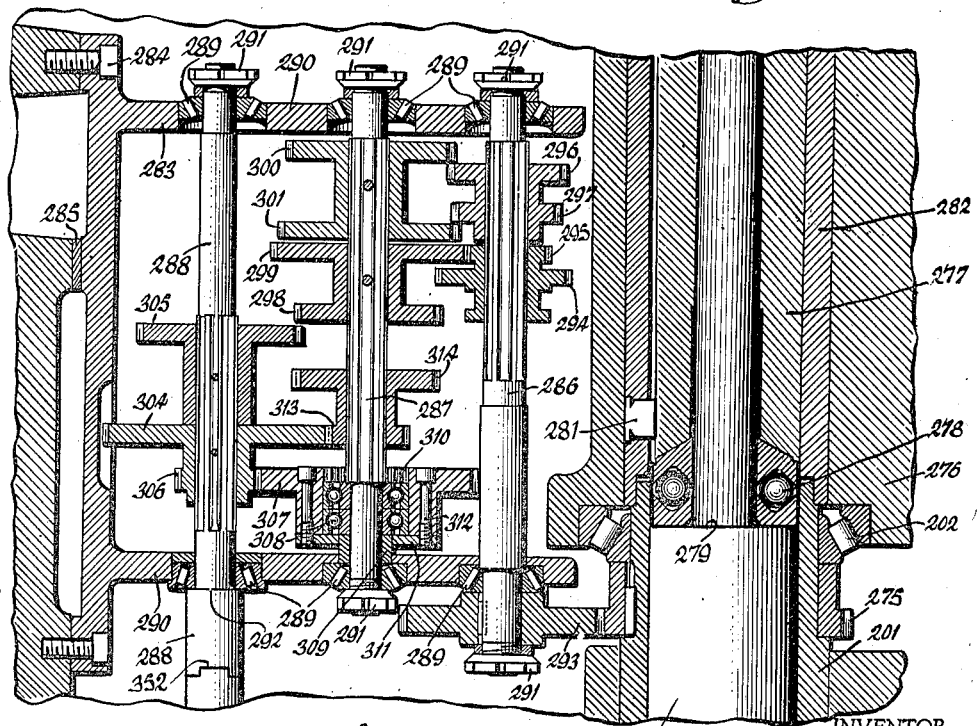

Figure 37 is a developed sectional view of the feed transmission leading from the spindle.

Figures 38, 39:
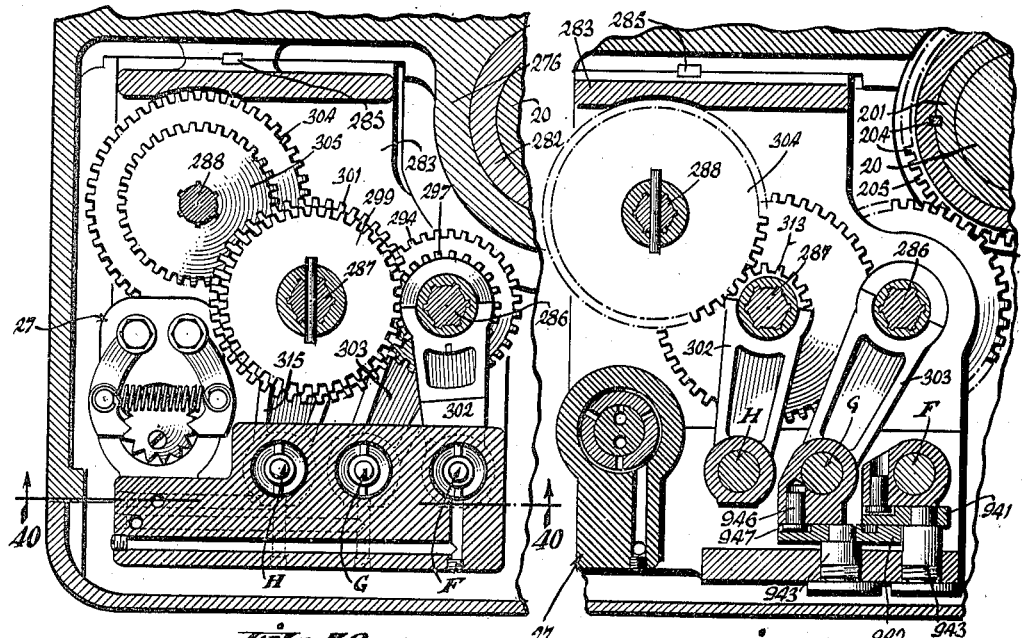

Figure 38 is a sectional view taken on line 38—38, Figure 25, illustrating the shifting yokes, the operating plungers, and the position detent for the feed shifting mechanism.

Figure 39 is a sectional view taken on line 39—39, Figure 25, illustrating the interlock between certain of the shifting plungers of the feed mechanism.

Figure 40 is a sectional view taken on line 40—40, Figure 38, further detailing the feed shifting mechanism.

Figure 41 is a sectional view taken on line 41—41, Figure 40, illustrating one of the shifting plungers and its yoke connection to the gears it shifts.

Figure 42 is a sectional view taken on line 42—42, Figure 40, illustrating another of the shifting plungers.

Figure 43 is a sectional view taken on line 43—43, Figure 40, illustrating the third of the shifting plungers.

Figure 44 is a sectional view taken through the feed control valve.

Figure 45 is a diagrammatic view illustrating the arrangement of the passageways between the feed control valve and the plungers.

Figure 46 is a sectional view taken on line 46—46, Figure 3, illustrating the operating means for the feed control valve.

Figure 47 is a sectional view taken on line 47—47, Figure 46, illustrating the indicator means for the feed change.

Figure 48:
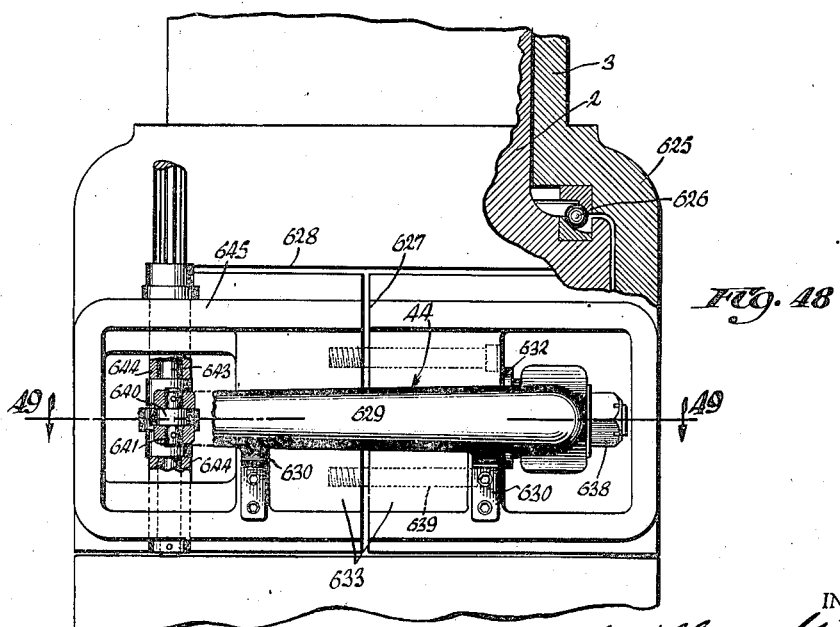

Figure 48 is a fragmentary side view of the column with the column clamp cover removed and certain of the parts broken away for illustrating the column clamp.

Figure 49:
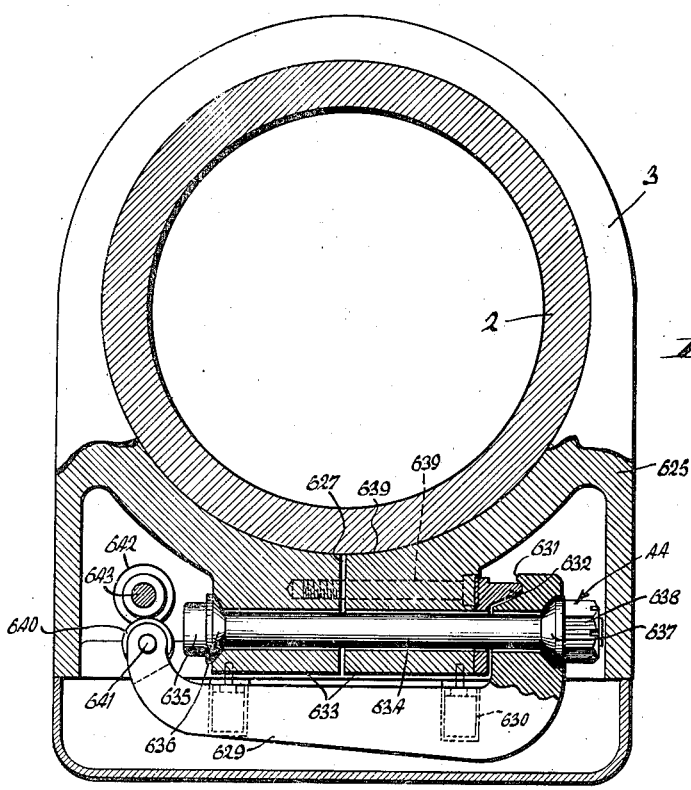

Figure 49 is a sectional view taken on line 49—49, Figure 48, further illustrating the column clamp.

Figure 50 is a fragmentary view, enlarged out of Figure 2, illustrating the transmission casing for the arm elevating gears.

Figure 51 is a sectional view taken on line 51—51, Figure 50, illustrating the clutch operating connections for the arm elevating transmission.

Figure 52 is a sectional view taken on line 52—52, Figure 51, illustrating the arm elevating transmission in detail.

Figure 53:
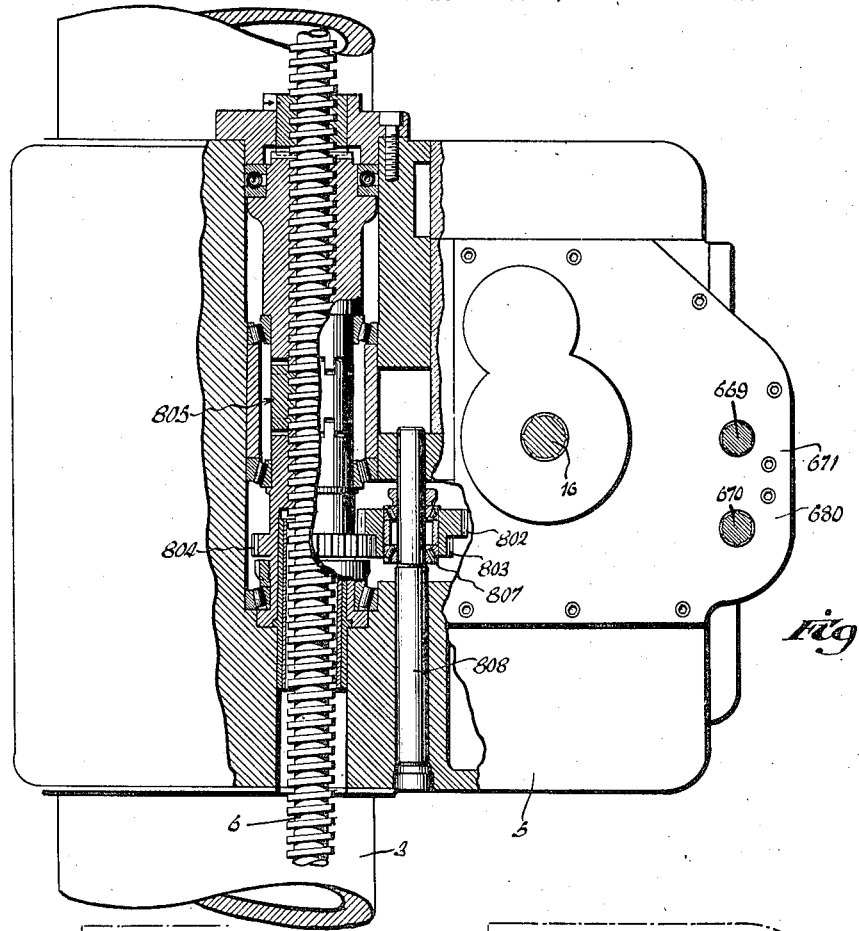

Figure 53 is a sectional view taken on line 53—53, Figure 1, illustrating the elevating nut and the transmission connection thereto.

Figure 54:
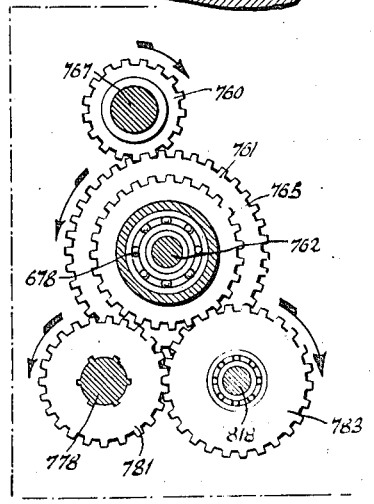

Figure 54 is a sectional view taken on line 54—54, Figure 52, diagrammatically illustrating the reversing gear for the elevating nut.

Figure 55:
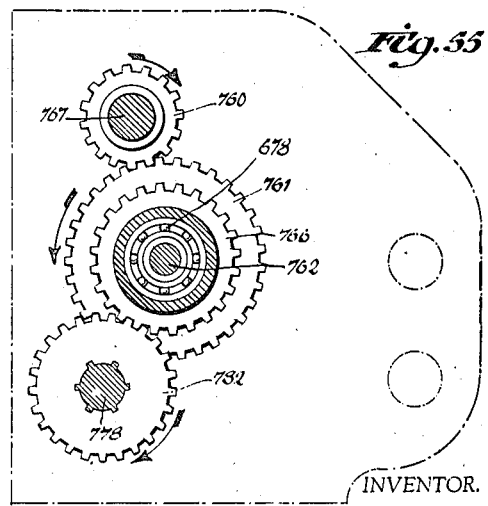

Figure 55 is a sectional view taken on line

55—55, Figure 52, illustrating the direct driving gears of the elevating nut diagrammatically.

Figure 56 is a sectional view taken on line 56—56, Figure 2, illustrating the arm clamps and the operating connection thereto as well as the connection to the column clamp.

Figure 57 is a sectional view taken on line 57—57, Figure 56, illustrating the connections from the control rods to the column clamp, and the arm clamp and elevating nut control.

Figure 58 is a sectional view taken on line 58—58, Figure 57, further illustrating the subject matter of Figure 57.

Figures 59, 60:
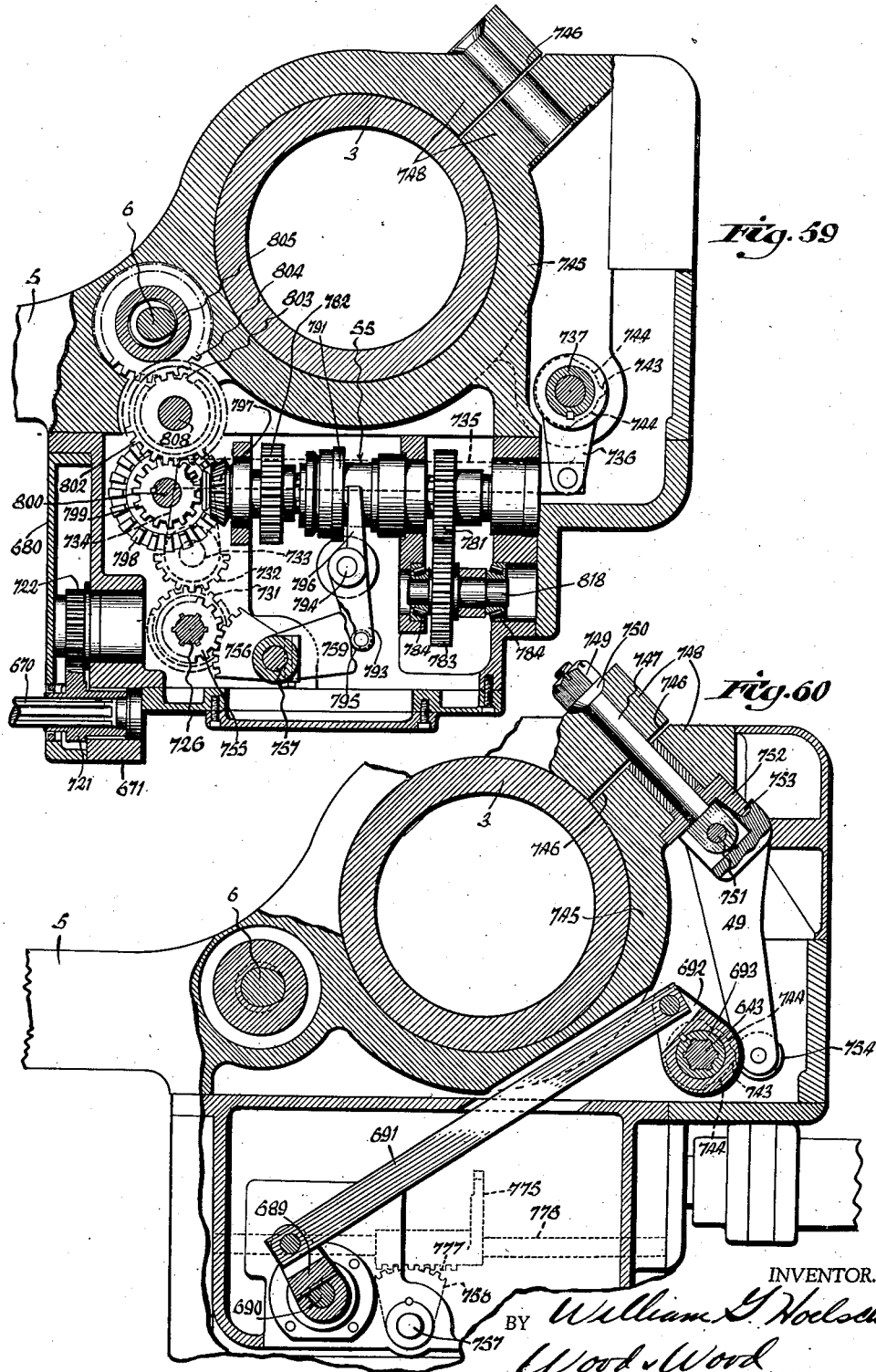

Figure 59 is a sectional view taken on line 59—59, Figure 2, further illustrating the arm elevating nut transmission.

Figure 60 is a sectional view taken on line 60—60, Figure 2, illustrating one of the arm clamps.

Figure 61:
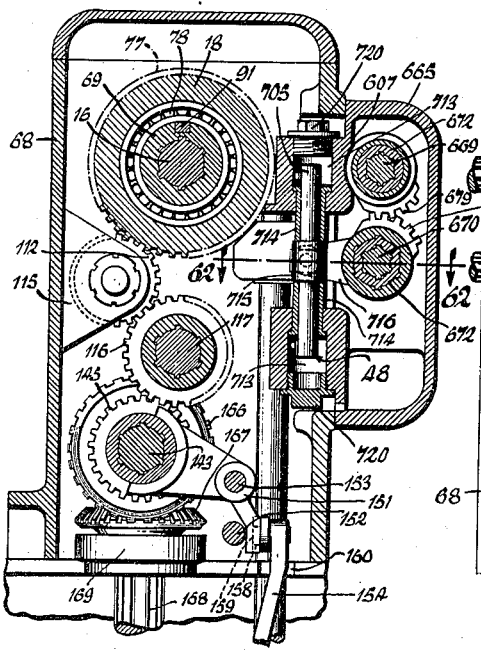

Figure 61 is a sectional view taken on line 61—61, Figure 2, illustrating the elevating nut and arm clamp control plunger.

Figure 62:
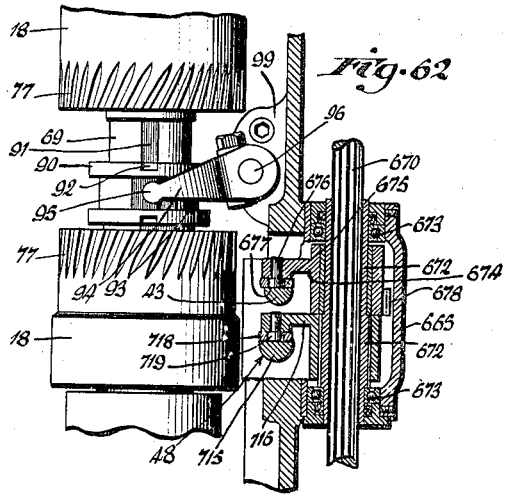

Figure 62 is a sectional view taken on line 62—62, Figure 61, illustrating the mounting of the plunger actuated levers for column clamping, and arm clamping and elevating nut control.

Figure 63:
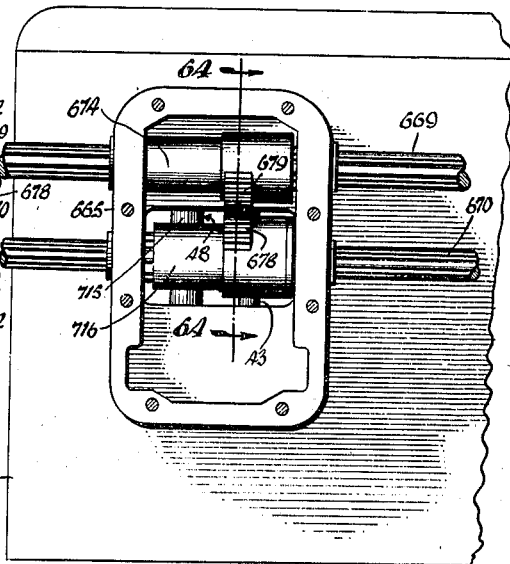

Figure 63 is a fragmentary view of the rear side of the arm showing the aforesaid control connections with the cover removed.

Figure 64:
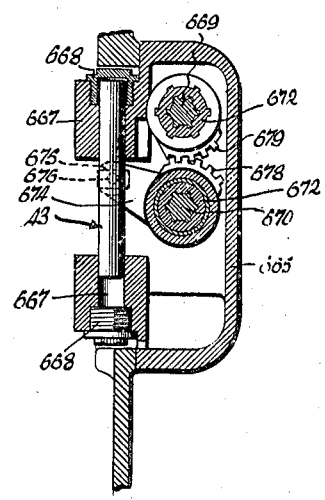

Figure 64 is a sectional view taken on line 64—64, Figure 63, illustrating the column clamp control plunger.

Figure 65 is a fragmentary view showing the control box and levers for the arm clamp and elevating nut control, and the column clamp.

Figure 66 is a sectional view taken on line 66—66, Figure 65, showing the operating connections to the valves of Figure 65.

Figure 67 is a sectional view taken on line 67—67, Figure 65, illustrating the column clamp control lever.

Figure 68 is a rear view of the control box of Figure 65, illustrating the arm clamp and elevating control lever.

Figure 69 is a fragmentary bottom plan view of the control box, illustrating the column clamp control lever.

Figure 70 is a sectional view taken on line 70—70, Figure 67.

Figure 71:
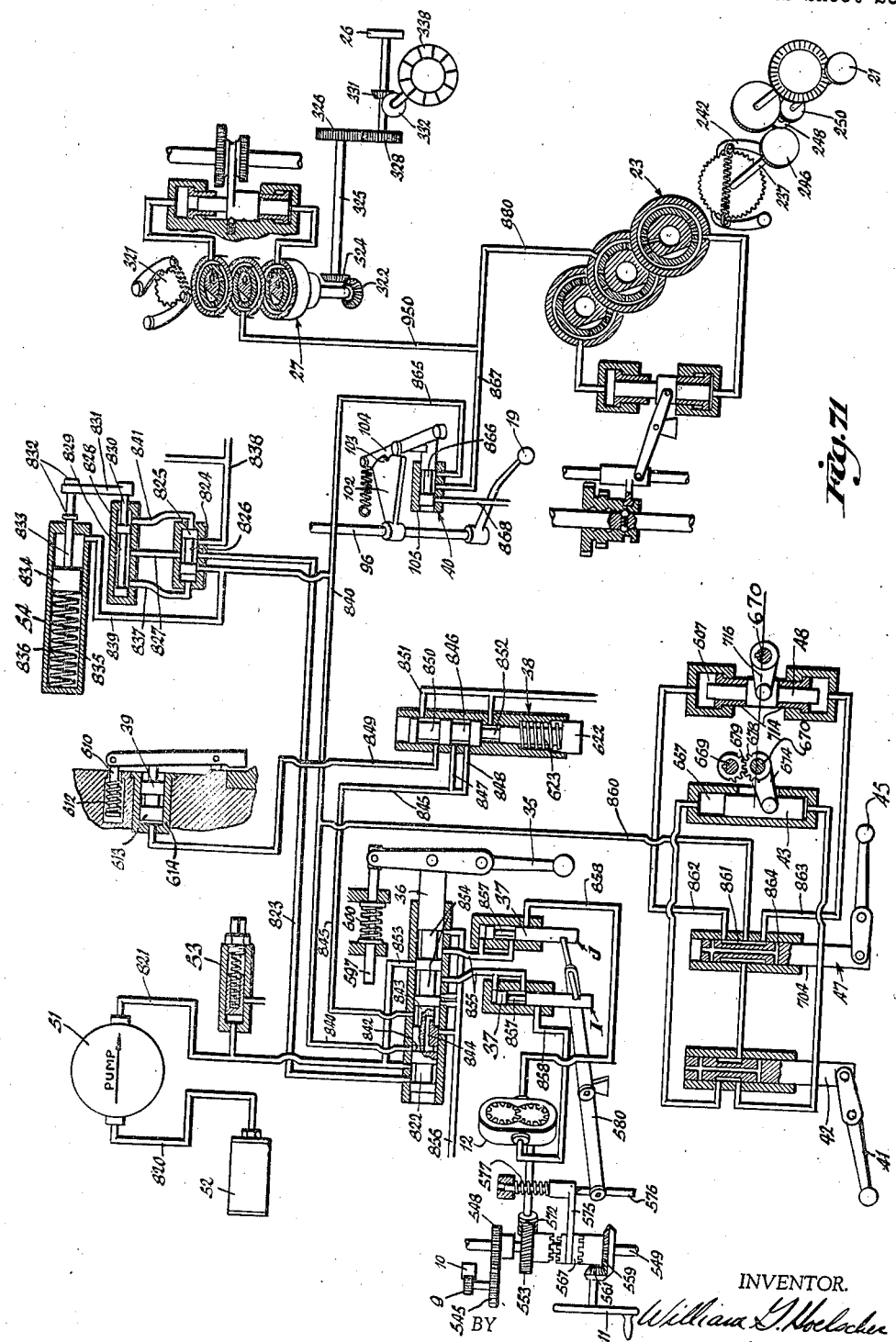

Figure 71 is a general diagrammatic view illustrating the arrangement of the various valves, hydraulic devices, shifting plungers, interlocks, and connections of the present invention.

The radial drill in which the present improvements are disclosed is of the following general structure:

A base 1 includes a stump 2 rising from one end thereof. A column 3 is rotatably supported on the stump and includes a cap 4 at its upper end. An arm 5 is slidably supported on the column and adapted for raising and lowering movements to approximate the position of the drill with respect to the work which is supported on the base for drilling. The arm is supported and elevated by means of a screw 6. A drill head 7 is slidably disposed, for horizontal movement, on the arm which projects radially from the column. The arm includes a rail 8 for this purpose. A driven pinion 9 (Figure 28) engages a rack 10 fixed along the rail 8. This pinion is rotated for traversing the arm either by means of a hand wheel 11 or a hydraulic motor 12 (see Figure 29).

The power for the drill is an electric motor 13 mounted on the short end of the arm. The power is first directed through a shaft 14 into a gear box 15 containing, essentially, the arm elevating gearing and its control. From the shaft 14 the power is carried without break to a shaft 16 which traverses the drill head 7 and is supported in a bracket 17 at the outer end of the arm 5. Within the drill head the drive is taken from this shaft through reversing clutches 18—18 (Figure 11) directly controlled by a power control lever 19.

From the reversing clutches the power proceeds to the spindle 20 through speed control gearing. The shifting of this speed control gearing is accomplished by means of a hydraulic system. The system provides 32 speed changes. A knob 21, operating a dial 22 (Figure 30) moves a hydraulic valve 23 (Figure 19) to the selected speed. Plungers operate the gear shifter yokes.

From the spindle, the drive proceeds through feed change gearing to a pinion 24 (Figure 4) engaged between the rack teeth of the spindle and a counterweight 25. This gearing is controlled for spindle feed rate changes by means of a knob 26, operating a dial 28 (Figure 30), which moves a hydraulic valve 27 (Figure 44).

The amount of feed is controlled by means of a setting and indicator dial 29. The feed connection is controlled manually by means of levers 30—30 and stopped automatically by means of dogs 31 and 32 (Figure 34). A hand wheel 33 provides for manual feed. A lever 34 couples either the hand wheel or the power feed.

Power traverse of the head is controlled by means of a lever 35 which operates a valve 36 for this purpose (Figure 26). This valve controls the reversing valves 37—37 contained for the traverse motor 12 (Figure 71). These valves also act as plungers to couple the traverse motor 12 to the traverse gear train when the valve is actuated in either direction for power traverse. A head clamp press button valve 38 binds automatically for clamping when pressed and is released automatically for releasing the head clamp when the head traverse lever 35 is operated for head traverse. A hydraulic plunger operates the head clamp 39 (Figure 22). The power control lever 19 operates a valve 40 (Figure 15) which controls the flow of fluid to the spindle feed and speed control gearing and prevents gear shifting while the power is in neutral.

A column clamp lever 41 operates a valve 42 (Figure 70) which controls the operation of a shifter plunger 43 at the back of the head (Figure 64). This plunger operates the column clamp 44. An arm clamp and elevating control lever 45 operates a valve 47 (Figure 70) which controls a plunger 48 (Figure 61). The plunger operates the arm clamps 49 and shifts the reversing clutches 50—50 and braking clutch 55 coincidentally. Consequently the clamp is always released when the elevating or lowering operation begins.

The pump 51 operates constantly while the motor 13 is running, drawing the oil in through a filter 52 (Figure 7) in the sump of the system. A safety valve 53 releases overload pressures (Figure 71). The oil is directed to an accumulator 54 which supplies the oil to the devices at uniform pressure. The fluid, delivered by the constantly operating pump after the accumulator is filled, is utilized for lubrication of the various parts of the drill.

*The power of to the head*

The electric motor 13 is bolted on a short extension of the arm. The motor shaft 14 is journaled in bearings 60—60 in the respective end walls of the box or casing 15 (Figure 52). The casing is attached to the arm by means of screws 61 and includes cover plates 62—62 at its respective ends. A pinion gear 63 is fixed to the outer end of the motor shaft. This gear is constantly in mesh with a gear 64 fixed to a sleeve 65 journaled in spaced bearings 66—66 in a thickened end wall of the casing. The outer races of the bearings are held rigidly in position and the inner races fixed to the sleeve. The sleeve provides a splined socket for the splined driven end of the drill head power shaft 16. The outer end of the shaft 16 is journaled in the end bracket 17 fixed to the end of the arm by means of bolts 67.

The head 7 includes a rear casing section 68 (Figures 11 and 12) which houses the reversing gearing for the spindle, part of the spindle driving transmission and the hydraulic pump 51. The splined shaft 16 passes through a long splined sleeve 69 (Figure 12) the ends of which are rotatably supported in bearings 70—70 carried by respective bearing brackets 71—71. These brackets have circular flanges 72 secured to the ends of the casing by screws 73. The bearings are fixed between washers 74, engaging shoulders on the driving sleeve 69, and nuts 75 screwed on the respective ends of the driving sleeve. The bearing brackets include packing 76, encircling the ends of the driving sleeve for sealing the casing 68 against loss of lubricant at these points.

Reversing driving gears 77—77 are loosely rotatably mounted on the sleeve 69 toward the respective ends thereof. These gears in each instance are journaled on spaced bearings 78 fixed on the driving sleeve. Within each gear 77—77 is a clutch element 79 keyed to the driving sleeve and supporting a clutch ring 80 carrying a friction band 81. The rings are split and are normally in relaxed position exerting no gripping action on the internal surfaces of the gears 77—77.

Levers 82 are mounted within the elements 79. These levers have ends engaging, in each instance, an end of a split ring. The ring engaging end of each lever includes a trunnion journaled in the element 79 and having a notch on one side against which is abutted the end of the ring. The other end of the ring is engaged against a pair of adjustment lugs 83 as hereinafter described. The opposite end of each lever carries a roller 84 normally riding the sleeve 69 and held against the sleeve by means of a tension spring 85 contained within the element 79 and secured between a pin 86 of the element and the roller end of the lever.

The rings are held in position by means of rods 87 having their heads engaging one edge of the ring. The other edge of the ring is engaged against a shoulder of the clutch element 79. The lugs 83 are adjustable and are drawn together by means of a screw 89 wedging the tapered contact portions of the sections more tightly against the end of the ring for adjusting the normal position of the clutch ring relative to the gear. A spring 88 is disposed on the screw 89 normally spreading the elements 83 against the action of the screw.

The clutch shifter 90 is loosely slidably mounted on the sleeve 69 between the gears 77—77. A clutch actuating key 91 is mounted in a longitudinal groove in the sleeve and includes coupling extensions 92 projecting radially into slots in the end faces of the sleeve. The ends of the key 91 are feathered to permit them to pass alternately under the rollers 84—84 of the respective clutches for lifting the particular roller and engaging its clutch. A yoke ring 93 engages in an annular groove of the shifter sleeve, and a yoke 94 engages the notches 95 of the ring. This yoke is pinned to a rod 96 (Figure 14). The rod 96 is vertically disposed in upper and lower bearings 97, 98, mounted in lugs 99 of the casing structure. A ball bearing 100 is included adjacent the lower bearing 98 and is held in place against the lower bearing by means of a plug 101. The hand lever 19 is fixed to the lower extended end of this rod 96 and extends to the front of the head.

For a purpose which will be described in detail later in the description of the hydraulic system, the rod 96 also operates the spindle feed and drive control valve 40. A cam arm 102 is pinned to the rod and includes a notch 103 in its outer end. A valve operating lever 104, connected to the valve plunger, is pivoted on the valve body 105 and includes a roller 106 intermediate its ends riding the notched outer end of the cam arm 102. The roller is spring urged against the arm by means of a spring 107 fixed to and between the outer end of the lever and a pin 108 on a plate 109. The plate 109 is secured around the margin of an opening 110 which provides access to the valve 40 and operating parts and is covered by a cover plate 111. This valve 40 opens and closes the oil supply to the spindle speed and feed shift valves 23 and 27 as shown in the diagram (Figure 71). When the main control lever is in neutral position, the valve 40 is closed. The circuits to the control valves are blocked and the gears cannot be shifted since there is no pressure available for shifting.

A reversing idler gear 112 is provided in mesh with one of the gears 77. This gear 112 (Figure 6) is journaled on spaced bearings 113 on a stub shaft 114 fixed against rotation in support lugs 115 of the casing structure. The power is transmitted from gear 77 for the drill return operation through this idler gear 112 to a gear 116 fixed on a splined shaft 117. For the feed and rotation of the drill in boring, a slower speed is obtained through the other gear 77 meshing directly with a large gear 118 fixed to shaft 117.

The pump 51 (Figure 10) is fixed in an opening in the casing rear wall including for this purpose a flange 119 which fits against an inside flange 120 of the wall. The details of the pumping circuit will be described subsequently. It is pointed out here that the pump is driven directly from the power shaft 16 by means of a gear 121 fixed to sleeve 69 and therefore is in operation at all times when the electric motor is operating. The gear 121 drives a gear 122 journaled in a bearing 123 in the casing wall. Bearing 123 is covered by a plate 124. A bevel gear 125 is fixed axially to gear 122 and drives bevel gear 126 which is axially fixed to a spur gear 127 journaled in a bearing 128. The gear 127 meshes with a gear 129 keyed to the pump shaft 130 and journaled in a bearing 131.

Spindle drive

The gears 116 and 118 transmit rapid drill return movement and slower power or drilling movement respectively as controlled by the main lever 19. They are fixed to the same shaft 117. Four speed changes are obtained in the upper casing 68 and these four are stepped up to thirty-two speeds (20 R. P. M. to 1600 R. P. M.) in the lower end of the main head casing 135 at the connection to the spindle 20.

In addition to gears 116 and 118 four other gears, namely, 136, 137, 138 and 139, large to small, respectively are fixed on shaft 117. These gears with gear 116 are in a cluster on the splined section of the shaft. End gears 136 and 139 are pinned to hold the cluster against longitudinal displacement. End bearings 140 support the shaft for rotation and nuts 141 fix the shaft with respect to the bearings. The inner bearing 140 is in the inner lug 115 of the casing and the power gear 118 is fixed on the end of the shaft beyond the lug for clearance purposes.

Just below shaft 117 another shaft 143 is rotatably supported in bearings 144 in the end wall and the lug 115. This shaft is splined and carries shiftable gears 145, 146, 147, and 148 component to the gears 136, 137, 138, and 139. These gears are in independently shiftable sets of two gears each. Each set is assembled to provide an annular space 149 in which the shifter yokes 150, 151 (Figure 8) engage. These yokes are fixed on rods 152, 153 respectively which rods are slidably mounted in the end wall and lug 142 of the casing.

Bellcrank levers 154, 155 actuate the respective yokes. The levers are pivotally mounted on a stud 156 screwed into the wall of the lower casing and projecting inside thereof. A collar 157 is pinned on the stud to hold the levers in place. The upper ends of the levers (Figures 8 and 61) are engaged with arms of the yokes 150, 151. The connection, in each instance, consists of a stud 158 secured in the bellcrank lever engaged in a vertical slot 159 in the yoke arm. These upper arms of the levers 154, 155 pass through a clearance slot 160 in the main head casing top wall and the lower arms 161 and 162 project over and are in yoke connection with shifter plungers A and B (Figure 5). The connections consist of studs 163 rotatably mounted in the lever arm and having headed ends engaged in slots 164 of the plungers. The bearings 140, 144 in the casing end wall are covered by a cover plate 165 providing for access to these bearings for assembly purposes.

Figure 4:
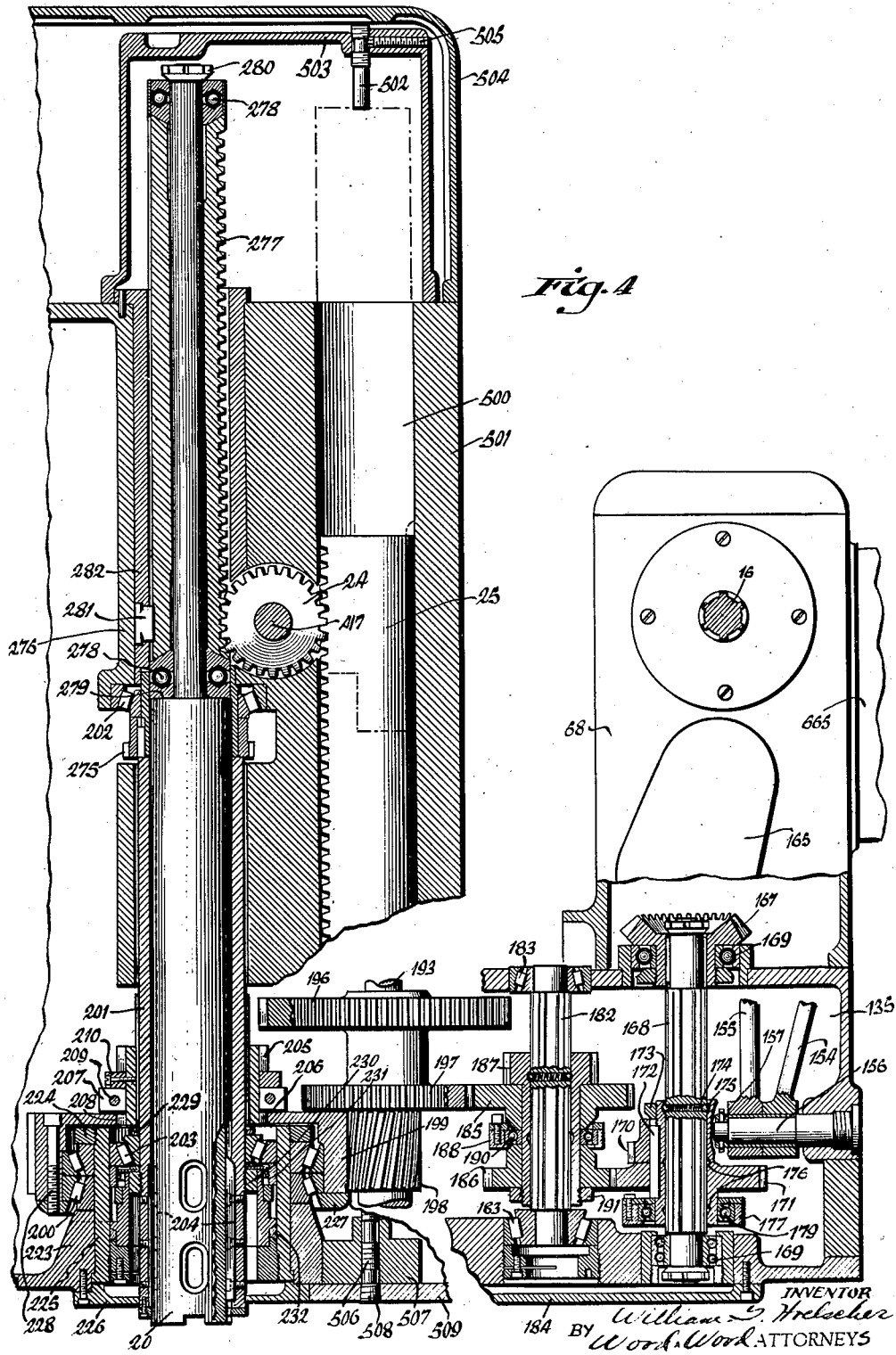
Figure 4 is a sectional view taken on line 4—4, Figure 1, illustrating generally the drill spindle and its drive and the counterweight for the spindle.

A bevel gear 166 is fixed to the shaft 143 and meshes with another bevel gear 167 fixed to the upper end of a vertical shaft 168 journaled in bearings 169, 169 in the upper and lower walls of the main casing (Figure 4). The gear 167 is journaled directly in the upper bearing. A shiftable gear cluster consisting of gears 170, 171 is slidably mounted on the splined section of shaft 168. The gears are held together by a key 172 and a collar 173 screwed on the hub of the large gear, holding the smaller gear against the larger. This cluster is shiftable to three positions. These positions are accurately established and the gear positions maintained by means of a detent arrangement. For this purpose the shaft has a diametric bore having a compression coil spring 174 therein pressing balls 175 outwardly one at each end, for engagement in pairs of spaced detent depressions 176 in the internal bore of the gear cluster when the gear cluster is at the correct shifted position.

This cluster of gears 170, 171 is shifted by means of a yoke 177 (Figure 5) slidably mounted on a vertical rod 178 fixed in the upper and lower walls of the main casing. The yoke carries a ball bearing 179 providing a connection in which the gear cluster may rotate and upon which the gear cluster is supported. A shifting lever 180 is pivoted on a lug 181 on the lower wall of the main casing and has one end coupled to the yoke and the other coupled to a shifter plunger C. The coupling means employed are the same as those described heretofore and need not be described here.

Another vertical shaft 182 is journaled in bearings 183, 183 in the upper and lower walls of the main casing. Access to the lower bearings 169, 183 is had by removal of a cover plate 184 fixed on the lower wall of the casing. A shiftable cluster of three gears 185, 186, and 187 is slidably mounted on the splined portion of the shaft 182. A detent arrangement of the same type as that on shaft 143 provides for two positions of this cluster and likewise a yoke 188 provides for shifting and is slidably mounted on a rod 189. The ball gearing 190 carried by the outer end of the yoke for permitting rotation of the gear cluster is fixed between gears 185, 186 and these parts are held on the hub of and against gear 187 by means of a nut 191. An arm 192, fixed to yoke 188, engages in a notch in shifter plunger D.

Another shaft, namely, 193 (Figure 22) is journaled in bearings 194, 194 fixed in the upper and lower walls of the main casing. The lower bearing is accessible through cover plate 195. The shaft has three gears, namely, 196, 197 and 198 fixed thereto. These gears are not shiftable. The small gear 198 is in constant mesh with a bull gear 199 loosely journaled on a double bearing 200 carried by the lower wall of the main casing and disposed on the axis of the spindle 20.

A driving sleeve 201 for the spindle is supported and journaled in an upper roller bearing 202 in a lug of the casing and a roller bearing 203 adjacent the double bearing 200. The spindle 20 is in splined connection within this sleeve 201 by means of keys 204 and provides the conventional chuck for reception of the drill.

A cluster of two gears 205, 206 is in splined connection with the driving sleeve and is shifted by means of a yoke 207 (Figure 5). One of the gears, namely, 206, is adapted to mesh with internal gear 208 in the bull gear 199 and the other with gear 196 for coupling either of these gears to the spindle. The yoke is split and encircles the gear cluster, fitting in the annular space between the gears. Screws 209 hold the yoke section together. A thrust collar 210 supports the cluster on the yoke. A bifurcated lever 211 fixed on a rock shaft 212 slides the gears by means of the yoke. The rock shaft is journaled in plain bearings 214 in lugs 213 depending from the upper wall of the main casing. The bifurcated end of the lever straddles the yoke and is connected thereto by means of trunnions 215, 215.

The outer end of the lever is connected to a shift rod 216 (Figure 18) by the coupling means heretofore described. This cluster of gears has two positions and the rod 216 includes for this purpose two detent grooves 217 cooperating with detents 218 in the valve body (Figure 20). The shift rod is coupled to shifting plunger E by means of an arm 219 extending into a notch 220 in the plunger. The shift rod slides in lugs 221 of the valve body.

The plungers A, B, C, D, and E are in the valve 23 and provide, through passageway arrangement and appropriate setting, thirty-two speeds. Four speeds are delivered to shaft 143 through the four sets of gears. Thus, shaft 132 receives four speeds. Shaft 182 receives eight speeds, shaft 193, sixteen speeds and the spindle driving sleeve thirty-two speeds. Three positions are provided at shaft 168 since gears 185 and 186 move with respect to 170 and 171. When gear 185 is meshing with 197 and gear 171 with 186, gear 170 may be shifted to mesh with 185. Thus the speeds available at shaft 193 through gear 197 are eight. When gear 187 is in mesh with gear 196 and gear 186 with gear 171, gear 170 may be shifted one notch higher to mesh again with 185. Thus the speeds available at shaft 193 through gear 196 are eight making a total of sixteen speeds either passing through gear 198, bull gear 199 to the spindle, or through gear 196 to gear 205 to the spindle, for a total of thirty-two speeds.

The double bearing 200 is supported on a boss 223 of the lower wall of the casing and held there by means of a collar 224 engaging the top of the bearing. This collar 224 is screwed on a sleeve 225 disposed in the boss and which has a headed lower end seated in a countersink in the bore of the boss. A cover plate 226 encircles the lower end of the driving sleeve 201 and, additionally, holds the sleeve 225 in place. A ring 227 is secured by screws 228 to the underside of the gear 199 and holds the gear on the bearing 200.

The driving sleeve 201 rests on the bearing 203 through a shoulder 229. A nut 230 on the sleeve engages the bearing against the shoulder and secures a packing 231 in place. Additional packing shown generally at 232 seals the spindle driving means for preventing leakage of oil from the head.

The body 233 of the valve 23 (Figure 19) includes a flange 234 which is secured by means of screws 235 to the outer margin of an opening in the side wall of the main head casing with the valve body projecting into the casing. The movable element 236 of the valve is fixed on the end of a shaft 237. As detailed (Figures 17 to 19 inclusive), the valve element 236 is tubular and rotates within a fixed fluid supply sleeve 238 in the body 233. The element 236 includes a multitude of passageways cooperating with the passageways in the fixed sleeve, dependent on the position of the valve, for delivering or exhausting the fluid relative to the shifting plungers A, B, C, D, and E. Certain of these passageways connect with the internal bore 239 of the element for exhaust purposes.

A flanged coupling 240 is fixed in the bore of the element 236 at one end and the shaft 237 is keyed to this coupling. The shaft has thirty-two established rotative positions for the thirty-two spindle speeds as determined by a detent wheel 241 formed integral with and at the extended end of the valve element 236 and by the knob 21. Detent levers 242 are pivoted on screws 243 on the valve body 233. These levers include detent points 244 engaging the wheel from opposite sides. A coil spring 245 draws the upper ends of the levers together for this purpose.

The outer end of the shaft 237 (Figure 26) is keyed in a gear 246 which is rotatably journaled in the front wall of the main casing. A collar 247 holds the gear against the front face of the casing wall. The gear 246 meshes with a gear 248 fixed on a rod 249 having the manipulating knob 21 pinned thereto. The inner end of the rod 249 is journaled in a bearing in the wall of the casing and the outer end in a dial operating gear 250 keyed to the rod. A collar 251 is fixed to the inner end of the rod and holds it against axial displacement. An oil retainer sleeve 252 journals the gear and provides an oil chamber in conjunction with spaced shoulders 253 of the shaft.

The gear 250 is disposed in a recess in a cover plate 254 (Figure 31) and meshes with a large ring gear 255. Gear 255 is fixed to the back face of the dial 22 about the hub thereof, by means of pins 256. A disc 257, fixed to the plate 254 by screws 258 and centered by a stud 259, forms the axial bearing for the dial 22. A circular plate 260 is secured to the fixed bearing disc 257 by means of screws 261 and overhangs the face of the dial for holding the dial on the bearing. The dial 22 includes a body section and a face plate 262 including the speed markings around its margins. These markings move in relation to a mark 263 on an indicator plate 264 fixed to the cover plate 254 above the dial 22. Information concerning the cutting speeds to be used on the various metals with respect to drill sizes is indicated at 265 and may be placed on the dial where it is visible through an opening 266 in the plate 260.

The operator may predetermine the speeds to be used in the drilling operation and may indicate the speed and the order of the speeds used in a given set of drilling operations by means of adjustable indicators 267 on the face of the dial. For this purpose a ring 268 is fixed by means of screws 269 to the dial concentrically thereof. This ring is tapered axially inwardly and the indicators are in the form of clips snapping over the ring. An order number is printed on each spring clip and the clips may be slid to the selected positions adjacent the speed indications on the dial. Thus, when operation number two (Figure 30), which is speed 41 R. P. M., is completed the dial is reset to bring indicator clip number three fixed at speed 54 R. P. M. to position registering with the fixed indicator mark 263. Those clips not in use may be removed or may be slid as shown to a position on the dial where they will not interfere.

As illustrated, there are to be five operations with the order and speed as follows: 126 R. P. M.—41 R. P. M.—54 R. P. M.—257 R. P. M. and 27 R. P. M.

Spindle feed

The feeding movement for the spindle is taken from the rotative movement of the spindle starting from a gear 275 keyed to the spindle driving sleeve 201 (Figure 37). The gear is disposed between a shoulder of the sleeve and the bearing 202 which is secured in a circular recess in the underside of the casing lug 276. The upper end of the spindle is counterturned (Figure 4) and is rotatably mounted within a vertically slidable non-rotatable rack sleeve 277; the teeth of which are in mesh with the feed gear 24.

Axial thrust bearings 278 are provided, the lower disposed between the shoulder 279 of the spindle and the lower end of the rack sleeve, and the upper disposed between the upper end of the rack sleeve and a nut 280. These bearings take the feeding thrusts of the rack sleeve 277 as imparted to the spindle. A key 281 fixed in a fixed bearing sleeve 282 engages a longitudinal groove in the rack sleeve. The upper end of the driving sleeve 201 telescopes into a counterbore of the sleeve 282.

The feed transmission gear change unit (Figure 37) is supported in a bracket 283 attached to the back wall of the main head casing by means of screws 284 and is accurately positioned by means of a key 285. As stated, heretofore, this transmission developes twelve feed changes. Three splined shafts are employed, namely, 286, 287, and 288. Each is journaled vertically in bearings 289 at the top and bottom, fixed in the upper and lower flanges 290 of the bracket 283 and held in position by means of nuts 291 and, in the instance of shaft 288, by means of a shoulder 292.

The first shaft, namely, 286, has a gear 293, meshing with gear 275, keyed on its lower end below the flange 290 and sustained by nut 291. Two slidable gear clusters are provided on this shaft consisting of gears 294, 295 and gears 296, 297 respectively. The second shaft, namely 287, has two gear clusters fixed thereto. One consists of gears 298, 299 component to gears 294, 295, and the other, of gears 300, 301 component to gears 296, 297.

Gears 296, 297 are shifted to one of three positions by means of a yoke 302 engaging an annular groove in the gear cluster and fixed to shift plunger F of hydraulic valve 27 (Figure 43). Gears 294, 295 are shifted by means of yoke 303 engaging an annular groove in the gear cluster and fixed to shift plunger G of the hydraulic valve (Figure 42). Thus four speeds may be imparted to shaft 287.

The third shaft, namely, 288, has a gear cluster fixed thereto, which consists of gears 304, 305, and 306. One of these, namely, 306 is constantly in mesh with a gear 307 rotatably mounted on shaft 287 by means of a double bearing 308. The bearing 308 is fixed between a collar 309 and a shoulder of the shaft 287. An internal gear 310 is provided in gear 307. A plate 311, secured against the underside of the gear 307 by means of screws 312, holds the gear 307 down upon the contained bearing through the flange constituted by the internal gear teeth. A gear cluster consisting of gears 313, 314 is slidably mounted on splined shaft 287. Gears 313, 314 are component to gears 304, 305 respectively and gear 313 to internal gear 310 as well. Thus shaft 288 may be driven at any one of twelve speeds by virtue of the four positions of gear clusters 313, 314.

A yoke 315 (Figure 41) engages in an annular groove in gear cluster 313, 314 and is pinned to shift plunger H of the hydraulic valve 27. This plunger H has three coupling positions whereas the other two plungers F, G have two coupling positions with neutral in each instance.

All gear coupling positions are accurately established and maintained by means of detents 316 carried by plugs 317 screwed into the bracket 283 and engaging, for each gear coupling position, with the properly located detent recesses 318 of the yokes. The further arrangement of the plungers F, G, and H and the various passageways of the valve 27 will be fully described later in conjunction with the explanation of the hydraulic circuit for the feed shift.

The rotatable valve element 319 is mounted in a fixed sleeve 320 (Figure 44). The bracket 283 contains the sleeve 320 and the various passageways connecting the fluid supply thereto for the various shifts. Exhaust takes place from the inside of the valve element 319. The rotatable valve element has twelve positions established by means of a detent wheel 321 formed integrally with the element 319 and engaged by detent levers of the same general nature as those described with respect to the speed control valve.

A bevel gear 322 is fixed on the outer end of the valve element within the bore of the fixed valve body 320 by means of a nut 323. This gear meshes with a bevel gear 324 journaled in the sleeve 320 radially of the axis of the sleeve. This gear is fixed to a shaft 325 which extends across the main casing to the side wall where it is fixed within a gear 326 journaled in the side wall. A plate 327 covers the bearing for the gear 326.

Gear 326 meshes with another gear 328 fixed on the inner end of the shaft 329 which carries the setting knob 26 on its outer extended end. This shaft is journaled in bearings 330, 330. A bevel gear 331 is fixed on the shaft 329. This gear meshes with a bevel gear 332 journaled in the wall of the casing and fixed to a dial shaft 333. This shaft is sectional (Figure 31). The outer section is journaled in a bearing 334 fixed in the cover 254.

A collar 335 fixed on the inner end of the outer section of the shaft holds the shaft against outward displacement. The dial shaft carries a circular plate 336, to which is attached, by screws 337, the dial plate 28.

These screws 337 also hold a ring 338 in place for the same purpose as that described as to the speed dial. Clips 339 are slidable on this ring. These clips are numbered and are placed adjacent the feed desired and arranged in the order desired. The feed markings are moved with respect to an indicator mark 340 on the plate 264. As shown the feed rate is .087 and it is the third step in the drilling operation. The center of the indicator plate 28 is utilized for the display of thread cutting information showing the threads per inch cut when the various feeds are utilized.

The feed transmission gear change unit described heretofore continues to another unit assembled in bracket 350 fixed to the main casing wall by means of screws 351 just below the bracket 283 (Figure 36). For assembly purposes this unit has a slip coupling connection to the unit contained in bracket 283. Shaft 288 has a diametric groove 352 in its lower end below the bracket 283 which groove is engaged by a tongue on the upper end of the vertical shaft 353 journaled in bearings 354—354 in the upper flange 355 of the bracket and a lug 356. A gear 357 fixed on this shaft meshes with gear 358 rotatively mounted on bearings 359 on a vertical shaft 360. This gear 358 is held against axial movement.

Rotation may be imparted to shaft 360 either by power through gear 358 or by hand through bevel gear 361 loosely rotatively sustained on shaft 360 on bearings 362. Gears 358 and 361 include internal gears 363 and 364 respectively. These internal gears are at adjacent ends of the gears 358 and 361 and are alternately engageable by respective component gears 365 and 366 on a shiftable coupling sleeve 367 having splined engagement with the shaft 360 between the internal gears. This sleeve includes a wide gear 368 in constant sliding driving engagement with a gear 369 fixed to a shaft 370 sustained in bearings 371 in the upper and lower flanges of the bracket 350 and carrying a worm 372 meshing with a worm wheel 373.

A hand rotated shaft 374 is journaled in bearings 375, 375 held in spaced relation in a bearing bracket sleeve 376 (Figure 32). The hand-wheel 33 is keyed on the outer end of the shaft 374. The bracket sleeve 376 extends through an opening in the side wall of the main casing and includes a circular flange 377 fixed to the wall by means of screws 378. Concentric sleeves 379 space the inner and outer races of the bearings 375, 375. A clamping and bearing sleeve 380 is disposed between the hand wheel and a shoulder on the shaft. A nut 381 on the ends of the shaft hold these parts in assembly.

The clamping sleeve is splined to the shaft and includes a flange 382 engaging the inner side of a graduated gauge ring 383. Nuts 384 are screw-threaded on the sleeve and clamp the ring 383 in position against the flange 382 after the ring has been set in relation to a mark on the fixed sleeve 376 (Figure 25). Thus, regardless of the position of the shaft 360 or the spindle feeding parts, the gauge may be set to zero or any other point and clamped, and the ensuing feed accurately measured.

The operator may arbitrarily connect either the hand feed or the power feed means for the spindle by means of the shiftable coupling sleeve 367. The means for accomplishing this consist of the lever 34 fixed on the forwardly extended end of a shaft 390 disposed for convenient operation at the forward side of the head. This shaft 390 is journaled in a bearing 391 in the cover plate for the head. The bearing 392 consists of a lug depending from the transmission supporting bracket 350. The inner end of the shaft 390 carries an arm 393 affixed thereto, which includes a pin carrying a slide block 394 engaged in a transverse slot 395 in the lower end of the shift rod 396. The shift rod is vertically, slidably mounted in the upper and lower flanges of the bracket 350 and has a shifting yoke 397 pinned intermediate its ends. The yoke engages in an angular groove in the shifting or coupling sleeve 367.

The coupling sleeve has three positions—the hand feed coupling, power feed coupling, and neutral. The mechanism is shown in power coupled position (Figures 34 and 36). A pull spring 398, under tension between a pin 399 fixed in the bracket 350 and a pin 399 affixed to the shiftable sleeve, pulls the gear normally into power coupled position except when the hand lever 34 is swung to hand coupled position. Means for controlling the action of the spring 398 will be described hereinafter in conjunction with the automatic power disconnection means.

The worm wheel 373 (Figure 22) is loosely journaled on a shaft 400 on spaced ball bearings 401. The shaft 400 is journaled at its inner end in ball bearings 402 and 403 and at its forward end in a rotatable dial carrier 404 journaled in turn in the dial element 405. The rear bearings 402 are secured in the rear end of a bearing sleeve and directly support the counter-turned rear end of the shaft 400. A gear 406 which conveys the drive upwardly to the spindle is keyed to the shaft 400 and includes a hub journaled in the ball bearing 403. The ball bearing is carried by the forward end of the bearing sleeve 407 which carries bearings 402. The nut 408, screwed on the shaft, engages one side of the bearing 403 and draws the gear 406 against the other side. A nut 409 on the inner end of the shaft 400 engages the rearmost bearing 402 to hold the assembly in position.

A clutch is provided for coupling the worm wheel 373 to the shaft 400, thereby coupling the drive through gear 406 to the spindle. The gear 406 meshes with the gear 410 integral with the inner end of a sleeve 411. A shaft 412, affixed in the head casing, carries the sleeve 411 on a pair of rear bearings 413 and a pair of forward bearings 414. This gear 410 is thus loosely rotatably mounted and meshes with a gear 416 keyed to the shaft 417 carrying the rack gear 24 which meshes with the rack teeth of the spindle (Figures 4 and 22).

The shaft 417 is journaled in bearings, one ball bearing 418 supporting the rear end of the shaft and the casing, and the other, 419, supporting the hub of the gear 416 in the casing. Bearing 419 is held in place by means of a collar 420 screwed into the casing holding the bearing 419 against a shoulder in the bore. The bore houses the bearing and the rack gear 24 disposed between the bearings 418 and 419. The rack gear 24 meshes with the rack teeth of counterweight 25. The shaft 417 carries a variable counterbalance apparatus which arrangement will be described in detail in another section of this description.

Returning to the clutch, which is effective for coupling the worm wheel 373 to the shaft 400 and therefore the rack gear 24, it is pointed out that the clutch actuating means consists of diametrically extended hand levers 425 pivotally mounted on pins 426 of the shaft 400. These levers include forwardly projected manipulating knobs 427 whereby the operator may clasp either lever and, by pulling the same outwardly, may engage the clutch. The clutch is of the self-maintaining type, that is to say, once the levers have been swung to clutch engaging position, the clutch will stay in until manually released.

The inner ends of the levers contain radially, inwardly projected lugs 428 affixed to a clutch shifting rod 429 by means of pins 430. The clutch shifting rod 429 is slidably mounted in an internal bore in the shaft 400. The rod is engaged through a packing 431, and carries a roller 432 rotatably mounted on a pin 433, situated in a cross groove in the top of the rod. It is slotted to provide clearance for the roller. The roller extends into a longitudinal keyway 434, and engages against the inclined cam surface 435 formed on an intermediate portion of the clutch actuating lever 436.

The lever 436 is pivoted at its outer end and is held downwardly against the roller by means of a coil spring 437 fixed to a pin 438 carried by the clutch element 439 which is keyed to the shaft 400. The other end of the tension spring is connected to the outer end of the clutch lever and causes the cam portion 435 to ride the roller. The outer end of the lever is formed to provide for engagement with an end of the split clutch ring 440. The other end of the split clutch ring is pointed and the receding surfaces 441 of the point engage corresponding surfaces on adjustment elements 442. These elements 442 are adapted to be drawn toward and from these surfaces within a cross slot in the clutch body by means of a screw rod 443 (Figure 22).

The screw rod is reversely threaded as to its respective ends and is slotted for a screw driver at its forward end. A detent wheel 445 is affixed to the screw rod between the adjustment elements and is engaged by a detent 446 contained in the clutch body. Access to the slotted end of the screw rod is had through a clearance opening 447 extending through the dial carrier and a dial driving gear. The outer end of the opening is closed by means of a plug 448.

The outer end of the rod 429 has a locking disk 450 rotatably mounted thereon on a screw 451 extending axially into the end of the rod. This locking disk, when turned to a position, determined by detents 452 in the end of the rod engaging depressions in the disk, prevents engagement of the clutch by preventing inward movement of the levers 425.

A pair of keys 453 are provided between a counter-turned portion of the rod and the packing 431, to prevent rotation of the rod relative to the bore of the shaft 400. It is apparent that the spindle may be raised and lowered by rotative force applied to the levers 425 when they are in clutching position, this being conventional practice.

The dial carrier is driven by means of gears 455—455, one fixed to the gear sleeve 411 at its forward end meshing with the other gear fixed to the rear face of the dial carrier. The dial 405 may be rotated on the dial carrier manually by means of a finger hold projection 456. The dial is affixed to the dial carrier and set for the proper position with respect to an indicator mark 457 on the cover plate by means of a clutching lever 458.

The lever 458 is rotatably mounted in the dial carrier and depends therefrom for actuation. This lever is rotatably carried on a rod, specifically on a bushing 459 carried by the rod, and provides cam end faces engaging on a fixed sleeve in the dial carrier. Thereby, when the rod is rotated it is forced outwardly by virtue of engagement with the cam surface of the bushing. The rod is journaled in a collar 461 and a coil spring 462 is under compression between the collar and a forwardly facing shoulder on the rod, thus tending to keep the device unclutched.

The inner end of the rod is headed and engaged against a dog 463 including a tooth portion engageable with the toothed peripheral portion of the gauge dial. Thus, when the lever 458 is swung in either direction, it clamps the dial to the dial carrier which is driven by the gear 455 to indicate the amount of travel of the spindle.

A bellcrank lever indicated at 470 (Figure 34) is fulcrumed on a pivot rod 471. The lever carries an actuator 472 on one arm. The other arm of the lever has notches 474 and 475 in its end face. A detent lever 476 of bellcrank form is pivoted on a stud 477 affixed to a portion of the transmission bracket 350, and includes the roller 478 on one arm engageable with the notches 474 and 475. The other arm of the lever 476 has one end of a tension spring 479 connected thereto. The other end of the spring is connected to a pin 480 fixed in the bracket 350. This spring, therefore, urges the roller constantly against the notched end face of the lever 470 for effecting the detent operation.

A coupling block 481 is rotatably mounted on the pin 482 intermediate of the length of the arm 483 of the bellcrank lever 470 and engages in a cross slot 484 of the shift rod 396. The automatic power disconnection ring 473 carries the dogs 31 and 32, which dogs engage the roller 472 and swing the bellcrank lever 470 for shifting the rod 396 from power coupled position to neutral position.

The dog 31 is affixed and arranged on the ring so as to disconnect the spindle feed when the zero mark of the dial registers with the indicator mark. The clutch disconnection dog 31 is carried by the dial ring by means of a screw 485 and the dog 32 is carried directly by the control ring. Accordingly, dog 31 is always in fixed relation to the indicator marks on the dial and will always be effective for disconnecting the spindle feed when the dial comes around to zero.

The other dog 32 has a fixed relation to the spindle drive since it is directly driven and carried by the dial carrier. It may happen that by resetting the gauge when the spindle is too high or too low for a spindle feed greater than the machine will permit, the operator would damage the mechanism. The automatic stop 32 limits spindle feed in both directions. One rotation of the dial carrier is all that the machine will permit.

The dog 32 is shiftable on the pivot 486 to permit the full 360 degrees of movement of the carrier. It will be apparent from an inspection of Figure 34 that the dog moves circumferentially so that the feed disconnection is always at the same point no matter which inclined surface of the dog moves the roller.

When the bellcrank lever 470 is swung by engagement with the particular dog, the roller of lever 476 rides up the long wall of the detent notch remaining in engagement with this wall even when the clutch is disconnected. Thus, the dogs 31 and 32 are the only means for holding the shift sleeve 367 in neutral, for the moment they are moved out of registry with the roller, the sleeve is drawn by spring 398 to the power feed connection. Operation of the hand lever 34, however, is effective for moving the lever, through the rod, to detent notch 474 when hand feed is desired.

*Spindle variable balance*

As described heretofore, the rack gear 24, meshing with the rack teeth of the spindle assembly, is also in mesh with the rack teeth of the spindle balance 25. The spindle balance 25 slides in a vertical bore 500 in the lug 501 of the casing, which includes the bore containing the spindle assembly. As illustrated in Figure 4, upper and lower limit stops are provided for the spindle balance 25. Thus the amount of movement of the spindle is likewise limited.

The upper limit stop 502 is screwed into the upper wall of a cover 503, which houses the upper ends of the spindle and counterbalance respectively. This housing is in addition to the housing 504 which encloses the entire upper end of the main casing. The stop 502, disposed coaxially of the balance, is held in place by means of a screw 505 engaging in a counterturn or groove portion of the stop. The lower stop 506 is of the same general nature, being screwed into an element 507 fixed in the lower wall of the casing and disposed coaxially of the balance. The lower stop 506 is held in set position by means of a screw plug 508 engaging a cover member 509. Thus, the limit of movement of the balance may be adjustably defined in the range of spindle travel of feed set at predetermined limits.

As has been described, it is provided that the feed will be automatically disconnected as a safety measure at certain limits when the power connection is in. This safety or automatic limit means is effective for stopping the travel of the parts before the spindle balance contacts either of the respective stop elements 502 and 506. Thus these stops have particular utility in limiting the hand feed.

Now, in addition to this normal counterbalance, the weight of which is computed to balance the spindle for an average drill weight, a further device (Figure 22) is provided for increasing or decreasing the counterweighting effect on the gear 24. The shaft 417 which carries the rack gear 24 is extended forwardly and carries a pair of spaced bearings 510, 511, front and rear respectively. These bearings rotatively support an adjustable tensioning element 512 connected to the shaft by means of a clock spring 513. More specifically, the element 512 houses the spring and includes a removable front cover plate 514. The spring has its outer end anchored to the housing and its inner end connected to a sleeve 515 keyed to the shaft.

This spring therefore exerts a pressure tending to rotate the gear 24 in a direction (clockwise as shown in Figure 4) to offset the weight of the spindle. It may be said that this spring tension provides a counterbalancing effect supplemental to that produced by the cylindrical weight 25. The counterweighting action of the spring is varied by rotatively adjusting the casing 512. When a heavier drill is put in the spindle, additional tension in the spring compensates for the added weight over and above that counterbalanced by the normal weight 25.

Rotation of the housing for adjustment is procured by means of a worm 516 formed in a shaft 517. The worm meshes with the worm wheel 518 formed in the hub of the housing 512. The shaft 517 is journaled in bearings 519 in the casing and extends outwardly providing a squared end 520 upon which a removable handle 521 may be attached (Figure 25).

A stop element 522 is mounted on a screw threaded portion of shaft 517 between a shoulder afforded by the end of the worm portion and a shoulder afforded by a collar 523. This element 522 cannot rotate since it lies in the limited space between the casing wall and the gear 416. Accordingly, it travels longitudinally of the shaft when the shaft is rotated. Upon encountering either one of the shoulders described, it stops further rotation of the shaft and, consequently, adjustment of the weight. Thus the operator may accurately balance the spindle within the range for accommodating the normal run of boring tools. The spindle may be maintained in perfect balance at all times by adjustment each time a tool of different weight is utilized.

Head mounting

The head, as previously stated, is slidably mounted on the rail 8 of the arm (Figure 22). The rail 8 of the arm projects upwardly and downwardly, the head engaging the bottom and back of the lower rail portions. The weight of the arm is carried on roller wheels 526 disposed toward the respective ends of the head, riding on a hardened rail 527 fixed in the floor of a groove 528 in the forward face of the arm. These roller wheels are adjustable for maintaining a snug contact between the head and the arm suitable for an easy sliding movement without looseness.

The roller wheels are mounted on ball bearings 529 and on an adjustable shaft 530 in each instance. End plates 531 hold the roller wheel on the bearings and a closure disc 532 (Figure 24), encloses the wheel and provides a forward bearing for the adjustable shaft. The rear end of the shaft is journaled in the casing body and carries a worm wheel 533 engaged by a worm 534 projected into the end wall of the head into a bore 535 for this purpose. The screw rod includes a screw threaded outer end 536 screwed into the casing. A nut 537 on said screw threaded portion, is engageable with the end face of the casing for locking the rod in position. A squared end 538 is included on the rod for receiving a wrench for rotating the screw rod. The shaft supporting the roller wheel includes an eccentric portion 539 upon which the roller wheel is directly mounted.

Therefore, when the screw rod is rotated, the eccentric portion moves the roller toward or from the railway as may be desired. If adjusted toward the rail, the arm portion between the rollers and the lower hardened ways 525 is more snugly gripped and any looseness is eliminated.

Head traverse

The head is traversed through a rack and gear connection either by hand or by power. The rack 10 (Figure 28) is engaged by the pinion 9. The rack is secured in a groove in a back wall of the arm adjacent the bottom wall by means of screws 541. The pinion 9 is fixed on the upper end of a shaft 542 journaled in bearings 543 in the rear casing portion of the head. The upper bearing is contained in the casing itself, and the lower bearing in a lower cover portion. Sleeves 544 space the bearings. A gear 545 is fixed on the lower end of the shaft 542, and a nut 546 holds this gear against the lower bearing and completes the assembly. The pinion 9 is enclosed by a housing 547 attached to the casing opposite the rack 10.

The gear 545 meshes with another gear 548, which is fixed on the driving shaft 549 journaled in upper and lower bearings 550 secured in the casing walls. The lower bearing is supported on a sleeve 551 screwed in the lower wall of the casing. The shaft 549 is counterturned to provide a supporting shoulder 552 supporting the power driven worm wheel 553. This worm wheel is loosely rotatably mounted on the shaft on spaced bearings 554 contained therein.

The worm wheel assembly is coupled to the shaft through a gear 555 formed on the lower end of the sleeve 556. The worm wheel 553 is held upon the sleeve 556 against the shoulder afforded by the gear 555 by means of a nut 557 at the upper end of the sleeve. The elements 553 and 556 are keyed together and in turn are fastened to the bearing assembly through a pin 558.

The hand traverse connection to the shaft is through a bevel gear 559 rotatively supported on the shaft on spaced bearings 560 held within the gear 559. This assembly rests on the bearing 550. The bevel gear 559 is engaged by a pinion 561 formed on the inner end of the shaft 562 extending angularly to the side of the casing and carrying the hand wheel 11 at its outer end. A bearing sleeve 563, including ball bearings 564 at each end, supports the shaft 562. This sleeve is secured over an opening in the side wall of the casing by means of screws 565 traversing the flange 566 of the sleeve.

The worm wheel 553 and the bevel gear 559 are alternately connected to the shaft 549 by means of a slidable coupling sleeve 567 splined on the shaft 549. This sleeve provides internal gear teeth 566 at its upper end meshing with gear 555 of worm wheel assembly 553, and includes a gear 569 at its lower end meshing with internal gear 570 in gear 559.

Worm wheel 553 is driven by means of a worm 572 fixed on the inner end of a motor driven shaft 573 journaled in lugs 574 of the casing. The hydraulic motor 12 is mounted in the casing and is connected to drive shaft 573. The hydraulic connection to the motor will be described later.

A yoke 575 is pinned to a shift rod 576 slidably mounted in the main casing and engages the coupling sleeve 567. A spring 577 normally urges the shaft downwardly to maintain the coupling sleeve in position for manual head traverse.

A lever 580 is fulcrumed on a stud 581 secured in a lug 582 (Figures 26 and 28) of the casing. One end of this lever is provided with a slide block 583 engaged in a transverse notch 584 in the rod 576. The other end of the lever has studs 585, projecting from opposite sides thereof and engaged in transverse notches 586 in parallel vertically disposed hydraulically operated valve plungers I and J. These plungers control the two directions of movement of the head on the arm. The operation of the plungers is controlled from the main valve 36 operated by hand lever 35. The slide valve of valve 36 is appropriately grooved and moves in a fluid distributing sleeve 588 fixed in the valve body 59 and connected to various passageways thereof (Figure 26).

The head traverse lever 35 is fixed to the outer end of a sleeve 590 journaled in a bearing 591 fixed in the cover plate 254 of the main casing. An arm 592 is fixed on the inner end of the sleeve 590 and includes a pin 593 engaged in a cross slot 594 in the extended end of the movable valve element 587, and another pin 595 engaged in the cross groove 596 of a balancing plunger 597.

The plunger 597 (Figure 27) has a counterturned intermediate portion 598. Washers 599 engage the respective adjacent shoulders of the counterturn portion under the spreading influence of a coil spring 600 under compression between these washers. An abutment element 601 is fixed to the top surface of the valve body 589 and slidably supports the balance plunger. The balance plunger traverses a cutaway portion of the element 601. The washers normally abut the respective ends 602 of the cutaway portion, maintaining the plunger in neutral position, with the head traverse valve plunger in position disconnecting the fluid from the head traverse motor. As shown when the lever 35 is swung in one direction for a head transverse, the spring 600 is compressed between the washers and, therefore, exerts a return force tending to return the plunger to neutral position for returning the lever to centered or neutral position.

By virtue of the lever connection 580 between the hydraulic valve plungers and the coupling sleeve 567, the power connection is automatically coupled when the hydraulic motor is placed in operation.

The control valve 36 and the motor 12 are secured to flange 603 along the front opening of the casing. These elements are provided with flanges. Attaching screws 604 traverse the flanges and are screwed into the flange 603.

*Head clamping mechanism*

The head clamping mechanism 39 (Figure 22) is mounted in the upper region of the casing in the thick back wall thereof. A clamp arm 605 is disposed vertically at the back wall of the casing and includes a clamping end engaging the rear face 606 of the upper rail. The retaining means for the arm, and the pivot upon which it rocks, consists of a screw 607 disposed through the lower end of the arm and screwed into the casing. A semi-spherical socket member 608 is disposed beneath the head 609 of the screw in a concave socket in the arm around the screw. The upper end of the arm carries a stud 610 fixed thereto extending into a socket in the casing slidably through a plug 611 in the outer end of the socket. A spring 612 is disposed under compression between the headed inner end of the stud and the plug 611. This spring, therefore, pulls the upper end of the arm toward the casing at all times.

An operating plunger 613 is slidably disposed in a sleeve 614 fixed in the casing wall. Spring urged movement of the upper end of the arm urges the thrust screw 616 against the plunger, which includes, for this purpose, a projecting stud 617. Thus when the fluid is supplied under pressure to the inner end of the plunger, the arm is rocked on the socket connection in the lower end of the arm and pressed against the rail. When fluid pressure is released the spring 612 forces the plunger back and loosens the clamp.

The fluid under pressure is supplied to the cylinder 614 of this plunger by way of the clamp control valve 38 which is of push button type and self-maintaining. This valve is disposed through the tubular shaft which carries the lever 35 controlling head traverse. The valve cylinder 620 for the valve 37 is fixed within the valve body 589 and projects into the tubular shaft carrying the head traverse control lever. The valve plunger 621 reciprocates within the valve cylinder, and is depressed by means of a push button 622 having a concave face and pinned to the outer end of the plunger. This push button 622 operates within the tubular shaft and is disposed flush with the end thereof when depressed into clamping position. A coil spring, 623 under compression within a counterbore of the valve body 620, is disposed between the base of the counterbore and the push button. This spring normally tends to push the push button outwardly to release the clamp. As will be explained later, the passageways are arranged so as to maintain the plunger in clamping position as long as the fluid is supplied under pressure and as long as the head traverse valve is not moved to head traverse position.

*Column clamping mechanism*

The enlarged lower end of the column indicated at 625 is supported upon bearings 626, one of which is shown in Figure 48, on the stump 2. This enlarged portion of the column includes radially projecting lug portions. The lower end of the column may be said to be vertically split as at 627 and horizontally or circumferentially split as at 628. The latter split extends partially around the column at each side of the vertical split. The radial projections support and house the clamping means.

A clamping lever 629 is horizontally disposed and supported on ledges 630 secured at each side of the vertical split. The clamping lever is of C-shape having one arm provided with a seating portion 631 to provide rocking contact. A fixed thrust element 632 is engaged by the seating portion 631. This element 632 is fixed to the outer side of one of the pair of lugs 633 which are drawn together by a draw bolt 634. One headed end 635 of the draw bolt provides a convex thrust member 636 engaged in a concavity on the side of the lug 633 opposite that engaged by the clamp arm. Another thrust element 637 having the same form and arrangement as the one just described, engages the outer face of the clamping arm 629. This thrust element is held in place by means of a nut 638.

Thus, when the clamp arm is swung away from the lugs, the wedging or rocking action of the arm on the rock element 632 draws the lugs 633—633 together through the medium of the bolt and clamps the column to the stump. The normal contact of the column with the stump is adjusted by means of retainer bolts 639 slidably engaged through one lug and screwed into the other. These screws are adjusted for holding the column snugly in contact with the stump, yet permitting free rotative movement of the column on the stump when the clamp is not set.

The swinging end of the clamp arm carries a roller 640 within the horizontally bifurcated end thereof on a vertically fixed pin 641. A cam 642 is fixed on a vertically disposed operating shaft 643 which extends downwardly from the arm and has its lower end journaled in sleeve bearings 644—644 in the upper and lower flanges 645 of one of the lugs 633. The shaft 643 has splined engagement through the arm and is rotatively journaled in the cap 4 of the column. The splined operating rod 643 is rotated by control means located on the head.

The hydraulic control valve 42, controlling the rotation of this shaft, as well as the hydraulic control valve, controlling the elevating mechanism and the arm clamp, are included as a part of the control unit fixed on the lower left end side of the head (Figure 1). The cover plate 646 supporting the control parts and valves is fixed to the head casing by means of screws 647. A valve shifting rod 648 is journaled vertically on the cover plate (Figure 67) within a fixed bearing sleeve 649. The lever 41 is pinned to the lower end of this rod and actuates a valve shifting arm 650 keyed thereto and resting on the top of the bearing 649. The arm 650 includes a shifting pin 651 engaged in a cross slot 652 in the outer end of the plunger. A bearing sleeve 653 is keyed to the rod 648 above the arm and is held in place by means of a washer 654 engaged by a screw 655.

A detent lever 656 is pivoted on the valve body 658 by means of a pivot pin 659 and carries a roller 660 intermedate its length. The roller engages either of a pair of notches 661 in the outer end edge of the valve shifting arm. A coil spring 662, under tension, is fastened to a pin 663 of the cover plate, and at the other end is fastened to the outer end of the lever 656, thus tending to draw the roller into contact with the detent notches at all times and center the respective positions of the column control lever 41. This lever has two positions, namely, column clamp on, and column clamp off. Therefore, there are two detent grooves. The valve element slides in a valve sleeve or cylinder 664 fixed in the valve body 658. The valve body is fixed to the cover plate 648. Fluid conduits extend from this valve, as will be described hereinafter, to the upper rear side of the head casing.

The rear wall of the casing includes an opening (Figure 64) within and over which is fixed a casing and bracket element 665 carrying the column clamp operating plunger and, the arm elevating control and arm clamp plunger. The plunger 43, hydraulically controlled from valve 42, is disposed for vertical reciprocation between cylinders 667 located in spaced lugs of the casing 665. The outer ends of these cylinders are closed by means of plugs 668 and the fluid is admitted to one or the other of these cylinders depending on whether or not it is desired to clamp or unclamp the column.

A column clamp control rod 669 and an arm clamp control rod 670 are journaled for rotation in the end bracket 17 of the arm and in the elevating mechanism transmission casing 671 adjacent the column. These rods traverse the casing 665 passing through sleeves 672, which are rotatively journaled in ball bearings 673. An arm 674 is loosely mounted on the sleeve 672 and carries a couple block 675 rotatively mounted on a pin 676 of the arm and engaged in a cross groove 677 of the operating plunger. The hub of this yoke includes a segment of gear teeth 678 engaging a segment of gear teeth 679 formed in a hub in splined connection with the sleeve 672 of the column clamp control rod 669.

The end of the column clamp rod toward the column passes through the cover plate 680 fixed to the transmission casing 671. A segmental gear 681 is fixed to this end of the rod within the casing and this gear meshes with another segmental gear 682 fixed to the head end of a stub shaft 683 by means of screws 684. The stub shaft carries a bevel gear 685 journaled in a bearing sleeve 686 in the arm structure. Bevel gear 685 meshes with a companion gear 687 journaled in a ball bearing assembly 688 fixed in the arm structure vertically thereof. An arm 689 is pinned to the upper end of the shaft 690 which carries the gear 687. This arm has a bifurcated outer end secured to a link 691. The other end of the link is connected to the bifurcated end of an arm 692, which arm is keyed to a sleeve 693 traversed by and in splined connection with the vertical control rod 643. The sleeve 693 is rotatively journaled in the bearing sleeve 694 fixed to the upper wall of the arm structure housing the arm clamps (Figure 56).

Thus, movement of the lever 41 shifts the control valve 42 for controlling fluid supply to the cylinders of the operating plunger back of the head. This plunger, through rod 669 conveys the motion through gearing to the sleeve 693 in connection with the splined shaft 643. Rotation of the rod 643 operates the cam 642 for clamping or unclamping the clamp arm 629.

*Arm elevating and clamping mechanism*

Inasmuch as the arm clamp and the arm elevating mechanism are intercontrolled, these mechanisms are described together. As heretofore stated, a lever 45 controls the operation of these mechanisms. The lever 45 is fixed to the outer end of a shaft 700 rotatably journaled into cover plate 646. A spacer sleeve 701 is disposed on the shaft at the inside of the cover plate and a valve operating arm 702 is keyed on the shaft against the sleeve and held in place by means of a nut. This arm carries a pin 703 having its head end disposed in a transverse notch in the movable element 704 of the valve 47. Valve 47 is effective for controlling a three-positioned hydraulic plunger 705 (Figure 61) at the back of the head.

A lever 706, which functions as a detent means, swings on a pivot 707 fixed in a lug 708 of the valve body 658. This lever carries a roller 709 which is adapted to engage in any one of the three notches 710 of the valve operating arm, and is held in this relation by means of a coil spring 711 held under tension between the end of the lever and a pin 712 of the cover plate. The intermediate notch when engaged holds the valve in neutral position for the arm elevating mechanism, and in clamping position for the arm. The notches at either side of this notch when engaged hold the valve in arm raising or lowering position as the case may be. Conduits, which will be described in connection with the system, extend from the control valve 47 back to the plunger 705.

The lugs 607 which support the column clamping plunger also include cylinders 713 within which the plunger 705 operates. This plunger is of centering type, that is to say, it includes sleeves 714 at its upper and lower ends entering the respective cylinders. These sleeves 714 include heads within the cylinders and, when urged toward each other by the delivery of fluid to both cylinders, engage the opposite shoulders of an enlarged shoulder portion of the plunger 715 thereby centering the plunger. Relief of fluid pressure in either cylinder and continuance of the pressure in the other, will force the plunger away from one of the sleeves and will be effective for swinging an arm 716, which is in splined connection with the sleeve 672 and which will rotate the lower rod 670 by virtue of the splined connection of the sleeve 672 thereto. The arm is connected with the intermediate enlarged portion of the plunger by means of a coupling block 718 carried by a pin 719 on the arm engaging in a cross slot in the enlarged portion of the plunger. The cylinder bores 713 are closed by means of plugs 720.

The rod 670 has the outer end journaled in the bracket 17 and its inner end in the transmission casing 671 at the side of the column encircling portion of the arm. The rod 670 carries a segmental gear 721 on its end inside the casing 671. This gear meshes with a gear 722 fixed to a shaft 723 in the same manner as gear segment 682. A bevel gear 724 fixed on shaft 723 is in mesh with the bevel gear 725 fixed on a vertical shaft 726, which shaft is effective for distributing the control movements of lever 45 to the arm elevating mechanism and the arm clamping mechanism.

The shaft 726 is journaled in the lug 727 and the lower wall 728 of the casing which houses the transmission for raising and lowering the arm. A spacer sleeve assembly 729 is disposed between the gear 725 and the lower wall. A collar 730 is pinned on the upper end of the shaft and holds the shaft against vertical displacement in its bearings. A gear 731 is pinned to the lower end of the shaft 726 and meshes with a gear segment 732 fixed on a shaft 733 journaled in the arm structure (Figure 59). This gear segment is part of a bifurcated lever 734 coupled by means of a link 735 to a bifurcated arm 736 keyed to a cam sleeve 737 loosely surrounding column clamp rod 643. The cam sleeve 737 is coupled to an upper cam sleeve 738 by means of a coupling sleeve 739, all of these elements loosely surrounding the rod 643 (Figure 56).

The cam sleeves 737 and 738 are rotatively journaled in bearing sleeves 740, which are contained in the internal lug 741 of the arm and the lower wall 742 thereof. Therefore, these cam elements operate unitarily. Each cam includes a high portion 743, and low portions 744 at each side of the high portion.

The portion 745 of the arm which surrounds the column is split as at 746, and draw bolt 747 traverses the lugs 748 which are disposed at each side of the split. The outer end of the draw bolts are provided with adjustable nuts 749 and spherical contact washers 750. The inner ends of the draw bolts are headed and secured within the bifurcated ends of the clamping arm 49 by means of pins 751.

Just as in the case of the column clamp, thrust elements 752 are provided, attached to the inner lugs and providing rocking points 753, upon which the attached ends of the arms 49 are adapted to rock. The outer ends of the arms 49 carry rollers 754. These rollers ride the peripheries of the respective cams 737 and 738. When the cams are rotated to bring the high portions against the rollers, the arm is clamped. At either side of this position, the arm is unclamped. It may be said at this point that, when the arm is clamped, the arm elevating control mechanism is in neutral position.

Referring back to shaft, 726, it is pointed out that bevel gear 725 also carries a spur gear 755 (Figure 57). This gear 755 meshes with a segmental gear 756 pinned to a rock shaft 757 (Figure 51) journaled in the upper and lower walls of the elevating transmission casing. Shaft 757 carries another segmental gear 758 fixed thereto just above the operating segmental gear 756, and carries a cam 759 fixed thereto just below said operating segmental gear. These elements, that is, gear 758 and cam 759, control the elevating gearing.

The power for the elevating gearing is taken from shaft 14 (Figure 52). A gear 760 is fixed to shaft 14 and meshes with a gear 761 fixed to shaft 762 carrying the reversing clutches 50—50. The shaft 762 has one end journaled in a bearing 763 in an end wall, and the other end journaled in the bearing 764 mounted within sleeve 65 of the main drive. Gears 765, 766 are loosely rotatively journaled on the shaft 762 on ball bearings 768. The gears are fixed against axial movement. A clutch supporting sleeve 769 is fixed on the shaft 762 and carries clutch actuating fingers 770 fulcrumed thereto. The radially projected arms of these fingers engage against clutch plates 771 within the gears urging these plates against an end thrust portion 772 of the gears.

A shifter collar 773 is mounted on the sleeve for translation thereon between the gears. This collar has an actuating key 774 fixed thereto and sliding in a longitudinal groove in the sleeve. The respective ends of this key 774 are feathered from the outer edges inwardly so as to engage over the top of either of the longitudinally extended arms of the clutch actuating fingers. A yoke 775 engages the annular groove of the clutch shifter collar and yoke 775 is slidably mounted on a fixed rod 776 and has rack teeth 777 (Figure 60) engaged by the gear segment 758.

A further shaft 778 is journaled below 762 in bearings 779—779, one of which is fixed in the end wall of the transmission casing and the other of which is fixed in lug 780 of the casing. The shaft is splined and has gears 781, 782 fixed thereto. Gear 765 meshes with an idler gear 783 (Figure 59) mounted on a stub shaft 818 in bearings 784—784 fixed in the casing. The idler gear 783 meshes with gear 781 and gear 766 meshes directly with gear 782. Thus, the shaft 778 can be driven in either direction depending upon the coupling of the clutches.

The clutch 55 on the shaft 778 is a braking clutch. It incorporates a translatable sleeve 785 splined on the shaft 778. This sleeve is constantly urged against braking rings 786 contained within a fixed sleeve 787 secured in the lug 788 of the casing. A coil spring 789 accomplishes this function, the spring being disposed between the hub of gear 782 and the inner end of recess 817 in the translatable braking sleeve 785. A nut 790 is attached on the outer end of the shiftable sleeve. A shifting collar 791 engages said nut through the medium of a ball bearing 792. A lever 793 is pivoted on a stud 794 and carries a roller 795 engaging cam 759. The inner end of the lever is bifurcated as at 796 and engages the thrust element 791. Cam 759 has a low intermediate portion and a high portion at each side thereof. Accordingly, this cam is effective for permitting braking of the shaft and rapid stopping of the elevating gearing. When the arm clamp is released and the gears are set in motion, this clutch is immediately loosened for releasing the brake on the shaft.

A bevel gear 797 is fixed on the shaft 778 and meshes with a bevel gear 798 carrying a gear 799. This assembly of gears is fixed to a shaft 800 loosely rotatively journaled in the casing bearings 801. The spur gear 799 (Figure 59) meshes with the gear 802 (Figure 53) carrying a gear 803 meshing with a gear 804 of the elevating nut assembly 805. The elevating nut assembly engages the stationary elevating screw 6 and, when rotated thereon, is effective for raising and lowering the arm. The elevating nut is rotatively mounted and includes a safety nut arrangement to cause stopping of the elevating movement in case the threads become worn to the point where the arm might lose its support.

Features of this assembly need not be described since they form a part of another application of this inventor. Gears 802 and 803 are loosely mounted on bearings 807 fixed on the shaft 808 vertically disposed in the arm. A switch 810, the details of which are not shown, is mounted within the arm and is operated by means of a rod 811 projecting upwardly through the arm and disposed for engagement with the cap of the column in the event the arm is permitted to move upwardly too far. This rod is normally held in position by means of a spring 812 and engages the operating arm 813 of the switch at its lower end. Accordingly, when the rod is forced downwardly, the switch is operated for stopping the main motor. Elements 814 fixed to lugs inside the arm support the arm clamping levers intermediate their ends, including for this purpose upwardly projecting lugs 815 engaging downwardly projecting lugs 816 of the arms.

*General hydraulic system and operation*

The reference in this section of the description will be to Figure 71 primarily. The pump 51 draws the oil from the bottom of the head through the filter 52 and through a pipe 820. From the pump 51 the oil is delivered through a pipe 821, through the head traverse valve 36 to the accumulator 54 by way of a groove 822 in the valve plunger and a pipe 823. When the head traverse lever 35 is in neutral position, the flow of oil from the constantly driven pump is conducted to the accumulator to charge the accumulator should it become exhausted. The shift of the head traverse lever to either position, that is, from right or left hand movement of the head, cuts off the flow to the accumulator and sends it to the traverse motor to drive the motor in the appropriate direction according to the direction in which the valve is shifted. The safety valve 53 is tapped into the line 821 and is effective for releasing excessive pressure or unloading the product of the pump in case of blockage of the lines or for any other reason.

The delivery conduit 823 is connected to the regulator valve 824 of the accumulator. The shuttle plunger 825 of the regulator valve includes a central groove 826 to which the pipe 823 connects at all times and which is in connection with the conduit 827. The conduit is connected with the cylinder of a control valve 828, the plunger 830 of which includes a groove 829 in communication at all times with the line 827.

The control valve plunger 830 has its outer end fixed to a cross arm 831, the other end of which is disposed between abutments 832. A piston rod 833 is connected to the piston 834 within the accumulator cylinder 835. A spring 836 urges the piston outwardly at all times and maintains pressure on the oil contained in the accumulator.

As shown, the outer abutment 832 has moved the control plunger 830 to a position where the oil may flow from pipe 827 through groove 829 and through a pipe 837 into the end of the regulator valve 824. The introduction of oil into the end of the regulator valve moves the plunger thereof, to a position connecting the pipe 823 with the main lubricant line 838 which connects to the portions of the head to be lubricated.

In the position shown, the accumulator is filled with oil and the excess from the pump is being used for lubrication. The accumulator piston forces the oil through a pipe 839, through a pipe 840 and back to the head traverse valve. Refilling of the accumulator occurs when some of the reserve oil is forced out of the accumulator. This causes the other abutment 832 to engage the cross arm and move the control valve plunger to a position connecting the supply conduit 827 with conduit 841, moving the valve 825 to a position blocking the lubricating flow, and connecting the supply line 823 with line 839.

Thus, it is provided that the pump operates at all times, the accumulator maintaining a constant oil pressure to operate the control system with the excess going into the lubricant lines.

The line 840, when the head traverse lever is at neutral, communicates with an annular groove 842 in the valve 36. This annular groove 842 constantly communicates with another groove 843 of the valve through a longitudinal bore 844. Normally, with the head traverse lever at neutral, the supply pipe 840, through grooves 842 and 843, communicates with conduit 845 connected to the clamp control valve 38. The plunger 622 of the clamp control valve includes a groove 846, to the respective ends of which, the pipe 845 connects by means of pipes 847 and 848.

As shown, the cylinder of the clamp operating plunger 39 is being exhausted through conduit 849 through a groove 850 of the valve plunger to the exhaust pipe 851. When the plunger of the valve 38 is depressed, the oil flows through the pipe 845, pipe 847, groove 846 and pipe 849 to the clamping cylinder. This brings pipe 848 into communication with a groove 852 of the valve plunger. When the plunger is depressed, the area of contact of oil against the shoulder of the valve at the inner end of the groove 852 through the pipe 848 is greater than the area of contact exposed to the oil at the outer end of the groove.

Accordingly, the plunger stays depressed until the fluid pressure through pipe 845 is cut off. This occurs when the head traverse lever is moved either way, displacing groove 842 and the supply pipe 840. The oil within the groove 852 is exhausted through exhaust pipe 851 as the valve plunger is moved back by the spring into the position shown in the drawings. Thus, the head clamp is automatically released when the head traverse movements are instituted.

For the purpose of instituting the head traverse movements, a supply pipe 853 leads from pipe 821 to the cylinder of the valve 36. At either side of the pipe 853 the valve plunger is provided with grooves 854—854. From the respective grooves, pipes 855 extend to the respective cylinders of the control valves 37 to the head traverse motor 12. As shown, the pipes 855 are being exhausted through an exhaust pipe 856 which normally connects to the respective grooves 854. When the head traverse lever is shifted in one direction or the other, a groove 854 is connected to a pipe 853 and the oil flows through the appropriate pipe 855 to the cylinder of the particular valve 37, at one end of the plunger thereof, and to an annular groove 857 thereof. The first named connection actuates the valve plunger, and the second permits the flow of oil through the respective conduit 858 to the motor.

When the oil is flowing from one side of the motor it may exhaust through the other supply conduit 858 which also has been moved by the mechanical connection fixing the plungers of the valve 37 together for unitary action. This connection, as described heretofore, is also effective for disconnecting the hand feed and coupling the power feed when the hydraulic motor is in operation. The exhaust flow then takes place through the other groove 857, through other pipe 855, through other groove 854, and thence through the exhaust pipe 856.

When the head traverse lever is returned to neutral and the connection is reestablished as shown, the flow of oil is cut off entirely, the spring 577 (Figure 28) returning the plungers to normal positions and disengaging the clutch 567 from power feed and connecting it to hand feed.

A supply conduit 860 extends from the supply conduit 840. This pipe connects to the cylinder of the control valve plunger 47 and is in constant communication with a groove 861 in the valve plunger. Normally, with the valve lever in neutral position, this groove is in communication with pipes 862 and 863 connected to the upper and lower ends or cylinders of the actuating plunger 48, jointly controlling arm elevation and arm clamping operation.

In the position shown, the arm is clamped and the elevating mechanism is in neutral. If the operator moves the valve upwardly, for example, the conduit 862 is still in communication with the supply, whereas, the conduit 863 is then placed in connection with the exhaust passageway 864 extending radially and then longitudinally to the end of the valve plunger. With the lower cylinder exhausted, the oil in the upper cylinder will move the operating plunger and a lower balance sleeve, downwardly, thus effecting unclamping of the arm and coupling of the power for the given direction. Reverse operation may be accomplished by moving the lever 45 in the opposite direction.

The plunger of the column clamp valve has the same design as that of the valve just described, and the connections to the actuating plunger are the same. However, the actuating plunger for the column clamp has only two positions, there being no balance plunger or sleeves included. In other words, it is either in clamped or unclamped position.

The pipe 840 is connected through pipe 865 to the main control valve 40 which is operated by the main control lever 19. The plunger of this valve includes a groove 866. This groove is normally arranged so as to connect pipe 865 to pipe 867 leading to the control valves 23 and 27 for controlling the speed and feed of the spindle respectively. When the main control lever is in neutral, the supply is cut off through the speed and feed control valves which are exhausted through pipe 868 and it is impossible to cause a gear change. Accordingly the dials for feed and speed may be adjusted to any position and gear changes will not be effected unless the power is coupled. Shifting will occur as the power is being coupled so that relatively smooth meshing of gears is brought about.

*Spindle speed hydraulic gear change system*

The oil is delivered from supply pipe 867 to the speed control valve 23 by way of pipe 880 (Figure 71). The diagram (Figure 21) shows the system effective for delivering the lowest speed to the spindle, namely, 20 R. P. M. (See the dial Figure 30.) To produce the gear mesh necessary for this speed, plunger B is shifted to rock lever 155, meshing gear 148 and gear 139.

The oil passes into the valve body through pipe 880 into an annular groove 881, through a radial port 882, into longitudinal passageway 883, outwardly through passageway 884, radial port 885, the annular groove 886 and thence to the upper cylinder or plunger B by way of pipe 887. This forces both the plunger B and the lower balance plunger downwardly and shifts the gear as described. The lower cylinder for the plunger B is exhausted through conduit 888, annular groove 889, and the open bore 890 of the valve element by way of registering radial passageways 891 and 892.

The gear cluster 145—146 is held in neutral since the plunger A is in balanced position. For this purpose the oil passes from longitudinal supply passageway 893 to radial port 894, through groove 895, and then through pipe 896 into the upper cylinder of plunger A. The oil passes from groove 881 to radial port 897 into longitudinal passageway 893. The oil also passes through passage 899 through radial passages 900 and 901, the annular groove 902, and thence to the lower cylinder of plunger A through pipe 903.

The plunger D is shifted upwardly for sliding gear 187 into mesh with gear 196. The flow of oil for bringing this about occurs by way of longitudinal bore 899, radial passageway 904, groove 905, and thence to the lower cylinder of plunger D through pipe 906. Upper cylinder of plunger D is exhausted through pipe 907, groove 908, radial port 909, radial port 910, and open bore 890.

The plunger C is shifted downwardly for rocking the lever 180 and raising gear 170 into mesh with gear 185. The oil flows, for this purpose, from longitudinal passageway 893 to radial port 911, through groove 912, into conduit 913, into the upper cylinder for plunger C. This forces both the plunger and the lower balance sleeve downwardly. The lower cylinder is exhausted through pipe 914, through annular groove 915 and radial ports 916 and 917 to the open bore 890.

The plunger E is held upwardly for moving gear 206 into mesh with gear 208 by rocking movement of lever 211. For this purpose the oil flows from passageway 883, radial passageway 918, groove 919, pipe 920 to the lower cylinder for plunger E. The upper cylinder is exhausted through pipe 921, annular groove 922, radial passageway 923, passageway 924, into the open bore 890 of the valve.

It is not believed necessary to trace out each of these circuits for their respective positions, since it will be evident that proper porting of the valve structure will bring this about. The system produces 32 speeds through the valve shown. For example, the operator may jump the speed from 20 R. P. M. to 1600 R. P. M. if desired. In this event gear 145 is in mesh with gear 136 so that plunger A must be shifted upwardly. In this event the lower cylinder of plunger A is charged through pipe 903, annular groove 902, port 901, port 926, and bore 883, whereas the upper cylinder is exhausted by way of conduit 896, groove 895, port 927, exhaust passageway 928 and the open bore 890.

Plunger B, for this gear change, is held in balance in neutral position for holding the gears 147, 148 in unmeshed position. For this purpose, the oil flows to the upper cylinder for plunger B from longitudinal passageway 883 through port 929, port 885, annular groove 886, and pipe 887. For the lower cylinder of plunger B, the oil flows from the longitudinal passageway 893 through port 930, port 931, annular groove, 889, and pipe 888.

Plunger D is now held downwardly for holding gear 185 in mesh with gear 197, and for this purpose, the upper cylinder plunger D is charged by way of passageway 893, port 932, annular groove 908, and pipe 907. The lower cylinder for plunger D is exhausted through pipe 906, annular groove 905, port 933, exhaust passageway 934, and open bore 890.

Plunger C is held at its uppermost position for rocking the lever 180 and holding gear 171 in mesh with gear 186. This upward movement of plunger C is brought about by introducing oil to the lower cylinder thereof, by way of longitudinal passageway 883, port 935, annular groove 915, and pipe 914. The upper cylinder for plunger C is exhausted through pipe 913, annular groove 912, port 936, exhaust port 937, and open bore 890.

Plunger E is held downwardly for moving gear 205 into mesh with gear 196 by rocking lever 211. The oil is introduced to the upper cylinder of plunger E by way of passageway 893, port 938, annular groove 922, and pipe 921. The lower cylinder for plunger E is exhausted through the pipe 920, annular groove 919, port 939, exhaust passageway 940 to open bore 890.

It is believed that with the foregoing explanation of the extreme positions of speed the structure and operation of the valve will be clear. Grooving and porting of the valve structure has been carefully worked out and the arrangement shown will produce the thirty-two speeds described.

A mechanical interlock is shown between plungers A and B which insures the mechanism against operation of these plungers for meshing gear clusters 149—149 with their respective component gears simultaneously. For this purpose, mating discs 941 and 942 are provided. These discs are rotatably mounted on studs 943—943 respectively. The same arrangement of discs is shown as to plungers F and G of the feed change system so that the description may apply to both. The disc 941 has a flange 944 formed thereon concentric with the axis of rotation thereof. This flange is interrupted so as to interfit with the periphery of disc 942. Disc 942 includes a circular groove 945 which will be aligned with the flange 944 when the respective discs are in position, determined by the neutral positions for the respective gear shifting yokes or plungers. These gear shifting plungers are connected to the outer margins of the disc by means of studs 946 in slots 947 of the yokes. Thus, movement of the yokes will rotate the discs.

If disc 942 is rotated by moving the plunger either to one gear coupling position or the other, the circular slot 945 is disaligned from the flange 944 and the plunger or yoke to which disc 941 is connected cannot be moved. On the other hand, assuming neutral position when the disc 941 is rotated, the flange will move into the slot or groove and disc 942 will be locked against rotation. Thus, either plunger may be moved when the plungers are in neutral, but after movement of one into a gear coupling position, the other cannot be moved.

*Spindle feed hydraulic gear change system*

Figure 45 shows the valve and plungers for feed change system diagrammatically. As shown, the valve is set for producing the lowest rate of feed, that is, .006. The supply conduit 867 is connected to speed control valve 27 by the supply pipe 950. For this position, plunger G is moved upwardly to place gear 295 in mesh with gear 299. The oil is delivered to the lower cylinder for plunger G in the following manner:

Oil enters the valve body through pipe 950 and passageway 951, passageway 951 connects with annular groove 952 and thence the flow proceeds through port 953, through port 954 to longitudinal bore 955. From bore 955, the oil flows through radial port 956, annular groove 957, pipe 958, and the lower cylinder of plunger G. The upper cylinder of plunger G is exhausted through pipe 959, annular groove 960, radial port 961, and open exhaust passageway 962.

Plunger F is held in balanced neutral position by means of oil delivered to the lower cylinder thereof by way of bore 955, radial port 963, annular groove 964, and pipe 965. The upper cylinder is charged by way of bore 955, radial port 966, annular groove 967, and pipe 968.

Plunger H is held in balanced position for holding gear 313 in mesh with gear 304 by the following arrangement. The oil flows to the lower cylinder for plunger H, through bore 955, radial port, 970, annular groove, 971, and pipe 972. The upper cylinder is charged through bore 955, through any one of ports 973, annular groove 974, and pipe 975.

Just as in the case of the speed change system, it is believed that the description of the extreme high feed rate of the range will be helpful in understanding the plunger and valve arrangement. Accordingly, assuming that the feed dial has been set to 1.25, the valve will assume the following position and the plungers will be shifted accordingly.

Plunger G is moved downwardly to place gear 294 in mesh with gear 298. The oil is delivered to the upper cylinder for plunger G in the following manner. The oil flows from bore 955 through radial bore 976, annular groove 960, pipe 959, to the upper cylinder for plunger G. The oil is exhausted from the lower cylinder through pipe 958, annular groove 957, radial bore 977, to bore 962.

Plunger F is held in balanced position for holding gears 296 and 297 in neutral in the same manner as it was held in connection with feed .006.

Plunger H is moved downwardly to place gear 313 in mesh with internal gear 316. For this purpose, the oil is delivered to the upper cylinder of plunger H through bore 955, radial port 973, annular groove 974, and pipe 975. The lower cylinder for plunger H is exhausted through pipe 972, annular groove 971, radial port 980, and exhaust bore 962.

It will be apparent that the requisite positions for the plungers are obtained by appropriate grooving and drilling of the valve structure. For this reason, it is believed that a description of all of the positions would be tedious and unnecessary.

Figures 6, 7:
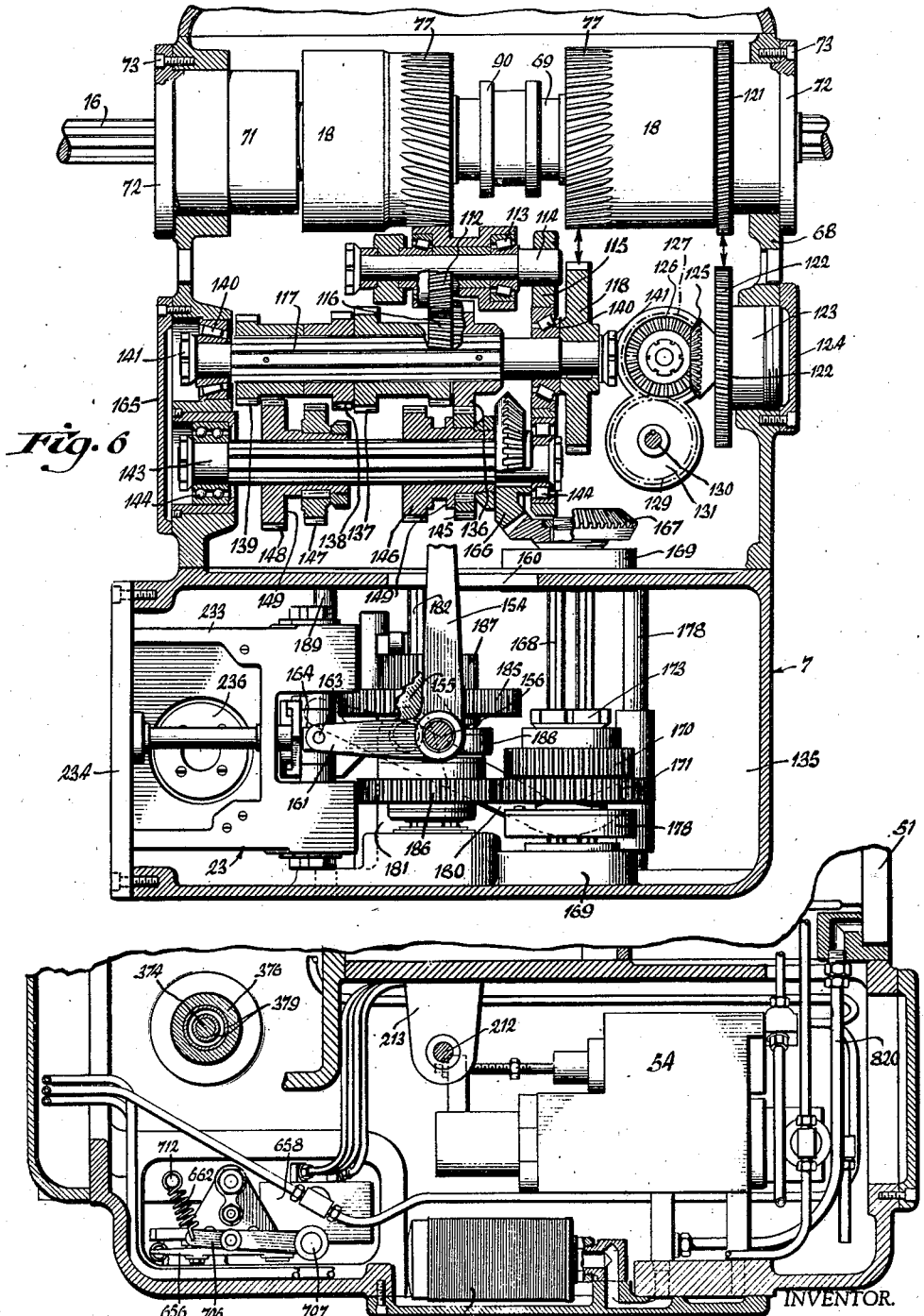
Figure 6 is a sectional view taken on line 6—6, Figure 3, illustrating the reversing gearing and the speed change gears for the spindle.
Figure 7 is a fragmentary view taken on line 7—7, Figure 5, illustrating, primarily, the arrangement and location of the accumulator and strainer for the hydraulic system.

The pump 51, as previously described, is fixed in an opening in the rear wall of the casing 68 (see Figures 7 and 9). The flange 119, of the pump includes fluid passageways in registry with the passageways formed in the flange 120. The passageways are in connection with the intake and pressure lines 820 and 821 respectively. The lower end of the line 820, is in connection with the filter 52, by means of the conduit and passageways, formed in the cover plate upon which the filter is mounted. It will be noted by this construction that both the pump and the filter are removable from the drill head for cleaning or repairs without disturbing the pipe connections.

Having described my invention, I claim:

1. In a radial drill having a base, a column rotatably mounted on said base, a clamp for locking the column against rotation and, an arm; remote control means for operating said clamp comprising, a control rod extended along said arm in operating connection with said clamp, a hydraulic pressure conduit in said head, a hand operated valve in said conduit mounted in the head, a hydraulic plunger means in said head in communication with said hydraulic pressure conduit and controlled by said valve, and slidable actuating means connected to said rod and in operative connection with said plunger whereby the head is free to be translated along the arm and actuation of the valve controls clamping and unclamping of the column.

2. In a radial drill, a rotatably mounted arm, a column supporting said arm, clamp means for preventing rotation of said arm, a drill head mounted on said arm, hydraulic pressure means in said head, hydraulic shifting means in said head, and a valve in said head controlling the application of hydraulic pressure from said pressure means to said shifting means, said hydraulic shifting means mechanically operatively connected to said clamp means.

3. In a radial drill having a base, a column mounted in said base, an arm supporting a drill head, and a clamp for preventing rotation of said arm; hydraulic means for actuating said clamp comprising, means for supplying fluid under pressure, a control valve, a hydraulic plunger connected to said means for supplying fluid and controlled by said valve, said plunger and valve located in said drill head, and clamp operating means in connection with said plunger operable to engage or disengage the clamp upon actuation of the valve in the appropriate direction.

4. A radial drill, comprising, an arm, a drill head translatable on said arm, means rotatably supporting said arm, a clamp in said arm for securing the arm against rotation, a shaft mounted on said arm and traversing said head, cam means operatively connecting said shaft and clamp, a hydraulic plunger, a cylinder in said head containing said plunger, a valve controlled source of fluid under pressure connected to said cylinder, and a yoke arm in splined connection with said shaft and operatively engaged by said plunger.

5. In a radial drill having, a column, an arm, a drill head slidably mounted on the arm, elevating mechanism on said arm for raising and lowering the same; means for controlling the elevating mechanism from the head comprising, a control rod in operative connection with said elevating mechanism and extended along said arm, a hydraulic plunger in the head operatively connected to said rod, said head and plunger slidably mounted relative to said control rod, and hydraulic control means for operating said plunger.

6. In a radial drill, a drill head, an arm slidably supporting said head, a column rotatably and slidably supporting said arm, means for elevating said arm on said column, control means for said elevating means, and hydraulically operated means for operating the control means for said elevating means, said hydraulic means mounted in said head and operatively connected to said control means for said elevating means.

7. In a radial drill, including a column, a rotatably mounted arm adapted to be raised and lowered on said column, a drill head translatably mounted on said arm, clamp means for fixing said arm against rotative movement, clamp means for fixing said arm against elevating movement, a transmission for raising and lowering said arm, and a clutch for controlling said transmission, the combination of; shafts disposed along and journaled on the arm, one of said shafts operating said clutch and said clamp for locking said arm against elevation and the other shaft operating said clamp means for preventing rotative arm movement, a cylinder element mounted on the head and traversed by said shafts, plungers in said cylinder element said plungers connected to respective shafts by means of yoke arms, hydraulic connections to said plunger cylinders and, valves for controlling the operations of said plungers.

8. In a radial drill, including a column, a rotatably mounted arm adapted to be raised and lowered on said column, a drill head translatably mounted on said arm, clamp means for fixing said arm against rotative movement, clamp means for fixing said arm against elevating movement, a transmission for raising and lowering said arm, and a clutch for controlling said transmission, the combination of; shafts disposed along and journaled on the arm, one of said shafts operating said clutch and said clamp for locking said arm against elevation, and the other shaft operating said clamp means for preventing rotative arm movement, a cylinder element mounted on the head and traversed by said shafts, plungers in said cylinder element, said plungers connected to respective shafts by means of yoke arms, hydraulic connections to said plunger cylinders and, valves for controlling the operation of said plungers, said hydraulic means contained entirely within said drill head.

9. In a radial drill having, a column, an arm, a head adapted to be moved along said arm, and elevating mechanism on said arm for raising and lowering the same; control means for controlling the elevating mechanism, comprising; a control rod extended along said arm in operating connection with said elevating mechanism, a hydraulic pressure line in said head, a hand operated valve in said line mounted in the head, a hydraulic plunger in said head controlled by said valve, and slidable actuating means connected to said rod and in operative connection with said plunger whereby the head is free to traverse the arm and actuation of the valve controls raising and lowering of the arm.

10. In a radial drill having, a column, an arm, an arm clamp, a power shaft and, an arm elevating mechanism, the combination of; a three-position reversing clutch for connecting the power shaft to the arm elevating mechanism for drive in the appropriate directions for raising or lowering the arm, said clutch normally maintained in neutral position, a hydraulic pressure line, a three-position control valve in said line, a three-position hydraulic plunger having its cylinder connected to said line and controlled by said valve, clutch operating means in connection with said plunger operable to engage the clutch for operation in either direction for raising or lowering the arm upon actuation of the valve in the appropriate direction, and an arm clamp mechanism in direct mechanical connection with said clutch operating means including a clamp arm and a cam operating said arm having a high intermediate portion effective for clamping when the clutch operating means is in neutral.

11. In a radial drill having, a column, an arm, a power shaft, an arm elevating mechanism, a reversible transmission operable to drive said elevating mechanism either to raise or lower the arm; hydraulic means for controlling the operation of said transmission comprising, a hydraulic pressure line, a control valve in said line, a shifting plunger having its cylinder connected to said line and controlled by said valve, said plunger having hydraulic balancing means adapting the same to be reciprocated in either direction or to assume an intermediate position responsive to the position of said valve and, operating means in connection with said reversible transmission, operable to raise or lower the arm according to the actuation of said plunger.

12. In a radial drill, a column, an arm, an arm supporting a drill head, a power shaft, an arm elevating mechanism, a reversing clutch operable to drive said elevating mechanism for raising or lowering the arm, control means for operating said clutch, and brake means for stopping the coast of said elevating mechanism immediately upon actuation of the control means to neutral position, said brake means operatively connected to said control means for operation thereby.

13. In a radial drill including the column, the arm, the arm clamp, the power shaft, the arm elevating mechanism and, the reversible transmission operable to drive said elevating mechanism either to raise or lower the arm; control means for coupling said transmission to said power shaft, and single hydraulic plunger means for clamping or unclamping the arm coincidentally with the operation of the transmission control means, to unclamp the arm upon raising or lowering the same, and to clamp the arm when the transmission is inoperative.

14. In a radial drill having, a column, an arm, a head elevating mechanism on said arm for raising and lowering the same, a column clamp and, an arm clamp, the combination of; control rods extended along said arm and in operative connection with said elevating mechanism and said clamps respectively, hydraulic plungers in the head respectively connected to said rods, said head and plungers slidably mounted relative to said control rods, and a centralized hydraulic control system in the head for operating and controlling the plungers.

15. In a radial drill including, the base, having a drill head therein, the column rotatably mounted on said base and, the clamp for locking said column against rotation; hydraulic means for clamping and unclamping the column, said means located entirely in said head, comprising, a fluid pressure supply line, a control valve in said line, a hydraulic plunger in said line controlled by said valve, and clamp operating means in connection with said plunger operable to clamp or unclamp said column according to the actuation of the valve.

16. In a radial drill, a base including a stump, a column rotatively mounted on said stump, an arm on said column, a drill head on said arm, said column split at the portion encircling said stump, a draw bolt for drawing the split portions together, a clamp arm fulcrumed on the column and having connection with said draw bolt at one end, a cam engaging the other end of said clamp arm, rests on said column supporting said clamp arm for horizontal movement, and, lever means for rotating said cam.

17. In a radial drill, a base, a column rotatably mounted in said base, clamping mechanism for locking said column against rotation on said base, an arm on said column, a drill head on said arm, a control rod extended along said arm and in operative connection with said clamping mechanism, a hydraulic plunger in the head operatively connected to said rod, said head and plunger slidably mounted relative to said control rod, and hydraulic means for operating said plunger.

18. In a radial drill including, the base, the column rotatively mounted on said base, the arm on said column, the column clamp, and the arm clamp; means for controlling the clamps, comprising, sleeves independently journalled on a common axis in operative connection with the column clamp and the arm clamp respectively, and means for operating said sleeves independently of each other.

19. In a radial drill, a rotatively mounted column, an arm mounted for rotation on said column, a clamp on said column for locking the column against rotation, a control rod for said clamp extending along said column and traversing said arm, vertically spaced arm clamps, spaced cam sleeves loosely coaxially mounted on said control rod, arm clamp levers operated by said cam sleeves, means for unitarily rotating said cam sleeves, a sleeve splined on said control rod and, means for rotating said sleeve and rod for actuating said column clamp.

20. In a radial drill, including a column, an arm, a head adapted for movement along said arm, a column clamp, an arm clamp, the combination of; a pair of control rods extended along said arm in operating connection with the arm clamp and column clamp respectively, a hydraulic control system in said head, a pair of hydraulic plungers in the head for operating said rods, and a pair of levers, one for each rod, each of said levers operatively connected to one of said plungers respectively, one of said levers in splined connection with one of said control rods, and the other of said levers loosely mounted in tandem coaxial relationship with the first lever and in operative engagement with the other of said control rods.

21. In a radial drill, a drill spindle, a power shaft, a control clutch, a gear change transmission for said spindle controlled by said clutch, a fluid pressure line, a gear selector valve, and a plurality of plungers having cylinders operatively connected to respective gears for shifting the same, said gears slidably engaged on a plurality of shafts and in intermeshing relationship with each other, said cylinders in fluid connection with said selector valve for operation thereby, said gear selector valve, pistons and cylinders mounted for removal as a unit.

22. In a radial drill or the like including a column, an arm on the column, a head on the arm and including a spindle, and speed change gears in the head for driving said spindle; a hydraulic system for controlling the movements of the head and arm and shifting said gears comprising, a constantly driven fluid pump, an automatic accumulator for storing a quantity of fluid under pressure, a plurality of plungers for controlling the movements of the head and arm and shifting said gears, a plurality of valves in fluid connection with said accumulator for controlling the actuation of said plungers, a fluid motor for traversing the head hydraulically, and a valve for controlling said motor, said valve in fluid connection between said pump and accumulator and arranged to shut off the flow of fluid to the accumulator to operate the motor directly from the pump when the valve is actuated.

23. In a radial drill having a column, an arm on said column, and a head translatable on the arm; hydraulic means for translating and clamping the head comprising, a hydraulic motor for translating the head, a hydraulic clamp for clamping the head in position, a fluid pressure line for operating said motor and said clamp, a control valve in said line for the hydraulic motor, and a valve for controlling said clamp, said clamp valve in fluid connection with the motor control valve and having hydraulic means to retain the clamp valve in clamping position upon actuation thereof, said motor control valve having passageways arranged to actuate the clamp valve to unclamp position upon actuation thereof to head translating position, thereby unclamping the head prior to hydraulic translation thereof.

24. In a radial drill including, the base, the column rotatably mounted on the base, the column clamp, the arm translatable on the column, the power means for translating the arm, and the arm clamp, the combination of; a centralized control system in the head for controlling the arm and column comprising, a fluid pressure apparatus, a pair of fluid actuated plungers, respective valves for controlling said plungers, a pair of control rods operatively connected to respective plungers, one of said rods extended to and in operative connection with said arm translating power means to control actuation of the same and the other of said rods in operative connection with said column clamp.

25. In a radial drill including, the base, the column and its clamp, the arm and its clamp, the drill head on the arm and its clamp the combination of; a hydraulic system located entirely within the head including, a hydraulic motor for moving the head on the arm and plungers for operating the various clamps and controlling the speed of the spindle, said plungers for operating the column clamp and the arm clamp connected with the column and arm clamps mechanically.

26. In a radial drill including, the base, the column on the base, the arm on the column, the drill head slidably mounted on the arm, and means for raising and lowering the arm, the combination of; hydraulic control means for controlling arm elevation and head traverse, said hydraulic control means including valves and plungers located in said head and including operating levers for head traverse and arm elevation mounted on the head, said levers effective for moving the arm or the head in the direction in which the levers are swung.

27. In a radial drill including the arm rotatably supported on the column, and the head slidably mounted on the arm; a hydraulically operated clamp for clamping the head to the arm, a hydraulic motor for moving the head along the arm, a control lever for controlling the circuit to the hydraulic motor, a push button operated control valve disposed on the axis of rotation of the lever for controlling the hydraulic circuit to the head clamp, and means controlled by said lever and push button for holding the head clamp in set position until the head traverse lever is actuated for traversing the head.

28. In a radial drill, a column, an arm rotatably mounted on the column, motor driven means for raising and lowering the arm; a drill head mounted on the arm, a clamp for clamping the arm to the column, a single lever for controlling said arm elevating means and said arm clamp, a hydraulic plunger, a cam actuated by said hydraulic plunger, said cam having a high immediate portion for moving the clamp to clamping position, and, reversing clutches controlled by the lever for coupling the power to the elevating means when the cam is rotated to displace the high portion from the clamp means.

29. In a radial drill, a hydraulic control system for controlling the speed and feed of the drill thereof, including, a motor for driving the spindle, a control lever for said motor, fluid pressure supply means, plungers adapted to be connected to the supply means for shifting the respective gears of the speed and feed change transmission, a valve operated by the control lever for disconnecting the fluid pressure to the gear shifting plungers when the power is disconnected, and dial controlled valves for controlling the plungers, whereby said dial controlled valves may be moved through various positions without effecting gear change and gear change is only effective when the control lever is moved to power coupling position.

30. In a radial drill or the like, including a column, an arm slidably mounted on said column, a head slidably mounted on the arm and including a spindle, and speed change gears in the head for driving said spindle, the combination of; a constantly driven fluid pump, an automatic accumulator for storing a quantity of fluid under pressure, for use in controlling the movements of the parts of the radial drill, a fluid motor for traversing the head hydraulically, and a valve for controlling said motor, said valve in fluid connection between said pump and accumulator and arranged to shut off the flow of fluid to the accumulator to energize the motor directly from the pump when the valve is actuated.

31. In a radial drill or the like, including a column, an arm supported on said column, a drill head supported on said arm and including a spindle, and speed change gears in the head for driving the spindle, the combination of; hydraulic means for translating said head on the arm, a fluid pump, an accumulator for storing a quantity of fluid under pressure, a plurality of hydraulic plungers for controlling the head traverse and shifting said gears, a plurality of valves in fluid connection with said accumulator for actuating said plungers, and a valve for controlling said hydraulic means, said valve in fluid connection between said pump and accumulator and arranged to shut off the flow of fluid to the accumulator to energize the hydraulic means directly from the pump when the valve is actuated.

32. In a radial drill, a column, an arm on said column, a head translatable on the arm, a hydraulic motor for translating the head, a clamp for securing the head in position, a pressure supply means, a control valve for the hydraulic motor, means for controlling said clamp, means to retain said clamp in clamping position, and said motor control valve effective for permitting actuation of the clamp to unclamp position upon actuation thereof to head translating position, and thereby unclamping the head prior to hydraulic translation thereof.

33. In a radial drill, including the base, the column and its clamp, the arm and its clamp, and the drill head on the arm and its clamp; hydraulic operating means including; plungers for operating the various clamps, said plungers for operating the column clamp and the arm clamp located within the head and connected with the column and arm clamps respectively mechanically.

34. In a radial drill, a column, an arm rotatably supported on the column, a drill head slidably mounted on the arm, a hydraulically operated clamp for clamping the head to the arm, a hydraulic motor for moving the head along the arm, a valve for controlling the circuit to the hydraulic motor, a valve for controlling the hydraulic circuit to the head clamp and, intercontrol means controlled by said valves for holding the head clamp valve in set position until the head traverse valve is actuated for traversing the head.

35. In a radial drill having an arm and a drill head translatable thereon; a fluid system, means for translating the head, a fluid motor for driving said translating means, a head clamp for clamping the head to the arm, fluid means for actuating said clamp, valves in said fluid system in communication with said fluid motor and said clamp actuating fluid means for individual control thereof, and a fluid interlock between said valves actuable to unclamp said head clamp upon operation of said fluid motor.

36. In a radial drill having an arm, a head translatable on said arm, guide means for slidably sustaining the head on the arm; means for translating the head, a fluid motor for driving said translating means, a fluid pressure supply line for said motor, a motor control valve in said line, a head clamp, a fluid plunger for the clamp, a fluid pressure line in communication with said plunger, a push button-operated clamp control valve in said line, fluid means in said valve to hold the same in depressed head clamped position upon manual actuation thereof, a lever for said motor control valve, said lever mounted on the axis of said clamp valve, and fluid passageways in said motor control valve actuable to release said clamp control valve to head unclamp position upon actuation of the motor control valve to head translating position.

37. In a radial drill including the arm, the drill head translatable on said arm, and the guide means for slidably sustaining the head on the arm; a fluid operated clamp for locking the head on the arm, translating means associated with the head, a fluid motor for driving said translating means, a hand wheel for manually driving said translating means, shiftable coupling means for selectively coupling either the motor or the hand wheel to said translating means, fluid operated shifting means for shifting said coupling means, a fluid pressure control system in communication with said motor, said fluid operated shifting means, and said head clamp, and valves in said control system, said system simultaneously operable to couple the translating means to the motor, to unclamp the head and, to drive said motor.

38. In a radial drill including the arm and the head translatable on said arm; means for translating and clamping the head on the arm comprising, guide means for slidably sustaining the head on the arm, a rack secured along the arm, a fluid motor, a gear in mesh with said rack, said gear journalled in the head and in driving connection with said fluid motor, a fluid pressure line, a motor control valve in said line, a head clamp, a fluid plunger for the clamp, a fluid pressure line in communication with said plunger, a clamp control valve in said line and, automatic means for unclamping the head clamp upon operation of said fluid motor.

39. In a radial drill including the arm and the head translatable on said arm; a rack secured to the arm, a gear for translating the head, said gear in mesh with the rack, a shaft for driving said gear, said shaft journalled in the head, a power shaft adapted to be coupled to said first mentioned shaft, a hand wheel adapted to be coupled to said first mentioned shaft, a shiftable coupling device on said driving shaft, means for causing said device to normally couple said hand wheel to the drive shaft, fluid operated shifting means for said coupling device, a fluid motor for driving said power shaft, a pressure line in communication with said fluid motor and said fluid operated shifting means, and a valve in said pressure line for energizing the fluid shifting means and the motor simultaneously, whereby the coupling device is shifted out of engagement with said hand wheel and into engagement with the motor shaft upon operation of the motor.

40. In a radial drill including the arm and the head translatable on said arm; a rack secured to the arm, a gear for translating the head, said gear in mesh with the rack, a power shaft for driving said gear, a hand wheel and a fluid motor for driving said power shaft, shiftable coupling means on said power shaft for coupling either the hand wheel or the motor to said shaft, fluid operated means for shifting said coupling means, and, a control valve in communication with said fluid motor and with said fluid operated shifting means, whereby upon operation of said motor said coupling means is shifted into driving connection with said motor.

41. In a radial drill including the arm and the drill head translatable thereon; a rack secured along the arm, a gear in mesh with said rack, said gear journalled in the head, a fluid motor, a hand wheel, and shiftable coupling means operable to establish a driving connection to said gear either with the hand wheel or with said fluid motor.

42. In a radial drill having an arm and a drill head translatable on said arm; means for translating the head on the arm comprising, guide means for slidingly sustaining the head on the arm, a rack secured to the arm, a gear in mesh with said rack, a fluid motor, said gear journalled in the head and in driving connection with said fluid motor, a fluid pressure line in the head in communication with said motor and, valve means in said line for controlling the motor.

43. In a radial drill head, a head casing, a drill spindle therein, a driving sleeve surrounding said spindle, means for rotating said sleeve, a bracket secured in said head casing and carrying a transmission consisting of a plurality of shafts and shiftable component gears therein, a gear on said spindle sleeve, a gear fixed on one of the shafts of said bracket in mesh with said gear on the spindle sleeve, a second bracket fixed in said head casing and including a transmission consisting of a plurality of shafts and shiftable gears, the transmissions of said brackets coupled by means of interfitting shaft ends, and a spindle feed mechanism driven by the transmission of said second bracket.

44. In a radial drill head, a spindle feed transmission consisting, of transmission units secured in the head and having a driving coupling connection, each unit consisting of a frame, shafts, and gears, one of said units receiving the feed drive and transmitting the drive to the other unit which is adapted to deliver the drive.

45. A feed or speed indicating mechanism for a radial drill or the like, comprising, a gear shifting mechanism, a knob for operating said mechanism, a gear rotated by said knob, a dial gear rotated by said first named gear, said dial gear carrying an indicator plate said indicator plate having indications around its margin adapted to be rotated with respect to a fixed indicator mark, an annulus fixed to the face of the dial on the axis of rotation thereof and, indicator clips adjustably mounted on said annulus.

46. A feed or speed indicating mechanism for a radial drill or the like, comprising, a gear shifting mechanism, a knob for operating said mechanism, a gear rotated by said knob, a dial gear rotated by said first named gear, and said dial gear carrying an indicator plate said indicator plate having indications around its margin adapted to be rotated with respect to a fixed indicator mark.

47. In a radial drill head, a head casing, a drill spindle assembly and, a transmission for feeding said spindle, said transmission including a bracket, shafts, shiftable gears mounted on said shafts, said bracket including cylinders, plungers in said cylinders, shifters connecting said plungers and said slidable gears, a valve for controlling said plungers, said bracket including passageways between said cylinders and said valves, said bracket carrying all of said parts of the transmission as a unit and removably attached to said casing.

48. In a radial drill, including a column, an arm mounted for vertical adjustment on the column, a drill head slidably mounted on the arm, a clamp for fixing the arm against raising and lowering movement, a clamp for fixing said arm against rotative movement, a clamp for fixing said head on the arm, and elevating mechanism for raising and lowering the arm, the combination of; a control unit removably attached to said head and including hydraulic plungers and levers for controlling said elevating mechanism and said clamps for controlling movement of the arm, said levers located immediately adjacent to each other.

49. In a radial drill having a column, an arm, a drill head slidably mounted thereon; means for delivering power to said drill head comprising, a power shaft extended along said arm, said shaft in splined connection with the drill head, a transmission for said shaft, a driving motor for said transmission, said transmission and motor mounted on the arm, a housing for said transmission, a removable cover plate thereon, said power shaft extended through the cover plate, a drive shaft in said transmission, said shaft in driving connection with the motor, a driving gear on said drive shaft, a driven gear on said power shaft in mesh with said driven gear, and means for removably securing said gears to the respective shafts for permitting replacement of said gears with gears of a different ratio.

50. In a radial drill, a power shaft, a drill head, a spindle driving sleeve mounted in said head and having a drill spindle slidably engaged therein, a variable speed transmission in driving connection with the power shaft and with the spindle driving sleeve, a train of spindle feed change gears in driving connection with the spindle driving sleeve, said gears slidably engaged on a plurality of shafts and having shifting means for selective feed changes, connecting means between said gears and the spindle operable to feed the same longitudinally, and individual mounting brackets for said feed change gears and said connecting means respectively, said brackets removably secured in the head.

51. In a radial drill having a base, a column rotatably mounted in said base, a clamp for locking the column against rotation, an arm elevating mechanism, a clamp for the arm, a drill head slidably mounted on the arm, the combination of; remote control means for operating said clamps and elevating mechanism comprising, control rods extended along said arm in operating connection with said clamps and elevating mechanism, a fluid pressure supply line in said head, control valves in said line, fluid plungers in said line controlled by said valves and in operative connection with said rods, a casing for said valves, said casing mounted on the head, and control levers for the valves, said levers journalled in said casing and in operative connection with respective valves, said levers pivoted in transverse planes for directional control of the column clamp and the arm elevating mechanism respectively by swinging one lever vertically up or down for elevating or lowering the arm and swinging the other in the direction of the column for clamping the same.

52. In a radial drill having, a column, an arm, a head, and a drill spindle in the head; means for feeding the drill spindle longitudinally for a predetermined boring depth comprising, a variable speed transmission for rotating the drill spindle, a variable feed transmission for moving the spindle longitudinally, power means for said transmissions, connecting means between the variable feed transmission and the drill spindle for feeding the spindle longitudinally, a circular feed indicating dial, the circumference of said dial equal to the lineal feeding stroke of the spindle, connecting means between the dial and the spindle actuable to revolve the dial at a rate corresponding to the feeding rate of the spindle, a reference mark and graduations about the periphery of the dial to indicate directly the actual spindle feed.

53. In a radial drill having a column, an arm, a drill head adapted to traverse said arm, a column clamp and, an arm clamp, the combination of, remote control means for controlling the arm clamp and column clamp, comprising, a pair of control rods extended along said arm said rods in operating connection with the arm clamp and column clamp respectively, a fluid pressure control system in said drill head, fluid actuating means in the head for operating said rods, said fluid actuating means in splined connection with respective control rods, fluid control valves in said fluid pressure system to actuate said fluid actuating means respectively, a unitary casing for said valves, control levers for the respective valves, said valves and control levers mounted in said casing, and said casing secured to said drill head.

54. In a radial drill having a column, an arm, a head and, a drill spindle in the head; means for feeding the drill spindle longitudinally a predetermined depth comprising, a variable speed transmission for rotating the drill spindle, power means for said transmission, a variable feed transmission, power means for said transmission, connecting means between the transmission and the drill spindle for feeding the spindle longitudinally, a circular feed indicating dial, a carrier for said dial, means for shifting said dial relative to said carrier and clamping the dial thereto, connecting means between said carrier and the spindle actuable to revolve the carrier at a rate corresponding to the feeding rate of the spindle, a shiftable coupler on said connecting means associated with said dial and carrier, means on the carrier operable to shift said coupler and discontinue the spindle feed when the limit of spindle travel is reached, and means on said dial operable to shift said coupler and discontinue the spindle feed when the same has reached a predetermined depth.

55. In a radial drill of the type including a plurality of fluid operated gear shifting and clamping devices; a plurality of fluid operated plungers for said devices, a fluid operated head traverse fluid motor, a fluid pressure system for operating said plungers and motor comprising, a fluid pressure supply line, a pressure accumulator, a valve in said supply line, a pair of branch lines from said valve to said fluid motor, passageways in said valve for operating the motor in either direction, a branch line from said valve to said accumulator, said valve arranged to normally direct the fluid to the pressure accumulator and upon actuation thereof to block the flow to the pressure accumulator and direct the flow to the motor, a plurality of branch lines in communication with said accumulator and the fluid plungers, and valves in the respective lines for controlling said plungers.

56. In a radial drill, an arm, a head thereon including the spindle, and shiftable gears for driving the spindle; a fluid pressure system comprising, a constantly driven fluid pump, a plurality of fluid gear shifter plungers, a fluid motor for moving said head, a pressure accumulator, a valve for said motor, a fluid supply conduit to said valve, branch conduits from said valve to said motor and accumulator respectively, said valve operative to direct the fluid either to the motor or to the accumulator, means on the accumulator operable to bypass the fluid when the accumulator is charged, branch conduits from the accumulator to said plungers, and valves in said branch conduits for controlling said plungers.

57. In a radial drill head mounted on an arm, a spindle, shiftable spindle driving gear, a plurality of fluid gear shifter plungers, a fluid motor for moving said head on the arm, a fluid pressure system for operating said plungers and motor comprising, a fluid supply conduit, an accumulator, a motor control valve, branch conduits from said valve to said accumulator and motor respectively, passageways in said valve to direct the fluid either to the motor or to the accumulator, branch conduits from said accumulator to said plungers, and valves in said branch conduits for controlling said plungers.

58. In a radial drill head including gear shifting plungers and a hydraulic motor; a fluid pressure system, a fluid pressure supply line, an accumulator for fluid under pressure, a valve in said supply line, branch lines from said valve to said motor and accumulator respectively, said valve arranged to normally direct the fluid to the accumulator and upon actuation of the valve to block the accumulator and direct the flow to the motor, a plurality of branch lines in communication with said accumulator and the fluid plungers, and valves in the respective lines for controlling said plungers.

59. In a radial drill head, a hydraulic system for shifting spindle driving and feeding gears, for translating the head and, for clamping the head against movement; comprising, a fluid pump, a main control valve, means for accumulating fluid under pressure, said main valve normally directing the fluid to said means, a fluid motor for moving the head including reversing valves, said valves in fluid connection with said main valve and actuated for permitting flow of fluid to the motor when the main valve is moved from normal position, a head clamp control valve adapted to remain in clamping position when so placed when the main valve is in normal position and adapted to be released for unclamping when the main valve is moved to position for operation of the fluid motor, and spindle gear shift mechanisms in constant fluid connection with the pressure accumulating means when the drill is being operated.

60. In a radial drill having, an arm, a head translatable on the arm, translating means for the head, a fluid motor for driving said translating means, and a shiftable coupling device for coupling said motor to the translating means upon operation of the motor; a fluid pressure system for operating the motor comprising, a fluid pressure supply line, a motor control valve in said line, a pair of branch lines from said valve to the motor, passageways in said valve arranged to operate the motor in either direction, a pair of shifting plungers in respective branch lines, and connecting means between said plungers actuable to shift said coupling device for coupling said motor to the translating means upon actuation of the valve.

61. In a hydraulic control system for radial drills or the like, a constantly driven fluid pump, an accumulator for storing a charge of fluid under pressure, an operating circuit supplied from said accumulator, a fluid motor supplied directly from said pump, a valve for selectively controlling the flow of fluid from said pump to said motor and from said pump to said accumulator respectively, said accumulator being in fluid connection with the pump and having a control valve, and said accumulator control valve having automatic actuating means to direct the flow of fluid from the pump to the accumulator when the accumulator is discharged and to by-pass the flow when the accumulator is charged.

WILLIAM G. HOELSCHER.